United States Patent
Notarnicola et al.

(10) Patent No.: US 11,608,795 B2
(45) Date of Patent: Mar. 21, 2023

(54) CONSTANT DENSITY HEAT EXCHANGER AND SYSTEM FOR ENERGY CONVERSION

(71) Applicant: General Electric Company, Schenectady, NY (US)

(72) Inventors: Michael Robert Notarnicola, Cincinnati, OH (US); Joshua Tyler Mook, Cincinnati, OH (US); Kevin Michael VandeVoorde, Cincinnati, OH (US); Aigbedion Akwara, Cincinnati, OH (US); Mohammed El Hacin Sennoun, West Chester, OH (US); Mary Kathryn Thompson, Fairfield Township, OH (US); Scott Douglas Waun, Loveland, OH (US); Michael Thomas Gansler, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/407,568

(22) Filed: Aug. 20, 2021

(65) Prior Publication Data
US 2021/0381467 A1    Dec. 9, 2021

Related U.S. Application Data

(63) Continuation of application No. 16/878,736, filed on May 20, 2020, now Pat. No. 11,125,184.
(Continued)

(51) Int. Cl.
*F02G 1/055*    (2006.01)
*F02G 1/04*    (2006.01)
(Continued)

(52) U.S. Cl.
CPC .............. *F02G 1/055* (2013.01); *B33Y 80/00* (2014.12); *F02G 1/04* (2013.01); *F02G 1/044* (2013.01);
(Continued)

(58) Field of Classification Search
CPC . F02G 1/047; F02G 1/05; F02G 1/055; F02G 2275/20; F02G 2275/40;
(Continued)

(56) References Cited

U.S. PATENT DOCUMENTS

| 433,060 A | 7/1890 | Zehren |
| 4,138,847 A | 2/1979 | Hill |

(Continued)

FOREIGN PATENT DOCUMENTS

| DE | 19636738 | 3/1998 |
| DE | 102010033659 A1 | 2/2012 |

(Continued)

OTHER PUBLICATIONS

ATCO Power, Combined-Cyle Plants, Our Facilities, Our Power Technologies, 1 Page. https://www.atcopower.com/Our-Facilities/Our-Power-Technologies/Combined-Cycle-Plants/.
(Continued)

*Primary Examiner* — Mickey H France
(74) *Attorney, Agent, or Firm* — Dority & Manning, P.A.

(57) ABSTRACT

A constant density heat exchanger is provided. The constant density heat exchanger includes a housing extending between a first end and a second end and defining a chamber having an inlet and an outlet. A first flow control device is positioned at the inlet of the chamber and movable between an open position in which a working fluid is permitted into the chamber and a closed position in which the working fluid is prevented from entering the chamber. A second flow control device is positioned at the outlet of the chamber and
(Continued)

movable between an open position in which the working fluid is permitted to exit the chamber and a closed position in which the working fluid is prevented from exiting the chamber. A heat exchange fluid imparts thermal energy to the volume of working fluid held at constant density within the chamber by the first and second control devices.

20 Claims, 38 Drawing Sheets

Related U.S. Application Data

(60) Provisional application No. 62/850,701, filed on May 21, 2019, provisional application No. 62/850,599, filed on May 21, 2019, provisional application No. 62/850,692, filed on May 21, 2019, provisional application No. 62/850,678, filed on May 21, 2019, provisional application No. 62/850,623, filed on May 21, 2019.

(51) Int. Cl.
| | |
|---|---|
| *F28D 9/04* | (2006.01) |
| *F28F 7/02* | (2006.01) |
| *F28F 13/00* | (2006.01) |
| *F28F 13/14* | (2006.01) |
| *F02G 1/053* | (2006.01) |
| *F02G 1/057* | (2006.01) |
| *F02G 1/047* | (2006.01) |
| *F02G 1/05* | (2006.01) |
| *F02G 1/044* | (2006.01) |
| *B33Y 80/00* | (2015.01) |
| *F23R 3/00* | (2006.01) |
| *F02G 3/00* | (2006.01) |
| *F02G 1/043* | (2006.01) |
| *F28D 21/00* | (2006.01) |

(52) U.S. Cl.
CPC .............. *F02G 1/047* (2013.01); *F02G 1/05* (2013.01); *F02G 1/053* (2013.01); *F02G 1/057* (2013.01); *F02G 3/00* (2013.01); *F23R 3/005* (2013.01); *F28D 9/04* (2013.01); *F28F 7/02* (2013.01); *F28F 13/003* (2013.01); *F28F 13/14* (2013.01); *F02G 1/0435* (2013.01); *F02G 2243/00* (2013.01); *F02G 2244/00* (2013.01); *F02G 2244/08* (2013.01); *F02G 2244/50* (2013.01); *F02G 2244/52* (2013.01); *F02G 2250/00* (2013.01); *F02G 2254/10* (2013.01); *F02G 2254/18* (2013.01); *F02G 2257/00* (2013.01); *F02G 2258/10* (2013.01); *F02G 2270/80* (2013.01); *F02G 2280/10* (2013.01); *F28D 2021/0026* (2013.01); *F28F 2210/10* (2013.01); *F28F 2250/04* (2013.01)

(58) Field of Classification Search
CPC .. F02G 1/045; F02G 2244/00; F02G 2244/08; F02G 2255/10; F02G 2255/20; F02G 2256/02; F02G 2257/00; F02G 1/0435; F02G 2243/00; F02G 2244/50; F02G 2244/52; F02G 2250/00; F02G 2254/10; F02G 2254/18; F02G 2258/10; F02G 2270/80; F02G 2280/10; F02G 1/04; F02G 1/044; F02G 1/053; F02G 1/057; F01K 13/006; F28D 7/02; F28D 7/024; F28D 7/026; F28D 7/04; F28D 2021/0026; F28D 9/04; Y02E 20/14; Y02E 20/34; Y02T 50/60; F28F 2250/04; F28F 2210/10; F28F 7/02; F28F 13/003; F28F 13/14; F23K 5/20; F23L 15/02; F23L 15/04; F23R 3/005; B33Y 80/00
USPC ............ 165/DIG. 105, DIG. 106, DIG. 126, 165/DIG. 129, DIG. 130, DIG. 132; 60/643, 645, 646, 647, 650, 651, 652, 60/653, 655, 660, 663, 664, 665, 667, 60/670, 671, 682, 517–524
See application file for complete search history.

(56) References Cited

U.S. PATENT DOCUMENTS

| | | |
|---|---|---|
| 5,005,349 A | 4/1991 | Momose et al. |
| 5,172,784 A | 12/1992 | Varela, Jr. |
| 5,533,566 A | 7/1996 | Fineblum |
| 5,675,974 A | 10/1997 | Heikrodt et al. |
| 5,968,680 A | 10/1999 | Wolfe et al. |
| 6,293,101 B1 | 9/2001 | Conrad |
| 6,365,290 B1 | 4/2002 | Ghezel-Ayagh et al. |
| 6,896,988 B2 | 5/2005 | Wang et al. |
| 7,171,811 B1 | 2/2007 | Berchowitz et al. |
| 7,862,938 B2 | 1/2011 | Ghezel-Ayagh |
| 8,721,981 B2 | 5/2014 | Freund et al. |
| 9,810,068 B2 | 11/2017 | Shkolnik et al. |
| 2003/0111211 A1 | 6/2003 | Stonehouse et al. |
| 2003/0163990 A1 | 9/2003 | Maceda et al. |
| 2003/0230440 A1 | 12/2003 | Kamen et al. |
| 2004/0079087 A1 | 4/2004 | Chandran et al. |
| 2005/0250062 A1 | 11/2005 | Kornbluth et al. |
| 2007/0193271 A1 | 8/2007 | Gorban |
| 2009/0025388 A1 | 1/2009 | Silver et al. |
| 2010/0050628 A1* | 3/2010 | Staffend ................ F01C 11/002 60/508 |
| 2011/0027673 A1 | 2/2011 | Ignatiev et al. |
| 2011/0061379 A1 | 3/2011 | Misselhorn |
| 2011/0168369 A1* | 7/2011 | Kim ....................... F28D 7/106 165/154 |
| 2011/0226284 A1 | 9/2011 | Taylor et al. |
| 2011/0302902 A1 | 12/2011 | Kelly et al. |
| 2012/0260668 A1 | 10/2012 | Rogers et al. |
| 2013/0269334 A1 | 10/2013 | Sonwane et al. |
| 2014/0117670 A1 | 5/2014 | Freund et al. |
| 2015/0041454 A1 | 2/2015 | Foret |
| 2015/0285183 A1 | 10/2015 | Vatne |
| 2017/0227293 A1 | 8/2017 | Zaffetti et al. |
| 2018/0094581 A1 | 4/2018 | Teixeira |
| 2019/0010834 A1 | 1/2019 | Ford |

FOREIGN PATENT DOCUMENTS

| | | |
|---|---|---|
| JP | H07145755 A | 6/1995 |
| JP | 2009/115065 A | 5/2009 |
| JP | 2015/034544 A | 2/2015 |

OTHER PUBLICATIONS

Bahrami et al., Investigation of the Effect of Organic Working Fluids on Thermodynamic Performance of Combined Cycle Stirling-ORC, International Journal of Energy and Environmental Engineering, vol. 4, No. 12, 2013, 9 Pages. https://link.springer.com/content/pdf/10.1186%2F2251-6832-4-12.pdf http://www.journal.ijeee.com/content/4/1/12 https://link.springer.com/article/10.1186/2251-6832-4-12.

Bakos et al., Technoeconomic Assessment of an Integrated Solar Combined Cycle Power Plant in Greece Using Line-Focus Parabolic Trough Collectors, ScienceDirect, Renewable Energy, vol. 60, Dec. 2013, pp. 598-603. (Abstract Only) https://www.sciencedirect.com/science/article/pii/S096014811300270X.

Center for Sustainable Energy, Combined Heat and Power (CHP), What is combined Heat and Power?, San Diego CA, 6 Pages. https://energycenter.org/self-generation-incentive-program/business/technologies/chp.

(56) References Cited

OTHER PUBLICATIONS

Charky, Oil Sealed Rotary Vane Pumps, VacAero International Inc., Canada, Mar. 5, 2019, 10 Pages. https://vacaero.com/information-resources/vacuum-pump-technology-education-and-training/1046-oil-sealed-rotary-vane-pumps-part-2.html.

CSIROpedia, Solid Oxide Fuel Cell Technology, 17 Pages. https://csiropedia.csiro.au/ceramic-fuel-cells/.

Darshini, How Big is the Gas-Based Distributed Power Generation Market? And will it grow?, Power Engineering International, Decentralized Energy, Jan. 30, 2017, 6 Pages. https://www.powerengineeringint.com/articles/decentralized-energy/2017/01/how-big-is-the-gas-based-distributed-power-generation-market-and-will-it-grow.html.

Engineering Technology Simulation Learning Videos on YouTube, Types of Hydraulic Pumps, Jun. 5, 2015. (Video Link Only) https://www.youtube.com/watch?v=Qv1iV6EzNHg.

Geyer et al., Concentrated Solar Thermal Power—Now!, ResearchGate, Technical Report, Jan. 2005, 49 Pages. https://www.researchgate.net/publication/298944888_Concentrated_Solar_Thermal_Power_-_Now.

Geyer, Figure 2.6: Integrated Solar/Combined Cycle Systems (ISCC), ResearchGate, 4 pages. https://www.researchgate.net/figure/Integrated-Solar-Combined-Cycle-system-ISCC_fig2_298944888.

Green Car Congress, MHI to Develop Fuel Cell Triple Combined Cycle Power Generation System; Expected to Deliver Power Generation Exceeding 70% (LHV) in Larger Applications, Jun. 1, 2012, 9 Pages. https://www.greencarcongress.com/2012/06/mhi-20120601.html.

Group of Energy Conversion System (GECOS), Fuel Cells and Electrochemical Energy Systems, Politecnico Milano, 7 Pages. http://www.gecos.polimi.it/research-areas/fuel-cells-and-electrochemical-energy-systems/.

Honeywell Aerospace, Stirling Cycle Cryocoolers, Auxiliary Power and Thermal, Ultra Long-Life, Flight Qualified Technology for High Speed Imaging and Sensing Infra-Red Detectors, 4 Pages. https://aerospace.honeywell.com/en/products/auxiliary-power-and-thermal/stirling-cycle-cryocoolers.

Howden, Reciprocating Compressor C Series—Animation on YouTube, Jun. 20, 2017. (Video Link Only) https://www.youtube.com/watch?v=owNOdUBL37U&feature=youtu.be.

Huang, Toroidal Engine, YouTube, Oct. 29, 2016. (Video Link Only) https://www.youtube.com/watch?v=lwMDXxge8c8.

Ingram-Goble, Modeling and Optimization of a Combined Cycle Stirling-ORC System and Design of an Integrated Microchannel Stirling Heat Rejector, Thesis, Oregon State University, Advanced Technology and Manufacturing Institute (ATAMI), Corvallis, Or, 2010, 122 Pages. https://ir.library.oregonstate.com/concern/graduate_thesis_or_dissertations/p8418q749.

Kawasaki, CHP Cogeneration/Distributed Power, Kawasaki Heavy Industries, 5 Pages. http://global.kawasaki.com/en/energy/solutions/distributed_power/index.html.

Kellner, The New Power Generation: This Fuel Cell Startup Could Spark a Revolution, GE Reports, Jul. 22, 2014, 4 Pages. https://www.ge.com/reports/post/92454271755/the-new-power-generation-this-fuel-cell-startup/.

Khalili et al., Investigating the Effect of Channel Angle of a Subsonic MHD (Magneto-Hydro-Dynamic) Generator on Optimum Efficiency of a Triple Combined Cycle, ScienceDirect, Journals & Books, Energy, vol. 85, Jun. 1, 2015, pp. 543-555. (Abstract Only) https://www.sciencedirect.com/science/article/abs/pii/S0360544215003734.

Kobayashi et al., Extremely High-Efficiency Thermal Power System-Solid Oxide Fuel Cell (SOFC) Triple Combined-Cycle System, Mitsubishi Heavy Industries Technical Review, vol. 48, No. 3, Sep. 2011, pp. 9-15. https://www.mhi.co.jp/technology/review/pdf/e483/e483009.pdf.

Kubo, Technical and Economic Study of Stirling and Rankine Cycle Bottoming Systems for Heavy Truck Diesel Engines, NASA CR-180833, CTR 0723-97001, Sep. 1987, 171 Pages. https://ntrs.nasa.gov/archive/nasa/casi.ntrs.nasa.gov/19870019037.pdf.

Machine Tech Video Blog on YouTube, Positive Displacement Pump Types, Aug. 25, 2016. (Video Link Only) https://www.youtube.com/watch?v=4OJTN0M1DBk.

Mekanizmalar (Web Page Link Only) https://www.mekanizmalar.com/.

Mekanizmalar (YouTube Video) https://www.youtube.com/mekanizmalar.

Mekanizmalar, Roots Pump Four Lobe on YouTube, May 29, 2012. (Video Link Only) https://www.youtube.com/watch?v=BttM3K817AA.

Mekanizmalar, Roots Pump Two Lobe on YouTube, May 11, 2012. (Video Link Only) https://www.youtube.com/watch?v=_-fwWrFLiyY.

Muller-Steinhagen, Ranking Cycle, Thermopedia, A-to-Z Guide to Thermodynamics, Heat & Mass Transfer, and Fluids Engineering, 9 Pages. http://www.thermopedia.com/content/1072/rankinecycle.

Nissan Motor Corporation, Nissan Announces Development of the World's First SOFC-Powered Vehicle System that Runs on Bio-Ethanol Electric Power, Global Newsroom, Press Release, Jun. 14, 2016, 22 Pages. https://newsroom.nissan-global.com/releases/160614-01-e.

Okoroigwe et al., An Integrated Combined Cycle System Driven by a Solar Tower: A Review, ScienceDirect, Renewable and Sustainable Energy Reviews, vol. 57, May 2016, pp. 337-350. (Abstract Only) https://www.sciencedirect.com/science/article/pii/S1364032115014756.

Owens, et al., GE-Fuel Cells the Power of Tomorrow, GE Ecomagination, Feb. 2, 2016, 43 Pages. https://www.ge.com/sites/default/files/GE-Fuel%20Cell%20020216.pdf.

Paanu et al, Waste Heat Recovery-Bottoming Cycle Alternatives, University of Vaasa, Finland, 2012, 26 Pages. https://osuva.uwasa.fi/bitstream/handle/10024/7796/isbn_978-952-476-389-9.pdf?sequence=1.

Panasonic, Panasonic Makes Zero Emissions Homes Possible, Panasonic Marketing Europe GmbH, 2019, 4 Pages. https://www.aircon.panasonic.eu/GB_en/cases/case/panasonic-smart-home/.

Starrotor Corporation, Imroved Gerotor Technology, Texas, 2019, 2 Pages. https://www.starrotor.com/.

Stirling Engines, Solar Cell Central, 3 Pages. https://solarcellcentral.com/stirling_page.html.

Tchanche, Heat Conversion into Power Using Small Scale Organic Rankine Cycles, Doctoral Thesis University of Athens (AUA), ResearchGate, Oct. 2012, 202 Pages. https://www.researchgate.net/publication/256496874_Heat_conversion_into_power_using_small_scale_organic_Rankine_cycles.

Thimsen, Stirling Engine Assessment, Electric Power Research Institute, Inc. (EPRI), Palo Alto, CA, 1007317, 2002, 170 Pages. https://www.engr.colostate.edu/~marchese/mech337-10/epri.pdf.

Wei et al., a Total Cost of Ownership Model for Low Temperature Pem Fuel Cells in Combined Heat and Power and Backup Power Applications, Lbnl-6772E, Lawrence Berkeley National Laboratory, Environmental Technologies Division, Oct. 2014, 222 Pages. https://www.energy.gov/sites/prod/files/2016/12/f34/fcto_tco_model_low_temp_pem_fc.pdf.

Wikipedia, Balance of Plant, 1 Page. https://en.wikipedia.org/wiki/Balance_of_plant.

Wikipedia, Roots-Type Supercharger, 5 Pages. https://en.wikipedia.org/wiki/Roots-type_supercharger.

Wikipedia, Swing-Piston Engine, 4 Pages. https://en.wikipedia.org/wiki/Swing-piston_engine.

wn.com, Swing-Piston Engine, 3 Pages. https://wn.com/swing-piston_engine.

* cited by examiner

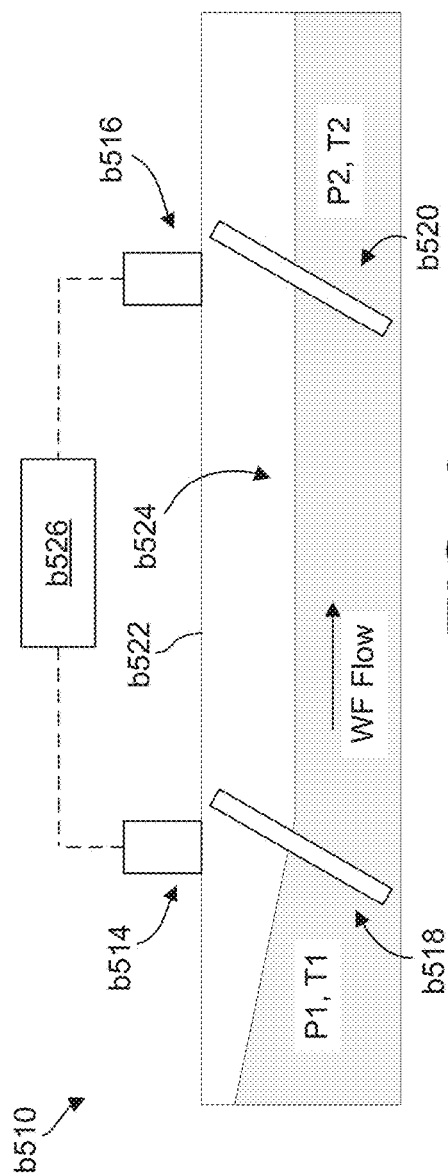
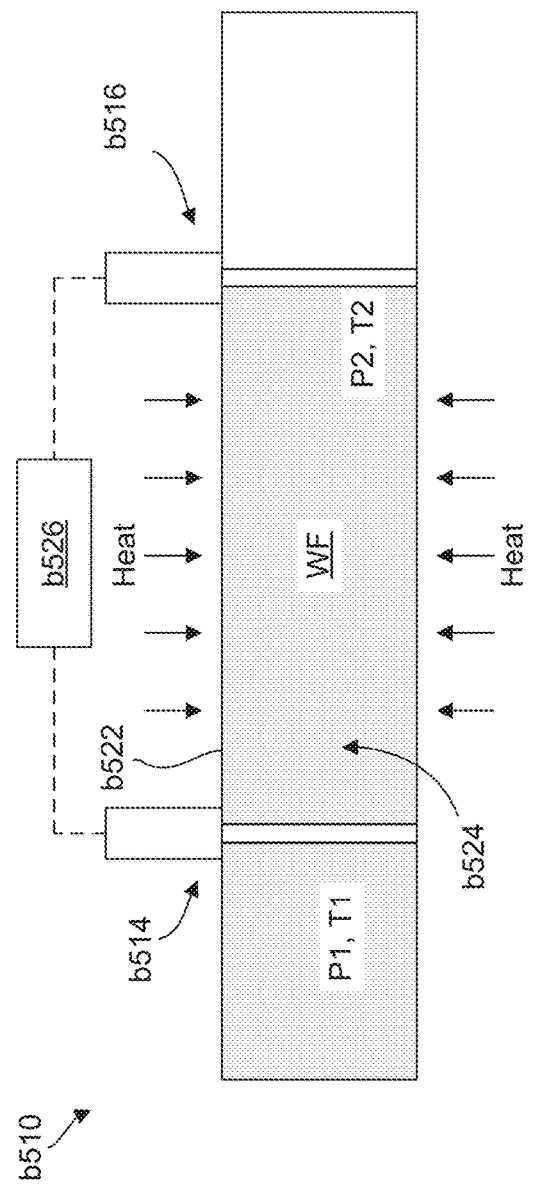
FIG. 9
FIG. 10

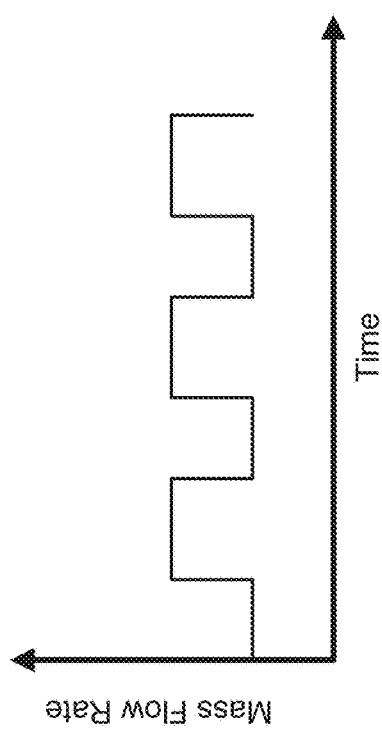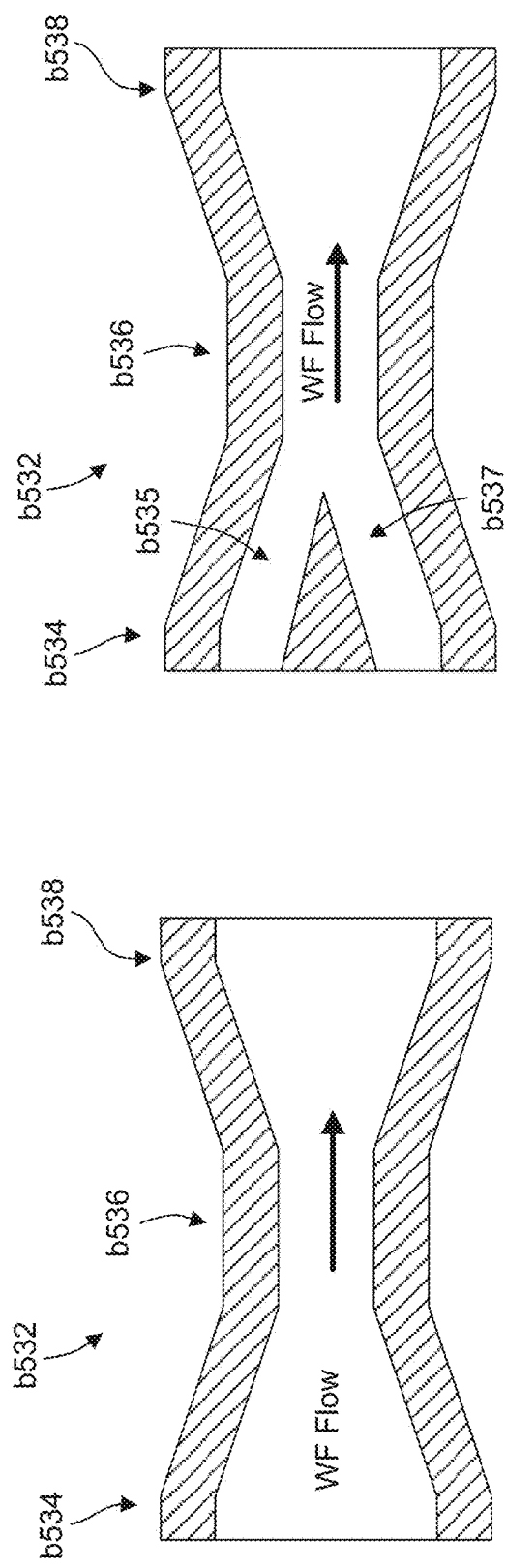
FIG. 12
FIG. 13
FIG. 14

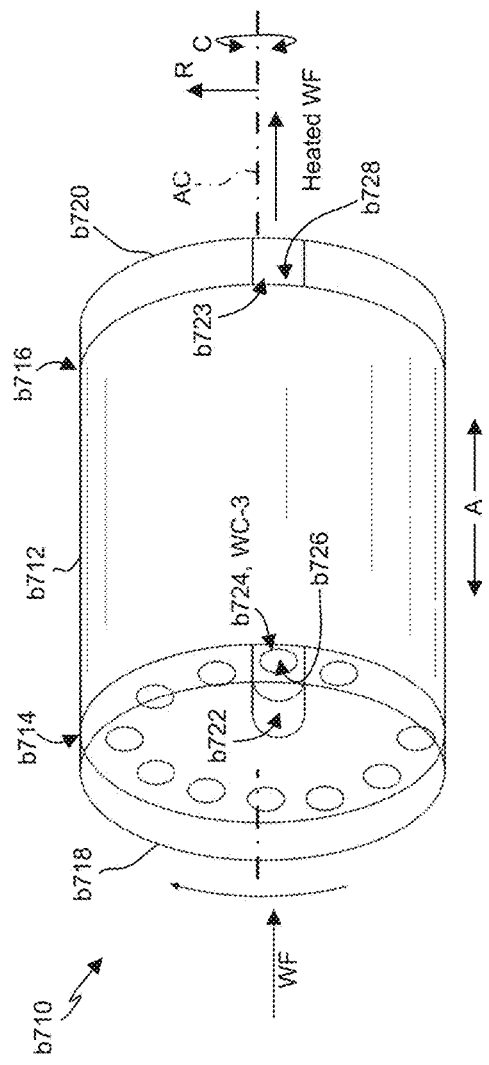
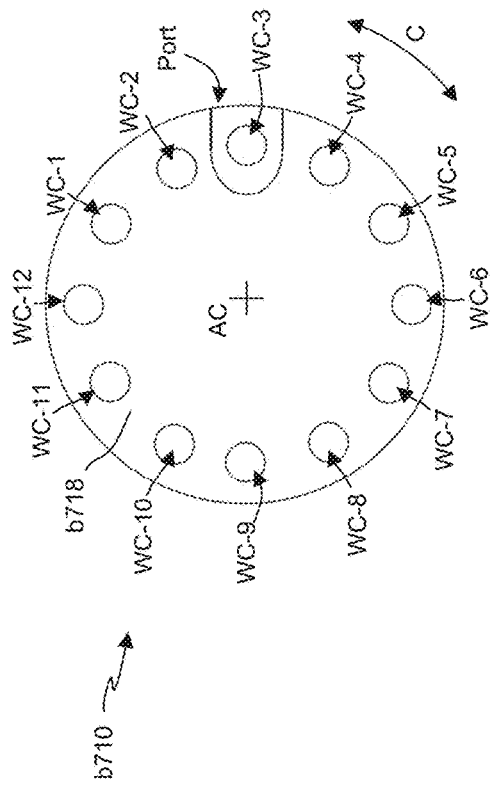
FIG. 31
FIG. 32

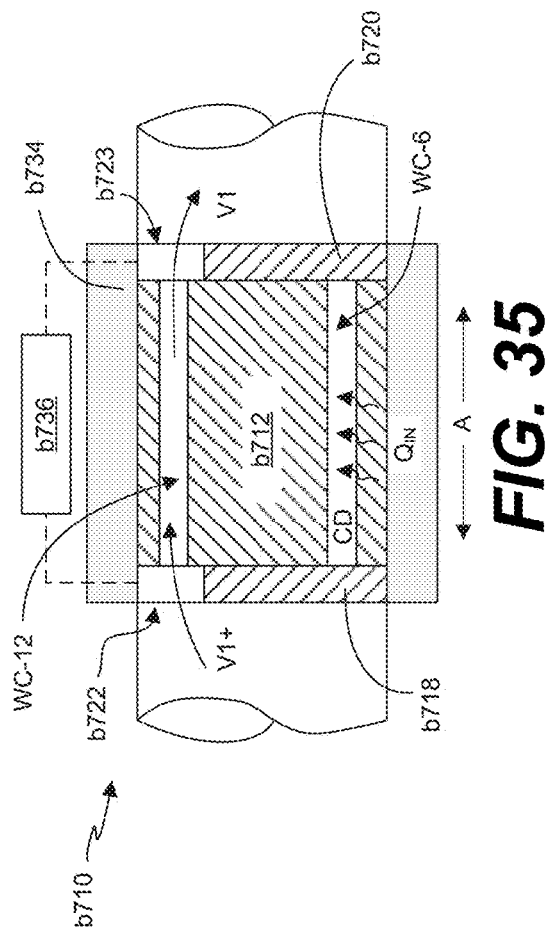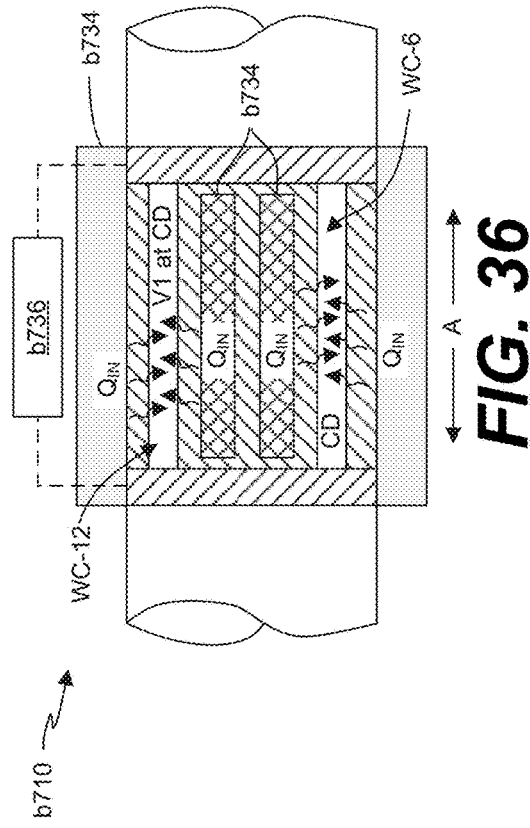

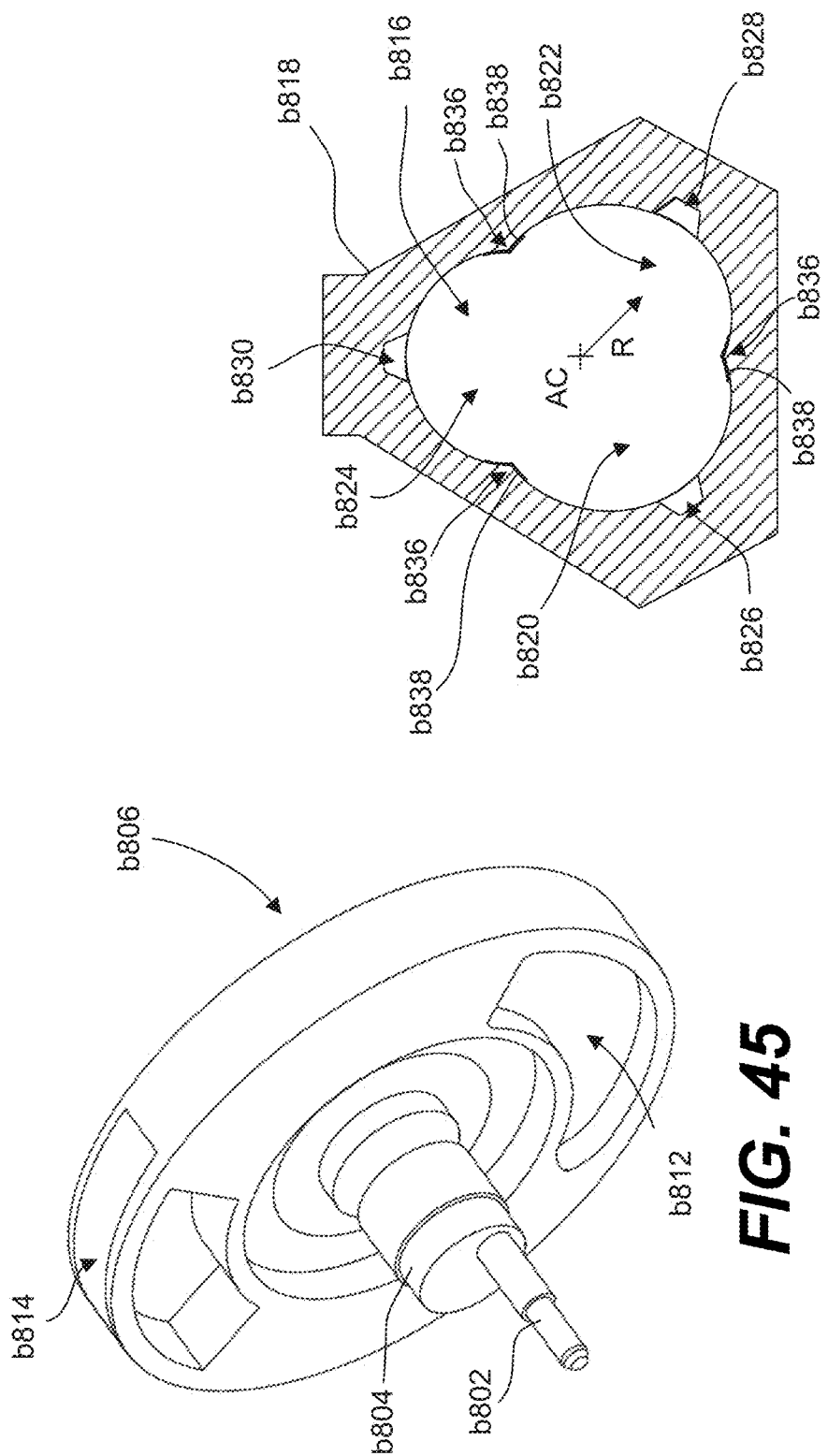

CONSTANT DENSITY HEAT EXCHANGER AND SYSTEM FOR ENERGY CONVERSION

CROSS-REFERENCE TO RELATED APPLICATIONS

This application is a continuation of U.S. application Ser. No. 16/878,736, filed May 20, 2020, which claims priority to each of the following U.S. Provisional Applications, the contents of which are incorporated herein by reference in their entirety for all purposes as if set forth verbatim: App. No. 62/850,599, filed May 21, 2019; App. No. 62/850,623, filed May 21, 2019; App. No. 62/850,678, filed May 21, 2019; App. No. 62/850,692, filed May 21, 2019; and App. No. 62/850,701, filed May 21, 2019. The present application also incorporates by reference International Patent Application Number PCT/US2020/033674 filed on May 20, 2020, in its entirety for all purposes.

FIELD

The present subject matter relates generally to energy conversion systems, power generation systems, and energy distribution systems. The present subject matter additionally relates to heat exchangers and heat exchanger systems. The present subject matter further relates to piston engine assemblies, such as closed-cycle engine systems. The present subject matter still further relates to systems and methods for control or operation of one or more systems of the present subject matter herein.

BACKGROUND

Power generation and distribution systems are challenged to provide improved power generation efficiency and/or lowered emissions. Furthermore, power generation and distribution systems are challenged to provide improved power output with lower transmission losses. Certain power generation and distribution systems are further challenged to improve sizing, portability, or power density generally while improving power generation efficiency, power output, and emissions.

Certain engine system arrangements, such as closed cycle engines, may offer some improved efficiency over other engine system arrangements. However, closed cycle engine arrangements, such as Stirling engines, are challenged to provide relatively larger power output or power density, or improved efficiency, relative to other engine arrangements. Closed cycle engines may suffer due to inefficient combustion, inefficient heat exchangers, inefficient mass transfer, heat losses to the environment, non-ideal behavior of the working fluid(s), imperfect seals, friction, pumping losses, and/or other inefficiencies and imperfections. As such, there is a need for improved closed cycle engines and system arrangements that may provide improved power output, improved power density, or further improved efficiency. Additionally, there is a need for an improved closed cycle engine that may be provided to improve power generation and power distribution systems.

Additionally, or alternatively, there is a general need for improved heat transfer devices, such as for heat engines, or as may be applied to power generation systems, distribution systems, propulsion systems, vehicle systems, or industrial or residential facilities.

Furthermore, there is a need for improved control system and methods for operating power generation systems as may include subsystems that collectively may provide improved power generation efficiency or reduced emissions.

BRIEF DESCRIPTION

Aspects and advantages of the invention will be set forth in part in the following description, or may be obvious from the description, or may be learned through practice of the invention.

An aspect of the present disclosure is directed to a constant density heat exchanger. The constant density heat exchanger includes a housing extending between a first end and a second end and defining a chamber having an inlet and an outlet, a first flow control device positioned at the inlet of the chamber and movable between an open position in which a working fluid is permitted into the chamber and a closed position in which the working fluid is prevented from entering the chamber, and a second flow control device positioned at the outlet of the chamber and movable between an open position in which the working fluid is permitted to exit the chamber and a closed position in which the working fluid is prevented from exiting the chamber. A heat exchange fluid imparts thermal energy to the volume of working fluid as the first flow control device and the second flow control device hold the volume of working fluid at constant density within the chamber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure including the best mode, directed to one of ordinary skill in the art, is set forth in the specification, which makes reference to the appended figures, in which:

FIGS. 9 and 10 provide schematic close-up views of one embodiment of a constant density heat exchanger that can be utilized in the system of FIG. 8;

FIG. 12 graphically depicts the mass flow rate of the working fluid at the outlet of the constant density heat exchanger as a function of time;

FIGS. 13 and 14 provide cross-sectional views of example pulse converters that can be utilized with Notarnicola cycle systems of the present disclosure;

FIG. 31 provides a perspective view of a rotary constant density heat exchanger according to an example embodiment of the present disclosure;

FIG. 32 provides a front view of the rotary constant density heat exchanger of FIG. 31;

FIG. 35 provides a cross-sectional view of the rotary constant density heat exchanger of FIGS. 31 and 32 with the ports of the first plate and second plate positioned at the twelve o'clock position after one revolution of the plates;

FIG. 36 provides a cross-sectional view of another rotary constant density heat exchanger having one or more heat sources positioned radially inward of the working chambers;

FIGS. 44, 45, 46, and 47 provide various views of an example Wrankel device and components thereof according to an aspect of the present disclosure;

Figure 1:
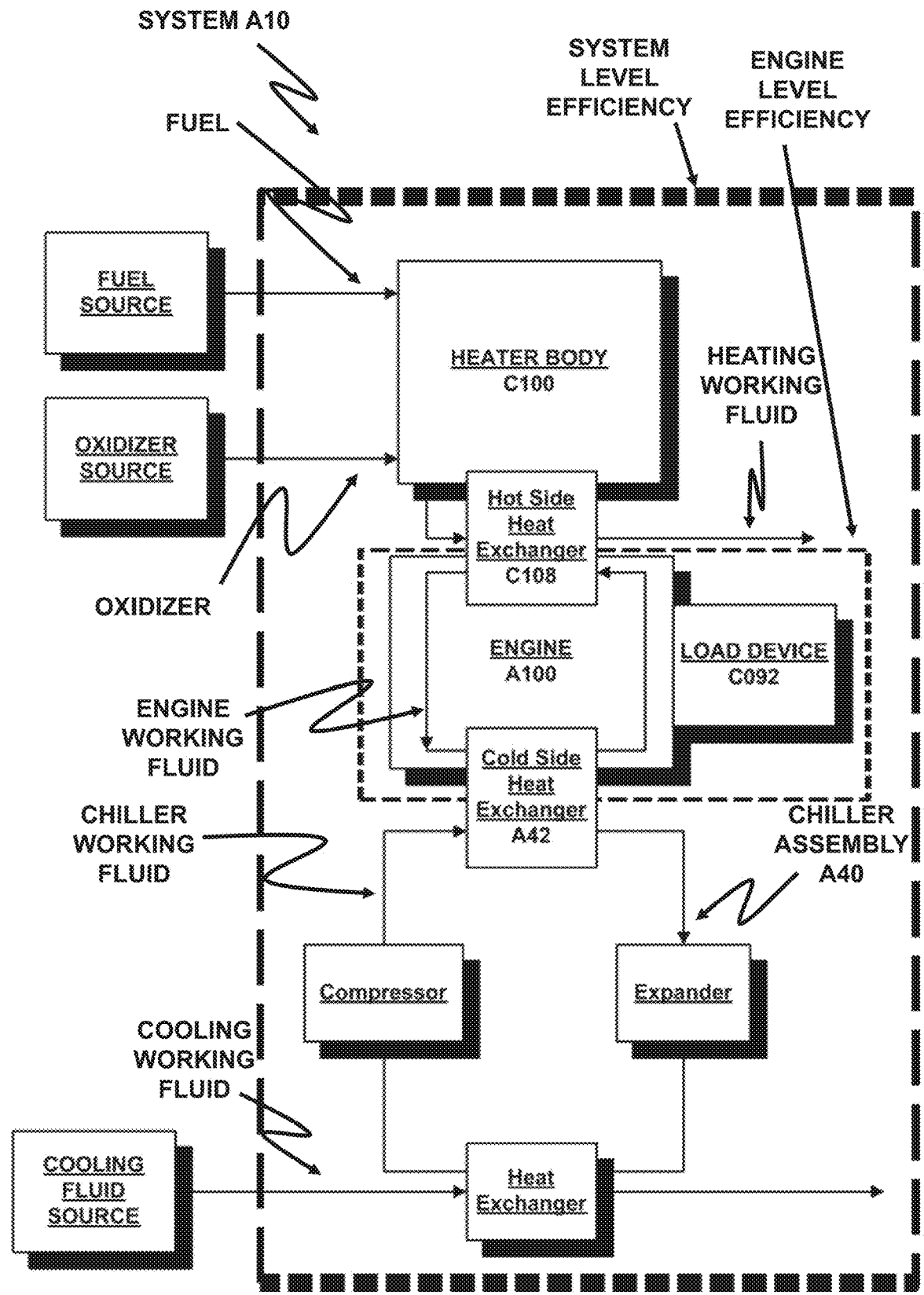
FIG. 1 is a schematic block diagram depicting a system for energy conversion according to an aspect of the present disclosure.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure and not limitation. In fact, it will be apparent to those skilled in the art that various modifications and variations can be made in the present disclosure without departing from the scope of the disclosure. For instance, features illustrated or described as part of one embodiment can be used with another embodiment to yield a still further embodiment. In another instance, ranges, ratios, or limits associated herein may be altered to provide further embodiments, and all such embodiments are within the scope of the present disclosure. Unless otherwise specified, in various embodiments in which a unit is provided relative to a ratio, range, or limit, units may be altered, and/or subsequently, ranges, ratios, or limits associated thereto are within the scope of the present disclosure. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows. The term "loop" can be any suitable fluid pathway along which fluid can flow and can be either open or closed, unless stated otherwise.

Generally, current power generation and distribution systems are inflexible (e.g., due to cost and operational needs and restrictions) relative to changes in usage and demand throughout a day. Additionally, such inflexibility may be exasperated by periodic, irregular, or unpredictable power generation from renewable energy sources.

In addition, or alternatively, power generation and distribution infrastructure is costly and renders large geographic areas vulnerable to power outages based on adverse weather, natural or man-made disasters, equipment malfunctions and failures, or maintenance activities. Initial and on-going costs, such as maintenance and repair, result in barriers to further development of access to electricity in developing countries and rural areas. Expanding access to electricity may be hindered by relatively high costs to establish generation and distribution infrastructure, relatively high operational costs, and an ability for governments, corporations, or consumers to pay or invest in power generation and distribution. Such costs may also pose barriers to further maintenance and development in developed countries, as older infrastructure and natural or man-made disasters may cause maintenance or improvement to be cost-prohibitive. For example, in the United States, power lines and transformers are approximately 30 years old on average. Replacement costs for such equipment have been estimated at over $1 trillion dollars.

Such issues and barriers from power generation and distribution systems may further pose barriers to developing or expanding access to clean water, water desalination, and food security. Additionally, or alternatively, smaller scale or portable power generation systems that may overcome distribution obstacles may nonetheless be challenged to provide a necessary power density and output. Such limitations in power density and output may generally result in an inability to apply smaller scale or portable power generation systems to rural areas or developing nations. Furthermore, as clean water treatment and desalination are generally energy intensive, smaller scale or portable power generation system may generally provide inadequate power density and output for providing water to rural or less population-dense areas.

As such, there is a need for power generation systems that provide improved efficiency and reduced emissions over known power generation systems that may further be sized or scaled to provide improved power distribution without adversely affecting efficiency and emissions. The need for improved power generation systems is further, or alternatively, such that issues regarding power distribution, power generation versus changing peak power demands, emissions, barriers to infrastructure development, and challenges and limitations posed by vehicle electrification may each be addressed, improved upon, or alleviated.

Small-scale or portable power generation systems are desirable for applications including space vehicles and systems, automotive drivetrain and aerospace propulsion electrification, direct cooling sources, and portable or distributed power generation such as to address issues regarding power generation efficiency, density, and output. However, there is a need for improved thermal efficiency, electrical conversion efficiency, or both, for such systems.

System for Energy Conversion

Referring now to FIG. 1, an exemplary schematic block diagram depicting a system for energy conversion (hereinafter, "system A10") is provided. Various embodiments of the system A10 provided herein include systems for power generation, a heat recovery system, a heat pump or cryogenic cooler, a system including and/or acting as a bottoming cycle and/or a topping cycle, or other system for producing useful work or energy, or combinations thereof. Referring additionally for FIG. 2, various embodiments of the system A10 include a closed cycle engine apparatus (hereinafter, "engine A100", apparatus "A100", or "engine assembly C900", or otherwise denoted herein) operably coupled to a load device c092. The engine A100 contains a substantially fixed mass of an engine working fluid to which and from which thermal energy is exchanged at a respective cold side heat exchanger A42 and a hot side heat exchanger C108. In one embodiment, the engine working fluid is helium. In other embodiments, the engine working fluid may include air, nitrogen, hydrogen, helium, or any appropriate compressible fluid, or combinations thereof. In still various embodiments, any suitable engine working fluid may be utilized in accordance with the present disclosure. In exemplary embodiments, the engine working fluid may include a gas, such as an inert gas. For example, a noble gas, such as helium may be utilized as the engine working fluid. Exemplary working fluids preferably are inert, such that they generally do not participate in chemical reactions such as oxidation within the environment of the engine. Exemplary noble gasses include monoatomic gases such as helium, neon, argon, krypton, or xenon, as well as combinations of these. In some embodiments, the engine working fluid may include air, oxygen, nitrogen, or carbon dioxide, as well as combinations of these. In still various embodiments, the engine working fluid may be liquid fluids of one or more elements described herein, or combinations thereof. It should further be appreciated that various embodiments of the engine working fluid may include particles or other substances as appropriate for the engine working fluid.

In various embodiments, the load device C092 is a mechanical work device or an electric machine. In one embodiment, the load device C092 is a pump, compressor, or other work device. In another embodiment, the load device C092 as an electric machine is configured as a generator producing electric energy from movement of a piston assembly A1010 at the engine. In still another embodiment, the electric machine is configured as a motor providing motive force to move or actuate the piston assembly A1010, such as to provide initial movement (e.g., a starter motor). In still various embodiments, the electric machine defines a motor and generator or other electric machine apparatus such as described further herein.

A heater body C100 is thermally coupled to the engine A100. The heater body C100 may generally define any apparatus for producing or otherwise providing a heating working fluid such as to provide thermal energy to the engine working fluid. Various embodiments of the heater body C100 are further provided herein. Exemplary heater bodies C100 may include, but are not limited to, a combustion or detonation assembly, an electric heater, a nuclear energy source, a renewable energy source such as solar power, a fuel cell, a heat recovery system, or as a bottoming cycle to another system. Exemplary heater bodies C100 at which a heat recovery system may be defined include, but are not limited to, industrial waste heat generally, gas or steam turbine waste heat, nuclear waste heat, geothermal energy, decomposition of agricultural or animal waste, molten earth or metal or steel mill gases, industrial drying systems generally or kilns, or fuel cells. The exemplary heater body C100 providing thermal energy to the engine working fluid may include all or part of a combined heat and power cycle, or cogeneration system, or power generation system generally.

In still various embodiments, the heater body C100 is configured to provide thermal energy to the engine working fluid via a heating working fluid. The heating working fluid may be based, at least in part, on heat and liquid, gaseous, or other fluid provided by one or more fuel sources and oxidizer sources providing a fuel and oxidizer. In various embodiments, the fuel includes, but is not limited to, hydrocarbons and hydrocarbon mixtures generally, "wet" gases including a portion of liquid (e.g., humid gas saturated with liquid vapor, multiphase flow with approximately 10% liquid and approximately 90% gas, natural gas mixed with oil, or other liquid and gas combinations, etc.), petroleum or oil (e.g., Arabian Extra Light Crude Oil, Arabian Super Light, Light Crude Oil, Medium Crude Oil, Heavy Crude Oil, Heavy Fuel Oil, etc.), natural gas (e.g., including sour gas), biodiesel condensate or natural gas liquids (e.g., including liquid natural gas (LNG)), dimethyl ether (DME), distillate oil #2 (DO2), ethane ($C_2$), methane, high $H_2$ fuels, fuels including hydrogen blends (e.g., propane, butane, liquefied petroleum gas, naphtha, etc.), diesel, kerosene (e.g., jet fuel, such as, but not limited to, Jet A, Jet A-1, JP1, etc.), alcohols (e.g., methanol, ethanol, etc.), synthesis gas, coke over gas, landfill gases, etc., or combinations thereof.

In various embodiments, the system A10 includes a working fluid body C108, such as further described herein. In one embodiment, the working fluid body C108 defines a hot side heat exchanger A160, such as further described herein, from which thermal energy is output to the engine working fluid at an expansion chamber A221 of the engine. The working fluid body C108 is positioned at the expansion chamber A221 of the engine in thermal communication with the heater body C100. In other embodiments, the working fluid body C108 may be separate from the heater body C100, such that the heating working fluid is provided in thermal communication, or additionally, in fluid communication with the working fluid body C108. In particular embodiments, the working fluid body C108 is positioned in direct thermal communication with the heater body C100 and the expansion chamber A221 of the engine A100 such as to receive thermal energy from the heater body C100 and provide thermal energy to the engine working fluid within the engine.

In still various embodiments, the heater body C100 may include a single thermal energy output source to a single expansion chamber A221 of the engine. As such, the system A10 may include a plurality of heater assemblies each providing thermal energy to the engine working fluid at each expansion chamber A221. In other embodiments, such as depicted in regard to FIG. 2, the heater body C100 may provide thermal energy to a plurality of expansion chambers A221 of the engine. In still other embodiments, such as depicted in regard to FIG. 8, the heater body includes a single thermal energy output source to all expansion chambers A221 of the engine.

The system A10 further includes a chiller assembly, such as chiller assembly A40 further described herein. The chiller assembly A40 is configured to receive and displace thermal energy from a compression chamber A222 of the engine. The system A10 includes a cold side heat exchanger A42 thermally coupled to the compression chamber A222 of the closed cycle engine and the chiller assembly. In one embodiment, the cold side heat exchanger A42 and the piston body C700 defining the compression chamber A222 of the engine are together defined as an integral, unitary structure. In still various embodiments, the cold side heat exchanger A42, at least a portion of the piston body C700 defining the compression chamber A222, and at least a portion of the chiller assembly together define an integral, unitary structure.

In various embodiments, the chiller assembly A40 is a bottoming cycle to the engine A100. As such, the chiller assembly A40 is configured to receive thermal energy from the engine A100. The thermal energy received at the chiller assembly A40, such as through a cold side heat exchanger A42, or cold side heat exchanger A170 further herein, from the engine A100 is added to a chiller working fluid at the chiller assembly A40. In various embodiments, the chiller assembly A40 defines a Rankine cycle system through which the chiller working fluid flows in closed loop arrangement with a compressor. In some embodiments, the chiller working fluid is further in closed loop arrangement with an expander. In still various embodiments, the system A10 includes a heat exchanger A88 (FIG. 3). In various embodiments, the heat exchanger A188 may include a condenser or radiator. The cold side heat exchanger A40 is positioned downstream of the compressor and upstream of the expander and in thermal communication with a compression chamber A222 of the closed cycle engine, such as further depicted and described in regard to FIG. 2-FIG. 3. In various embodiments, the cold side heat exchanger A42 may generally define an evaporator receiving thermal energy from the engine A40.

Referring still to FIG. 1, in some embodiments, the heat exchanger A188 is positioned downstream of the expander and upstream of the compressor and in thermal communication with a cooling working fluid. In the schematic block diagram provided in FIG. 1, the cooling working fluid is an air source. However, in various embodiments, the cooling fluid may define any suitable fluid in thermal communication with the heat exchanger. The heat exchanger may further define a radiator configured to emit or dispense thermal energy from the chiller assembly A40. A flow of cooling working fluid from a cooling fluid source is provided in thermal communication with the heat exchanger to further aid heat transfer from the chiller working fluid within the chiller assembly A40 to the cooling working fluid.

As further described herein, in various embodiments the chiller assembly A40 may include a substantially constant density heat exchanger. The constant density heat exchanger generally includes a chamber including an inlet and an outlet each configured to contain or trap a portion of the chiller working fluid for a period of time as heat from the closed cycle engine is transferred to the cold side heat exchanger A42. In various embodiments, the chamber may define a linear or rotary chamber at which the inlet and the outlet are periodically opened and closed via valves or ports such as to trap the chiller working fluid within the chamber for the desired amount of time. In still various embodiments, the rate at which the inlet and the outlet of the chamber defining the constant density heat exchanger is a function at least of velocity of a particle of fluid trapped within the chamber between the inlet and the outlet. The chiller assembly A40 including the constant density heat exchanger may provide efficiencies, or efficiency increases, performances, power densities, etc. at the system A10 such as further described herein.

It should be appreciated that in other embodiments, the chiller assembly A40 of the system A10 may include a thermal energy sink generally. For example, the chiller assembly A40 may include a body of water, the vacuum of space, ambient air, liquid metal, inert gas, etc. In still various embodiments, the chiller working fluid at the chiller assembly A40 may include, but is not limited to, compressed air, water or water-based solutions, oil or oil-based solutions, or refrigerants, including, but not limited to, class 1, class 2, or class 3 refrigerants. Further exemplary refrigerants may include, but are not limited to, a supercritical fluid including, but not limited to, carbon dioxide, water, methane, ethane, propane, ethylene, propylene, methanol, ethanol, acetone, or nitrous oxide, or combinations thereof. Still exemplary refrigerants may include, but are not limited to, halon, perchloroolefin, perchlorocarbon, perfluoroolefin, perfluorocarbon, hydroolefin, hydrocarbon, hydrochloroolefin, hydrochlorocarbon, hydrofluoroolefin, hydrofluorocarbon, hydrochloroolefin, hydrochlorofluorocarbon, chlorofluoroolefin, or chlorofluorocarbon type refrigerants, or combinations thereof. Still further exemplary embodiments of refrigerant may include, but are not limited to, methylamine, ethylamine, hydrogen, helium, ammonia, water, neon, nitrogen, air, oxygen, argon, sulfur dioxide, carbon dioxide, nitrous oxide, or krypton, or combinations thereof.

It should be appreciated that where combustible or flammable refrigerants are included for the chiller working fluid, various embodiments of the system A10 may beneficially couple the heater body C100, and/or the fuel source, and the chiller assembly A40 in fluid communication such that the combustible or flammable working fluid to which thermal energy is provided at the chiller assembly A40 may further be utilized as the fuel source for generating heating working fluid, and the thermal energy therewith, to output from the heater body C100 to the engine working fluid at the engine A100.

Various embodiments of the system A10 include control systems and methods of controlling various sub-systems disclosed herein, such as, but not limited to, the fuel source, the oxidizer source, the cooling fluid source, the heater body C100, the chiller assembly C40, the engine A100, and the load device C092, including any flow rates, pressures, temperatures, loads, discharges, frequencies, amplitudes, or other suitable control properties associated with the system A10. In one aspect, a control system for the system A10 defining a power generation system is provided. The power generation system includes one or more closed cycle engines (such as engine A100), one or more load devices defining electric machines (such as load device C092) operatively coupled to the engine, and one or more energy storage devices in communication with the electric machines.

The control system can control the closed cycle engine and its associated balance of plant to generate a temperature differential, such as a temperature differential at the engine working fluid relative to the heating working fluid and the chiller working fluid. Thus, the engine defines a hot side, such as at the expansion chamber A221, and a cold side, such as at the compression chamber A222. The temperature differential causes free piston assemblies A1010 to move within their respective piston chambers defined at respective piston bodies C700. The movement of the pistons A1011 causes the electric machines to generate electrical power. The generated electrical power can be provided to the energy storage devices for charging thereof. The control system monitors one or more operating parameters associated with the closed cycle engine, such as piston movement (e.g., amplitude and position), as well as one or more operating parameters associated with the electric machine, such as voltage or electric current. Based on such parameters, the control system generates control commands that are provided to one or more controllable devices of the system A10. The controllable devices execute control actions in accordance with the control commands. Accordingly, the desired output of the system A10 can be achieved.

Furthermore, the control system can monitor and anticipate load changes on the electric machines and can control the engine A100 to anticipate such load changes to better maintain steady state operation despite dynamic and sometimes significant electrical load changes on the electric machines. A method of controlling the power generation system is also provided. In another aspect, a control system for a heat pump system is provided. The heat pump system includes one or more of the closed cycle engines described herein. A method of controlling the heat pump system is also provided. The power generation and heat pump systems as well as control methods therefore are provided in detail herein.

Energy Conversion Apparatus

Figure 2:
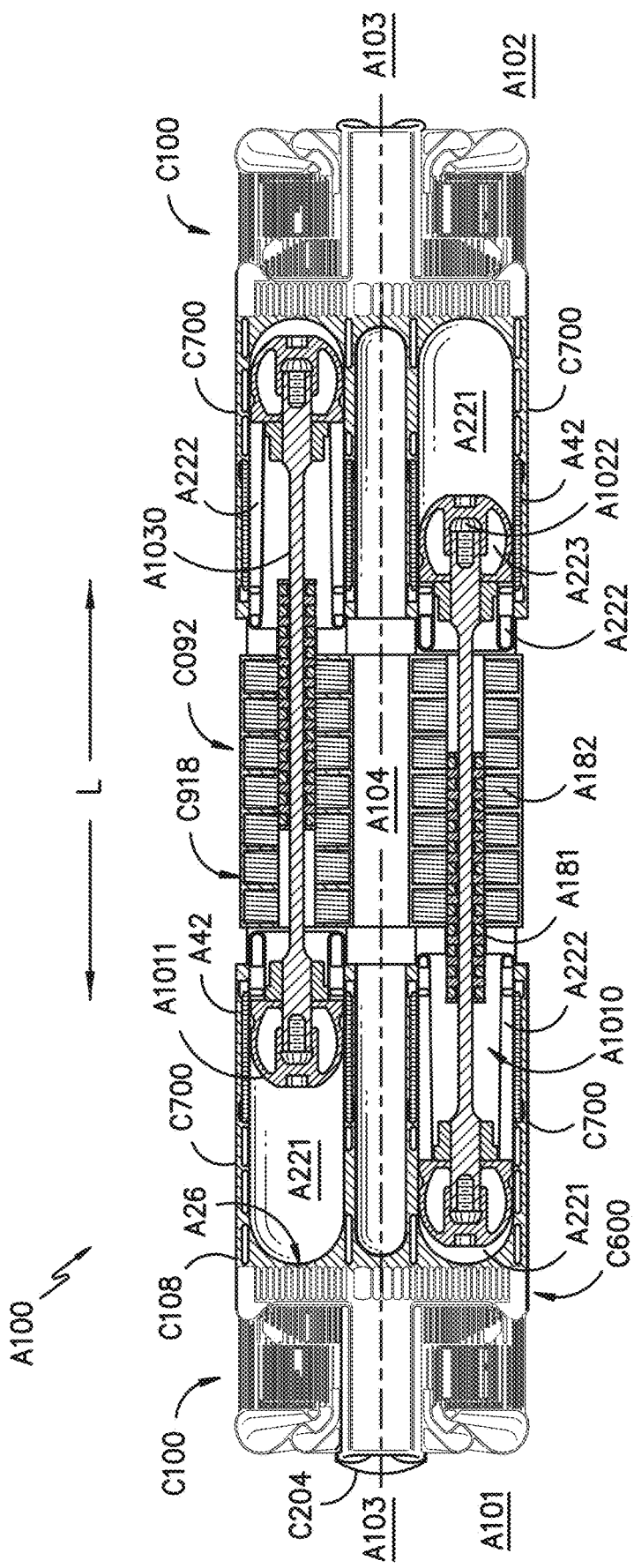
FIG. 2 is a cross sectional view of an exemplary embodiment of a closed cycle engine and load device according to an aspect of the present disclosure.
Figure 3:
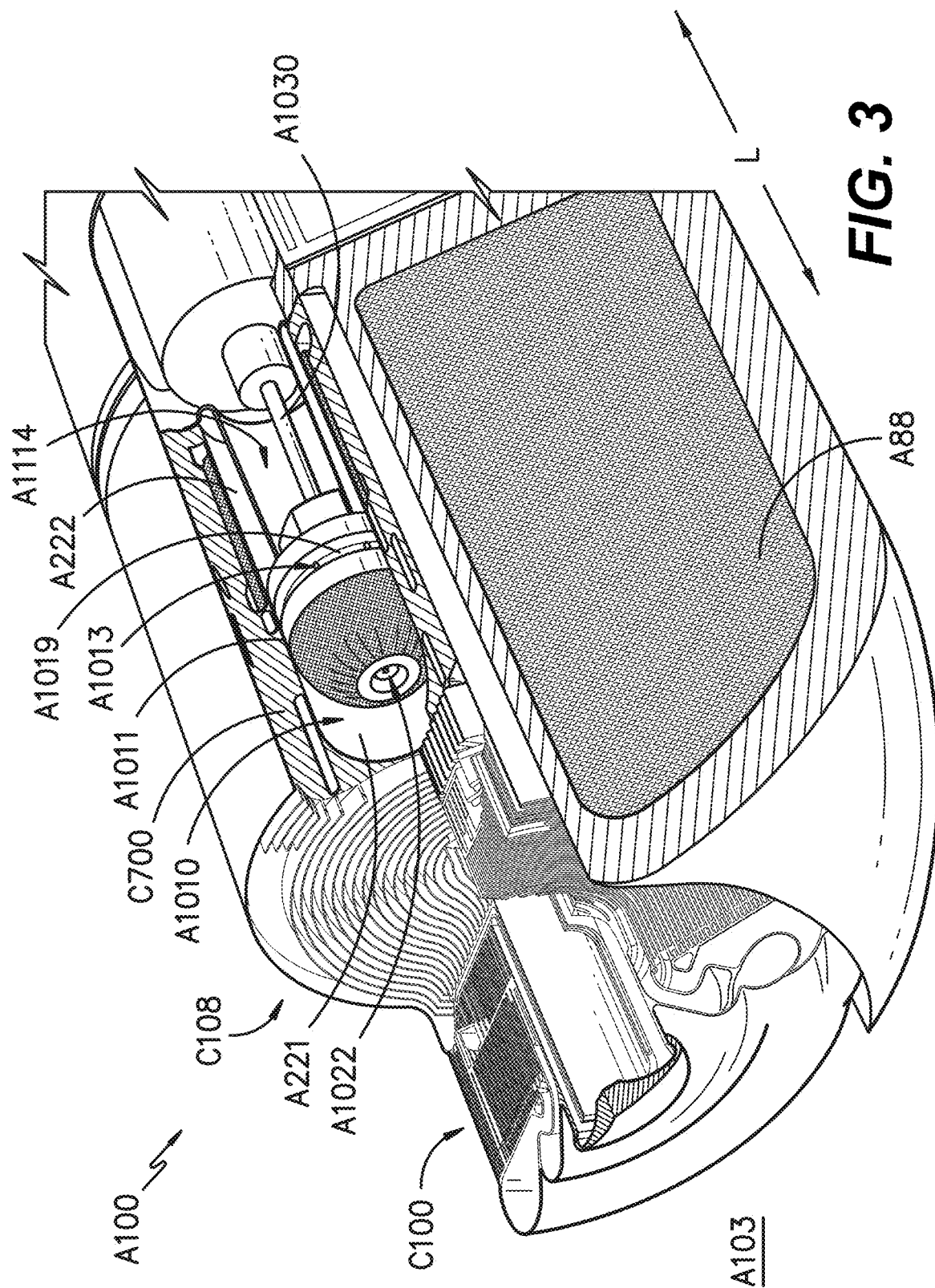
FIG. 3 is a perspective cutaway view of an exemplary portion of an exemplary embodiment of an engine according to an aspect of the present disclosure.
Figure 4:
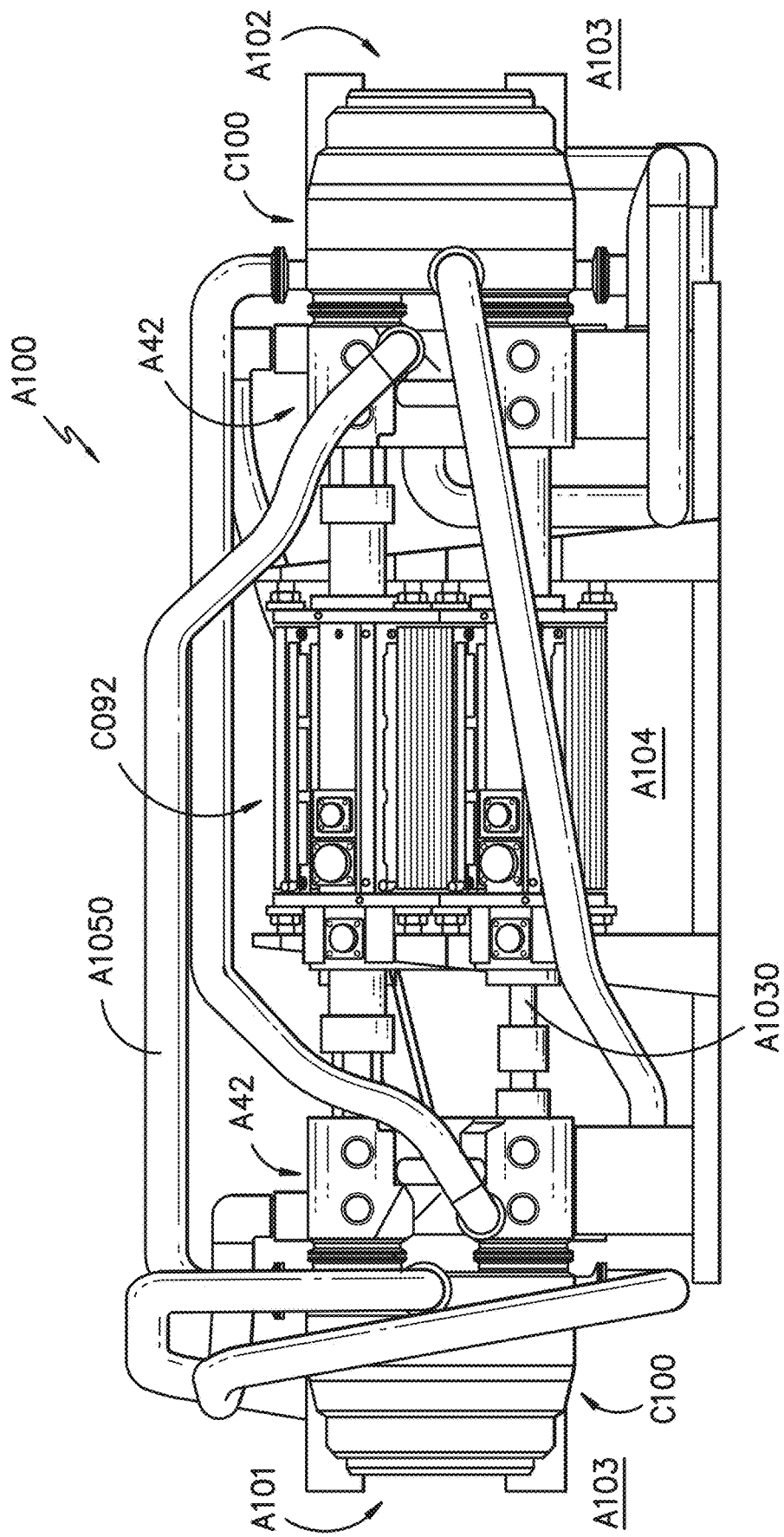
FIG. 4 is a side view of an exemplary embodiment of a portion of an engine according to an aspect of the present disclosure.

Referring now to FIG. 2-FIG. 3, exemplary embodiments of the system A10 are further provided. FIG. 2 is an exemplary cross sectional view of the system A10 including the heater body C100 and the chiller assembly A40 each in thermal communication with the engine A100, or particularly the engine working fluid within the engine A100, such as shown and described according to the schematic block diagram of FIG. 1. FIG. 3 is an exemplary cutaway perspective view of a portion of the engine A100. The system A10 includes a closed cycle engine A100 including a piston assembly A1010 positioned within a volume or piston chamber defined by a wall defining a piston body C700. The volume within the piston body C700 is separated into a first chamber, or hot chamber, or expansion chamber A221 and a second chamber, or cold chamber (relative to the hot chamber), or compression chamber A222 by a piston A1011 of the piston assembly A1010. The expansion chamber A221 is positioned thermally proximal to the heater body C100 relative to the compression chamber A222 thermally distal to the heater body C100. The compression chamber A222 is positioned thermally proximal to the chiller assembly A40 relative to the expansion chamber A221 thermally distal to the chiller assembly A40.

In various embodiments, the piston assembly A1010 defines a double-ended piston assembly A1010 in which a pair of pistons A1011 is each coupled to a connection member A1030. The connection member A1030 may generally define a rigid shaft or rod extended along a direction of motion of the piston assembly A1010. In other embodiments, the connection members A1030 includes one or more springs or spring assemblies, such as further provided herein, providing flexible or non-rigid movement of the connection member A1030. In still other embodiments, the connection member A1030 may further define substantially U- or V-connections between the pair of pistons A1011.

Each piston A1011 is positioned within the piston body C700 such as to define the expansion chamber A221 and the compression chamber A222 within the volume of the piston body C700. The load device c092 is operably coupled to the piston assembly A1010 such as to extract energy therefrom, provide energy thereto, or both. The load device c092 defining an electric machine is in magnetic communication with the closed cycle engine via the connection member A1030. In various embodiments, the piston assembly A1010 includes a dynamic member A181 positioned in operable communication with a stator assembly A182 of the electric machine. The stator assembly A182 may generally include a plurality of windings wrapped circumferentially relative to the piston assembly A1010 and extended along a lateral direction L. In one embodiment, such as depicted in regard to FIG. 2, the dynamic member A181 is connected to the connection member A1030. The electric machine may further be positioned between the pair of pistons A1011 of each piston assembly A1010. Dynamic motion of the piston assembly A1010 generates electricity at the electric machine. For example, linear motion of the dynamic member A181 between each pair of chambers defined by each piston A1011 of the piston assembly A1010 generates electricity via the magnetic communication with the stator assembly A182 surrounding the dynamic member A181.

Referring to FIG. 2-FIG. 3, in various embodiments, the working fluid body C108 may further define at least a portion of the expansion chamber A221. In one embodiment, such as further described herein, the working fluid body C108 defines a unitary or monolithic structure with at least a portion of the piston body C700, such as to define at least a portion of the expansion chamber A221. In some embodiments, the heater body C100 further defines at least a portion of the working fluid body C108, such as to define a unitary or monolithic structure with the working fluid body C108, such as further described herein. In one embodiment, the system A10 includes the hot side heat exchanger or working fluid body C108 positioned between the heater body C100 and the expansion chamber A221 of the piston body C700. In various embodiments, the working fluid body C108 includes a plurality of heater conduits or working fluid pathways C110 extended from the expansion chamber A221.

The engine A100 defines an outer end A103 and an inner end A104 each relative to a lateral direction L. The outer ends A103 define laterally distal ends of the engine A100 and the inner ends 104 define laterally inward or central positions of the engine A100. In one embodiment, such as depicted in regard to FIG. 2-FIG. 3, the heater body C100 is positioned at outer ends A103 of the system A10. The piston body C700 includes a dome structure A26 at the expansion chamber A221. The expansion chamber dome structure A26 s provides reduced surface area heat losses across the outer end A103 of the expansion chamber A221. In various embodiments, the pistons A1011 of the piston assembly A1010 further include domed pistons A1011 corresponding to the expansion chamber A221 dome. The dome structure A26, the domed piston A1011, or both may provide higher compressions ratios at the chambers A221, A222, such as to improve power density and output.

The chiller assembly A40 is positioned in thermal communication with each compression chamber A222. Referring to FIG. 2-FIG. 3, the chiller assembly A40 is positioned inward along the lateral direction L relative to the heater body C100. In one embodiment, the chiller assembly A40 is positioned laterally between the heater body C100 and the load device c092 along the lateral direction L. The chiller assembly A40 provides the chiller working fluid in thermal communication with the engine working fluid at the cold side heat exchanger A42 and/or compression chamber A222. In various embodiments, the piston body C700 defines the cold side heat exchanger A42 between an inner volume wall A46 and an outer volume wall A48 surrounding at least the compression chamber A222 portion of the piston body C700.

In various embodiments, such as depicted in regard to FIG. 2-FIG. 3, the load device c092 is positioned at the inner end A104 of the system A10 between laterally opposing pistons A1011. The load device c092 may further include a machine body c918 positioned laterally between the piston bodies C700. The machine body c918 surrounds and houses the stator assembly A182 of the load device c092 defining the electric machine. The machine body c918 further surrounds the dynamic member A181 of the electric machine attached to the connection member A1030 of the piston assembly A1010. In various embodiments, such as depicted in regard to FIG. 2-FIG. 3, the machine body c918 further provides an inner end wall A50 at the compression chamber A222 laterally distal relative to the expansion chamber A221 dome.

In various embodiments, the compression chamber A222 of one piston assembly A1010 is fluidly connected to the expansion chamber A221 of another piston assembly A1010 via the walled conduit A1050 to provide a balanced pressure and/or balanced phase fluid coupling arrangement of the plurality of chambers A221, A222. An interconnected volume of chambers including the expansion chamber A221 of one piston assembly A1010 and the compression chamber A222 of another piston assembly A1010 defines a fluid interconnection of the chambers A221, A222 at different piston assemblies A1010. The fluid interconnection of chambers A221, A222 at different piston assemblies is such that if there is any fluid communication or fluid leakage path between the expansion chamber A221 and the compression chamber A222 of the same piston assembly A1010, a single fluid loop of connected chambers A221, A222 is provided that is separated from the chambers A221, A222 outside of the interconnected volume of chambers. In one embodiment, the balanced pressure arrangement, or additionally, the balance phase arrangement, of the piston assemblies A1010 is the fluid interconnection of the walled conduits A1050 and the chambers A221, A222 such that the chambers within the interconnected volume are substantially fluidly and/or pneumatically separated from those outside of the interconnected volume to provide a substantially equal and opposite force relative to one another to at least one piston assembly A1010 when the engine working fluid within the chambers A221, A222 is at a uniform temperature. Stated differently, when one piston assembly A1010 is articulated, such as along the lateral direction L, the fluid interconnection of chambers A221, A222 via the walled conduit A1050 provides a substantially net zero force at another piston assembly A1010 when the engine working fluid is at a substantially uniform temperature. As such, when one piston assembly A1010 is articulated under such conditions, adjacent or other piston assemblies A1010 remain stationary due at least to the net zero force at the piston assembly A1010. In various embodiments, the substantially uniform temperature is defined when no heat input or thermal energy is provided from the heater body C100 or working fluids body C108 to the engine working fluid.

Engine Chamber to Chamber Conduits Arrangements

The cross sectional view provided in FIG. 2 is cut along the lateral direction L such as to depict two of four piston assemblies A1010 of the system A10. In various embodiments, the system A10 provided in regard to FIG. 2 further includes the walled conduits A1050 disposed inward of the piston bodies C700 proximate to the reference longitudinal axis C204. In other embodiments, the system A10 provided in regard to FIG. 2 further includes the walled conduits A1050 disposed outward of the piston bodies C700, such as shown and described in regard to FIG. 4 through FIG. 7.

Referring to FIG. 4 through FIG. 7, side, end, and perspective views of a portion of the system A10 are provided. The embodiments provided in regard to FIG. 4 through FIG. 7 are configured substantially similarly as shown and described in regard to FIG. 2-FIG. 3. In regard to FIG. 4-FIG. 7, the portions of the system A10 depicted therein include four piston assemblies A1010 positioned within eight respective piston bodies C700. The piston bodies C700 may generally include the first volume wall and the second volume wall shown and described in regard to FIG. 2-FIG. 3. The piston bodies C700 may generally define cylinders into which pistons A1011 of the piston assembly A1010 are each positioned such as to define the expansion chamber A221 and the compression chamber A222 within each piston body C700. However, it should be appreciated that other suitable geometries of the piston body C700 containing the piston A1011 may be utilized.

The engine A100 further includes a plurality of walled conduits A1050 connecting particular chambers A221, A222 of each piston body C700 (FIG. 2) such as to define a balanced pressure arrangement of the pistons A1011. In various embodiments, the engine A100 includes at least one interconnected volume of chambers A221, A222 such as described herein. In one embodiment, such as depicted in regard to FIG. 4-FIG. 7, the engine A100 includes two interconnected volumes in which each interconnected volume includes an expansion chamber A221 of a first piston body C700 of a first piston assembly A1010 connected in fluid communication of the engine working fluid with a compression chamber A222 of a second piston body C700 of a second piston assembly A1010 each connected by a conduit A1050. More particularly, the balanced pressure arrangement of piston assemblies A1010 depicted in regard to FIG. 4-FIG. 7 includes two interconnected volumes each substantially fluidly separated from one another and/or substantially pneumatically separated from one another. The fluidly separated and/or pneumatically separated arrangement of chambers A221, A222 into the interconnected volume, and those chambers A221, A222 outside of the interconnected volume or in another interconnected volume, is particularly provided via the arrangement of expansion chambers A221 connected to compression chambers A222 via the walled conduits A1050 such as further described herein.

Figure 5:
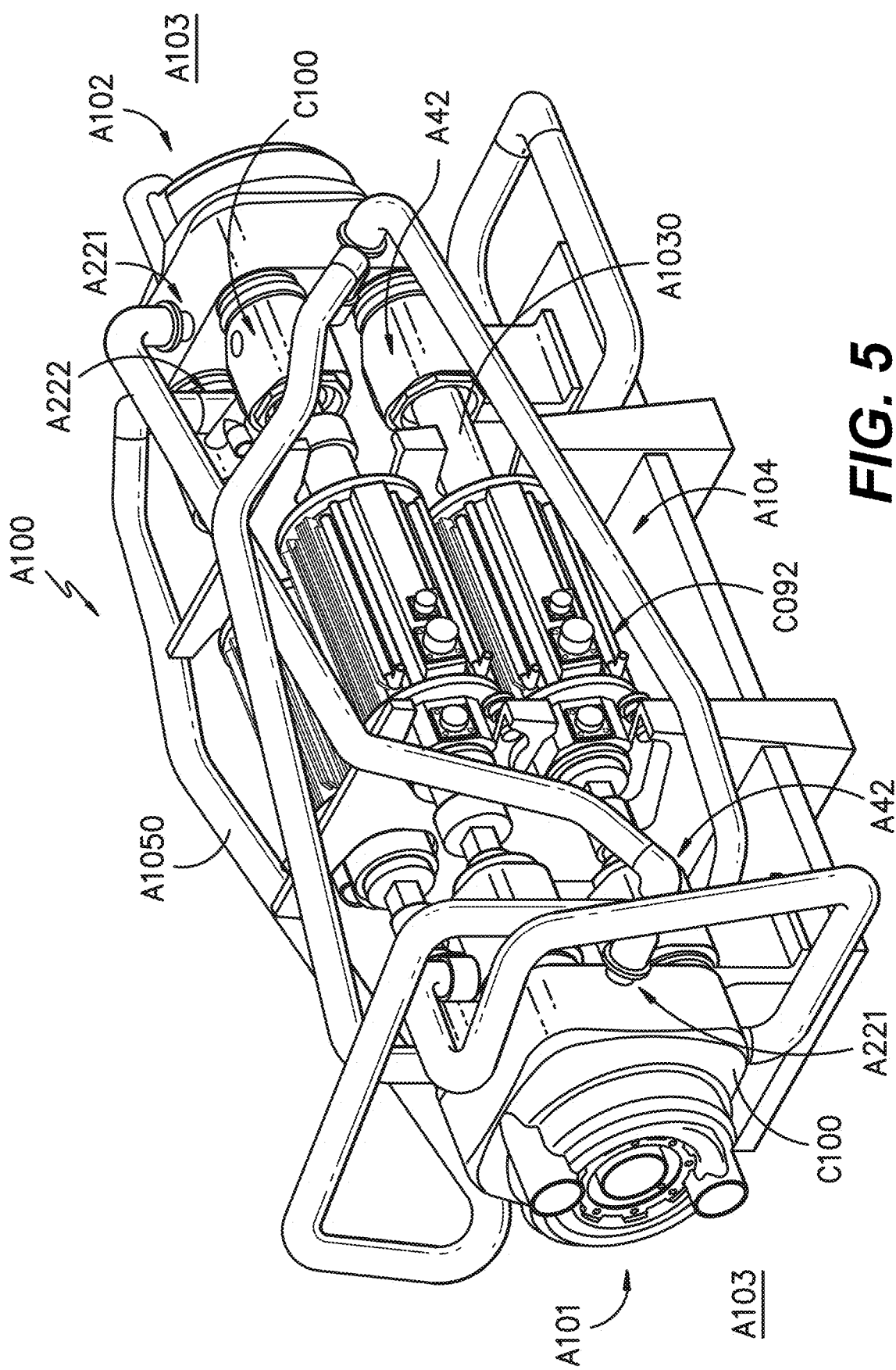
FIG. 5 is a perspective view of an exemplary embodiment of a portion of an engine such as provided in regard to FIG. 4.
Figure 6:
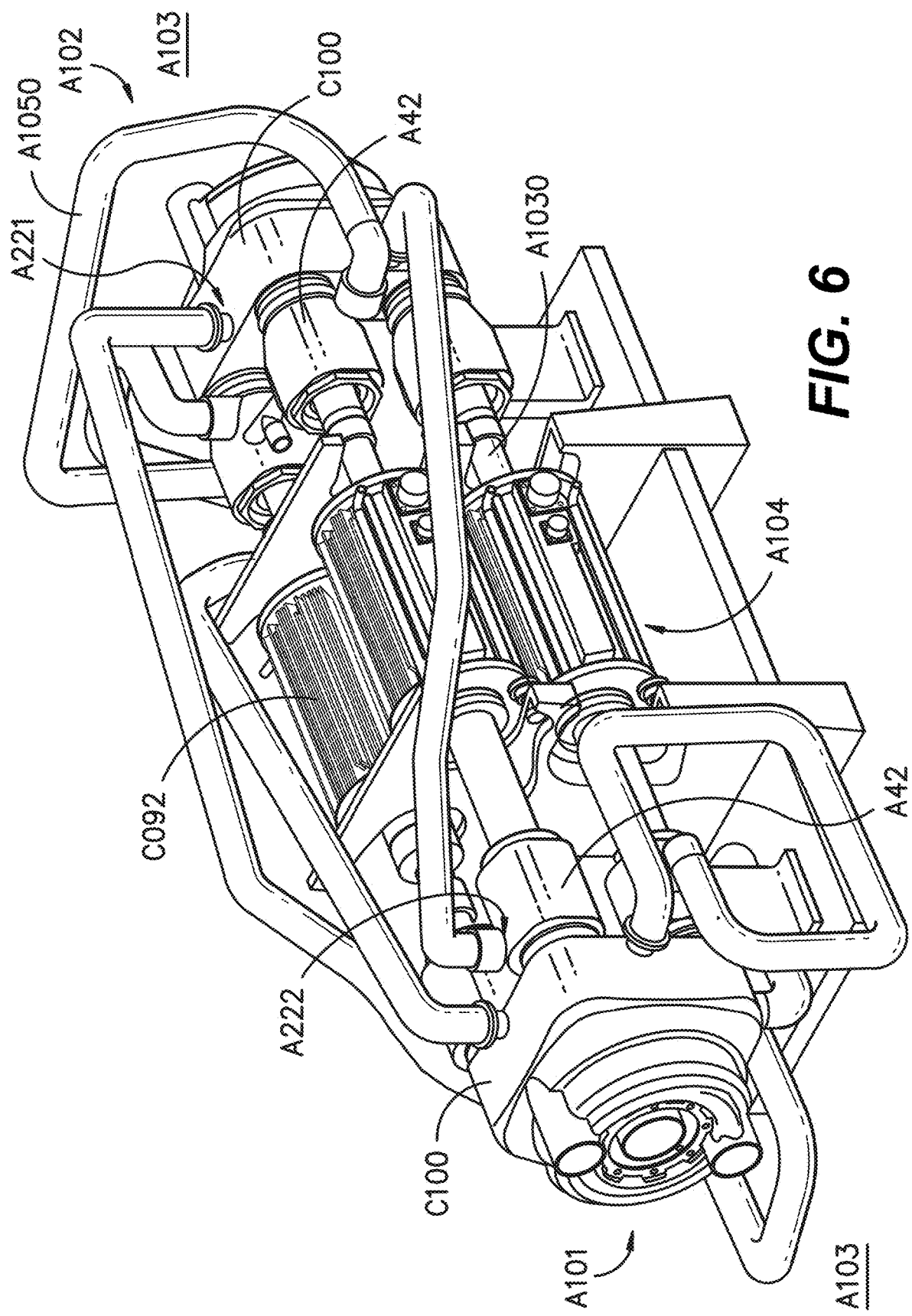
FIG. 6 is another perspective view of an exemplary embodiment of a portion of an engine such as provided in regard to FIG. 4 through FIG. 5.
Figure 7:
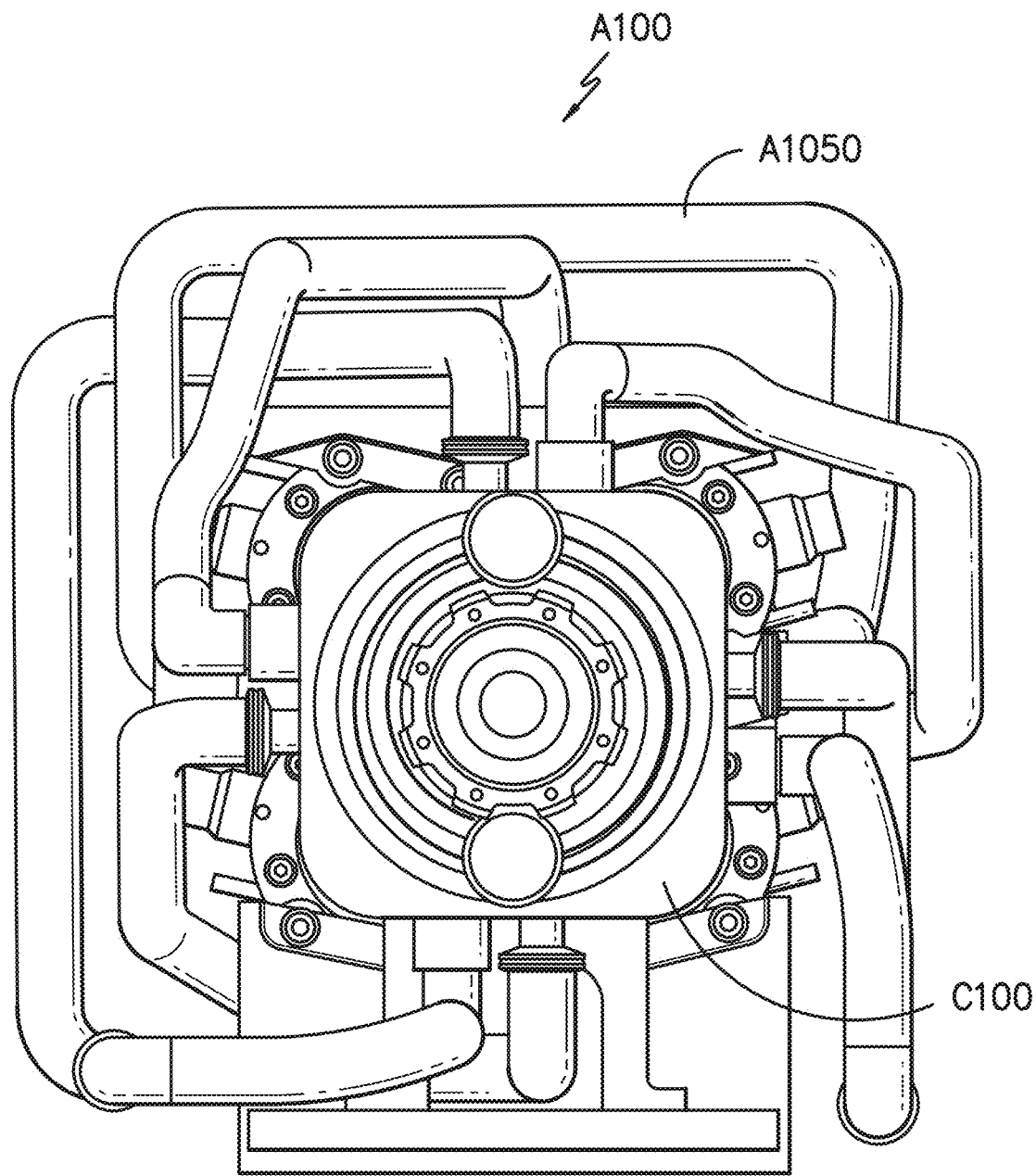
FIG. 7 is an end view of an exemplary embodiment of a portion of an engine such as provided in regard to FIG. 4 through FIG. 5.

In various embodiments, the interconnected volume includes pairs of the expansion chamber A221 fluidly coupled to the compression chamber A222 each defined at laterally separated ends of the piston assemblies A1010. In one embodiment, the engine A100 defines a first end 101 separated along the lateral direction L by the connection member A1030 from a second end 102, such as depicted in FIG. 5 and FIG. 6. Each end of the engine A100 defines an expansion chamber A221 and a compression chamber A222 at each piston A1011 of each piston assembly A1010. The engine A100 depicted in FIG. 4-FIG. 7, and further in regard to FIG. 2, includes the expansion chamber A221 at one end connected to a respective compression chamber A222 at another end via respective conduits. In one embodiment, such as depicted in FIGS. 5 and 6, the engine A100 includes two expansion chambers A221 at the first end 101 each connected to respective compression chambers A222 at the second end 102 via respective conduits A1050. The engine A100 further includes two expansion chambers A221 at the second end 102 each connected to respective compression chamber A222 at the first end 101 via respective conduits A1050. The system A10 further includes four expansion chambers A221 at one end each connected to respective compression chambers A222 at the same end via respective conduits A1050. In one embodiment, the system A10 includes two expansion chambers A221 at the first end 101 each connected to respective compression chambers A222 at the first end 101 via respective walled conduits A1050. The system A10 further includes two expansion chambers A221 at the second end 102 each connected to respective compression chambers A222 at the second end 102 via respective walled conduits A1050.

In one embodiment, the engine includes four piston assemblies A1010 extended along the lateral direction L and in circumferential arrangement relative to the reference longitudinal axis C204. The piston assemblies A1010 may be positioned equidistant to one another around the reference longitudinal axis C204. In one embodiment, a pair of the heater body is positioned at outer ends A103 of the engine. The heater body is positioned proximate to the expansion chamber A221 and distal to the compression chamber A222. Each heater body may be positioned and configured to provide a substantially even flow of thermal energy to four hot side heat exchangers 160 or expansion chambers A221 at a time.

In general, the exemplary embodiments of system A10 and engine, or portions thereof, described herein may be manufactured or formed using any suitable process. However, in accordance with several aspects of the present subject matter, some or all of system A10 may be formed using an additive manufacturing process, such as a 3-D printing process. The use of such a process may allow portions of the system A10 to be formed integrally, as a single monolithic component, or as any suitable number of sub-components. In various embodiments, the manufacturing process may allow the all or part of the heater body, the chiller assembly, the load device c092, or the engine to be integrally formed and include a variety of features not possible when using prior manufacturing methods. For example, the additive manufacturing methods described herein provide the manufacture of the system A10 having unique features, configurations, thicknesses, materials, densities, and structures not possible using prior manufacturing methods. Some of these novel features can, for example, improve thermal energy transfer between two or more components, improve thermal energy transfer to the engine working fluid, improve thermal energy transfer from the engine working fluid to the chiller working fluid, reduce leakages, or facilitate assembly, or generally improve thermal efficiency, power generation and output, or power density of the system A10 using an additive manufacturing process as described herein.

Balance of Plant

In one aspect, example embodiments of a balance of plant for a prime power generator are provided. A balance of plant for a power generation system can be described as the supporting components and systems of the prime power generator of the system. In some embodiments, the prime power generator of the system can be any of the closed cycle engines provided herein. For instance, any of the embodiments of the balance of plant described herein can be employed with any of the Stirling engines provided herein. In other embodiments, the prime power generator can a solid oxide fuel cell. In further embodiments, the balance of plant embodiments described herein can be employed with any suitable prime power generator.

The balance of plant embodiments of the various power generation systems described herein can include various features for recovering heat generated by the prime power generator and utilizing the recovered heat in some useful way. For example, heat recovered from the prime power generator can be used to produce useful work. The useful work can be utilized to drive components of the balance of plant, such as compressors, pumps, blowers, etc. The recovered heat can also be recirculated to the prime power generator, e.g., to improve the efficiency thereof. Furthermore, in some embodiments, the useful work can cause one or more electric machines to generate electrical power. In addition, recovered heat can be provided to one or more thermal applications in thermal communication with components of the balance of plant. The one or more thermal applications can utilize the recovered heat in any suitable fashion. The provided heat can improve the efficiency of the one or more thermal applications.

In another aspect, various embodiments of Notarniocla cycle systems and components therefore are provided. Generally, the Notarnicola cycle systems described herein are operable to produce useful work. The so-called Notarnicola cycle systems operate on a Notarnicola cycle, or stated differently, on a constant density heat addition principle. For instance, the Notarnicola cycle systems described herein can include a constant density heat exchanger operable to hold a volume of working fluid at constant density during heat application. By applying heat to a working fluid held at constant density, the temperature and pressure of the working fluid can be increased and thus its potential energy can be increased as well. Advantageously, the increased potential energy of the working fluid can allow for an expansion device or the like to extract more useful work therefrom. In some embodiments, the Notarnicola cycle can include a Wrankel device, or constant density heat exchanger/expansion device, for producing and extracting useful work. The Notarnicola cycle system can be a bottoming-cycle for a closed cycle engine, such as any one of the engines described herein or as a standalone system for producing useful work and/or electrical power.

Notarnicola Cycle System

Figure 8:
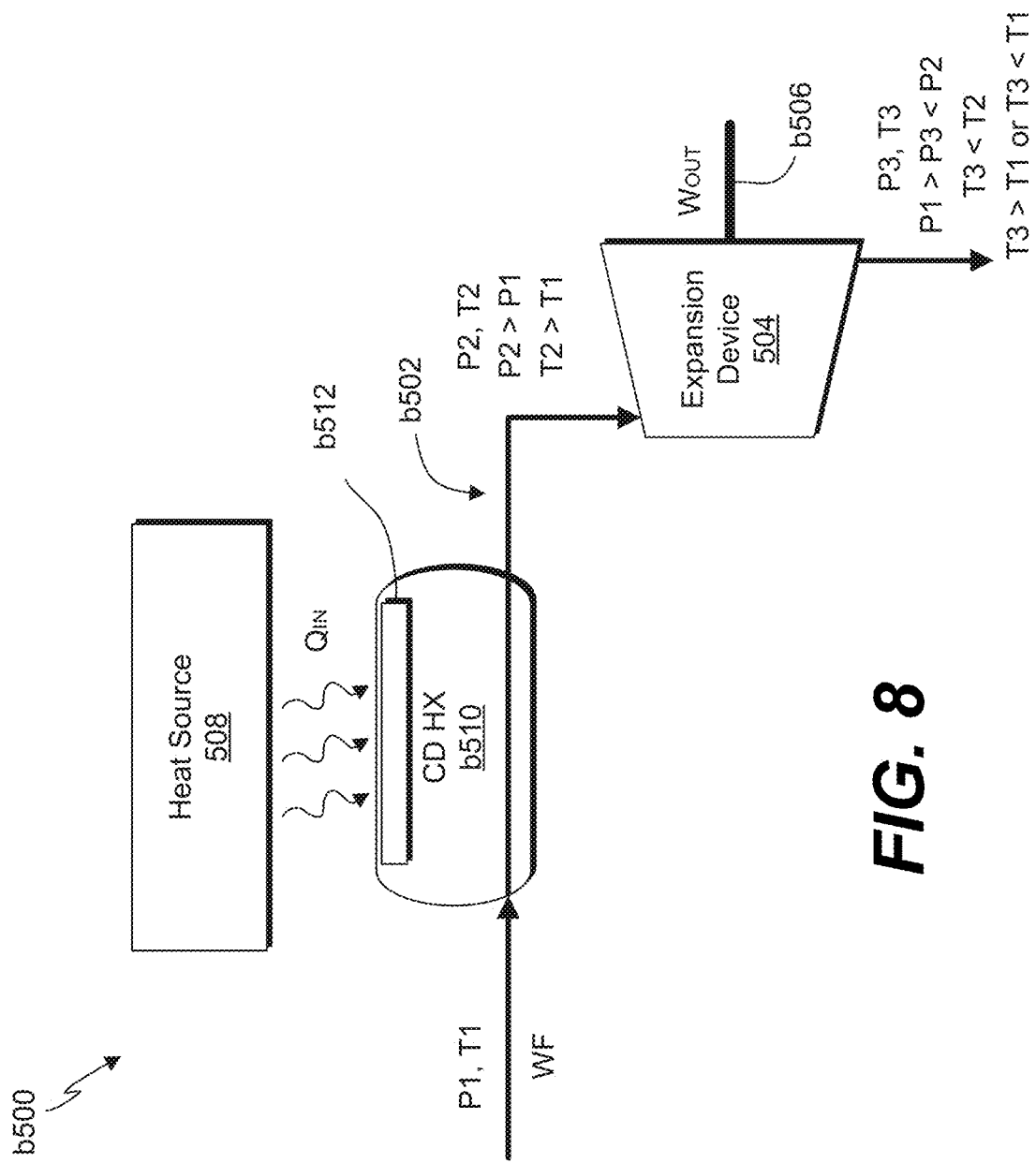
FIG. 8 provides a schematic view of a Notarnicola cycle system operable to produce useful work according to an example embodiment of the present disclosure.

FIG. 8 provides a schematic view of a Notarnicola cycle system b500 operable to produce useful work according to an example embodiment of the present disclosure. For this embodiment, the system is a so-called Notarnicola cycle system b500 that operates on a Notarnicola cycle, or stated differently, on a constant density heat addition principle as will be explained further below.

The system b500 includes a loop b502. For this embodiment, the loop b502 is an open loop. In other embodiments, however, the loop b502 can be a closed loop. The system b500 includes various elements positioned along the loop b502. Particularly, a constant density heat exchanger b510 and an expansion device b504 are positioned along the loop b502. The expansion device b504 is positioned downstream of the constant density heat exchanger b510. The expansion device b504 can be any suitable type of expansion device b504, such as a turbine rotatable about an axis of rotation. A working fluid WF is movable through or along the loop b502. Specifically, the working fluid WF is movable through the constant density heat exchanger b510 and the expansion device b504 and then can be exhausted from the system or directed to one or more thermal applications b140 positioned downstream of the expansion device b504 along the loop b502. The working fluid WF can be supercritical fluid, such as e.g., supercritical carbon dioxide. In other embodiments, the working fluid WF can be any suitable working fluid. A pump can be positioned along the loop b502 for moving the working fluid WF through the loop b502. For instance, the pump can be positioned upstream of the constant density heat exchanger b510. Alternatively, the working fluid WF can be moved through the loop b502 passively as shown in FIG. 8.

The constant density heat exchanger b510 is positioned in thermal communication with a heat source b508. That is, the constant density heat exchanger b510 is positioned in a heat exchange relationship with the heat source b508. The heat source b508 can be any suitable type of heat source b508, such as the cold side b114 and/or hot side b112 of a closed cycle engine b110 (e.g., one of the Stirling engines described herein), solar energy, geothermal energy, wind energy, a turbine engine, an internal combustion engine, a battery or battery system, a braking system, some combination thereof, etc. In some embodiments, the heat source b508 in thermal communication with the constant density heat exchanger b510 can be switched or otherwise changed. For instance, the heat source b508 in thermal communication with the constant density heat exchanger b510 can be switched between a closed cycle engine b110 and solar energy. As shown, the heat source b508 gives off heat and the heat is captured by a heat sink b512 of the constant density heat exchanger b510, denoted by $Q_{IN}$ in FIG. 8. The captured heat imparts thermal energy to the working fluid WF flowing through the constant density heat exchanger b510 while the density of the working is held constant or fixed for a predetermined heating time, as will be explained more fully below.

The constant density heat exchanger b510 is operatively configured to hold a volume of the working fluid WF at constant density during heat application. Stated another way, the constant density heat exchanger b510 is operable to hold a volume of working fluid WF at a fixed density while increasing, via the heat source b508, the temperature and pressure of the working fluid WF. For instance, as depicted in FIG. 8, the constant density heat exchanger b510 is operable to hold the volume of working fluid WF at a fixed density while increasing, via the heat source b508, i) the temperature of the working fluid WF such that an outlet temperature T2 of the working fluid WF is greater than the inlet temperature T1 of the working fluid WF; and ii) the pressure of the working fluid WF such that an outlet pressure P2 of the working fluid WF is greater than the inlet pressure P1 of the working fluid WF. In some embodiments, the constant density heat exchanger b510 can superheat the working fluid WF. Furthermore, by increasing the pressure of the working fluid WF in addition to increasing the temperature of the working fluid WF, the potential energy of the working fluid WF can be increased, e.g., beyond what is achievable by only heating the working fluid WF, and thus, more useful work can be extracted, e.g., by the expansion device b504. Further, as will be explained below, a working chamber of the constant density heat exchanger b510 is configured to iteratively receive volumes of working fluid. In some embodiments, at least one of the volumes of working fluid received within the working chamber is held at constant density during heat application. In yet other embodiments, each volume of working fluid received within the working chamber is held at constant density during heat application.

FIGS. 9 and 10 provide schematic close-up views of one embodiment of a constant density heat exchanger b510 that can be utilized in the system of FIG. 8. In some embodiments, the system b500 (FIG. 8) includes one or more flow control devices. For instance, as depicted, the one or more flow control devices can include an inlet flow control device b514 and an outlet control device b516. The inlet flow control device b514 is positioned at an inlet b518 of a working chamber b524 defined by a housing b522 of the constant density heat exchanger b510. The outlet flow control device b516 is positioned at an outlet b520 of the working chamber b524. The one or more flow control devices b514, b516 are communicatively coupled with one or more controllers b526. The one or more flow control devices b514, b516 can be communicatively coupled with the one or more controllers b526 in any suitable manner, such as e.g., by one or more suitable wireless or wired communication links. The one or more controllers b526 are operatively configured to control the one or more flow control devices b514, b516. For instance, the one or more controllers b526 can send one or more command signals to the flow control devices, e.g., to move them to respective open positions or to respective closed positions. For instance, in FIG. 9, the flow control devices are shown in an open position in which the working fluid WF can flow into an out of the working chamber b524, and in contrast, in FIG. 10, the flow control devices are shown in a closed position in which the working fluid WF can neither flow into nor out of the working chamber b524.

An example heating cycle at constant or fixed density will now be described. As shown in FIG. 9, the one or more controllers b526 cause the inlet flow control device b514 and the outlet flow control device b516 to move to their respective open positions such that a volume of working fluid WF can flow out of the working chamber b524 (e.g., from a previous cycle) and a new volume of working fluid WF can flow into the working chamber b524. The one or more controllers b526 can cause the inlet flow control device b514 and the outlet flow control device b516 to move to their respective open positions substantially simultaneously. In yet other embodiments, the one or more controllers b526 can cause the outlet flow control device b516 and the inlet flow control device b514 to move to their respective open positions in such a way that one flow control device is opened a predetermined lag time behind the other. For instance, the one or more controllers b526 can cause the outlet flow control device b516 to move to the open position a predetermined lag time prior to causing the inlet flow control device b514 to move to the open position, or vice versa.

After the inlet flow control device b514 and outlet flow control device b516 are open for a predetermined open time or upon the working chamber b524 reaching a preselected volume of working fluid WF, the one or more controllers b526 cause the inlet flow control device b514 and the outlet flow control device b516 to move to their respective closed positions, e.g., as shown in FIG. 10. Notably, with the inlet flow control device b514 and the outlet flow control device b516 moved to their respective closed positions, the density of the working fluid WF within the working chamber b524 is held constant or fixed. That is, the working fluid WF is held at a constant density. As the working fluid WF is held at constant density, the heat source b508 (e.g., the heat source b508 of FIG. 8) applies heat to the working fluid WF within the working chamber b524. As noted above, the application of heat to the working fluid WF held at constant density increases the temperature and pressure of the working fluid WF, thereby increasing its potential energy.

After heating the working fluid WF at constant density for a predetermined heating time, the one or more controllers b526 cause the inlet flow control device b514 and the outlet flow control device b516 to move to their respective open positions. As will be appreciated with reference to FIG. 9, when the flow control devices are moved to their respective open positions, the working fluid WF heated at constant density exits the working chamber b524 and flows downstream, e.g., to the expansion device b504 of FIG. 8, and a new volume of working fluid WF flows into the working chamber such that it may be subjected to applied heat at constant density. The heating cycle continues or iterates during operation of the system.

Returning to FIG. 8, as shown, the expansion device b504 is in fluid communication with the constant density heat exchanger b510 and is operable to receive heated and pressurized working fluid WF therefrom. The expansion device b504 is operable to extract thermal energy from the working fluid WF to generate useful work, as denoted by $W_{OUT}$. The extraction of thermal energy from the working fluid WF causes the pressure and temperature of the working fluid WF to decrease. For instance, as shown in FIG. 8, the temperature T3 and pressure P3 of the working fluid WF downstream of the expansion device b504 is less than the temperature T2 and pressure P2 upstream of the expansion device b504 and downstream of the constant density heat exchanger b510. The expansion of the working fluid WF can drivingly rotate the expansion device b504 about its axis of rotation. In this way, one or more elements operatively coupled with the expansion device b504, e.g., via a shaft b506, can be driven as well. In some embodiments, for example, one or more electric machines b154 can be operatively coupled with the expansion device b504, and when driven by the expansion device b504, the one or more electric machines b154 can generate electrical power. Additionally or alternatively, in some embodiments, one or more pumps, compressors, blowers, gearboxes, and/or the like can be operatively coupled with the expansion device b504 and can be driven by the expansion device b504.

Figure 11:
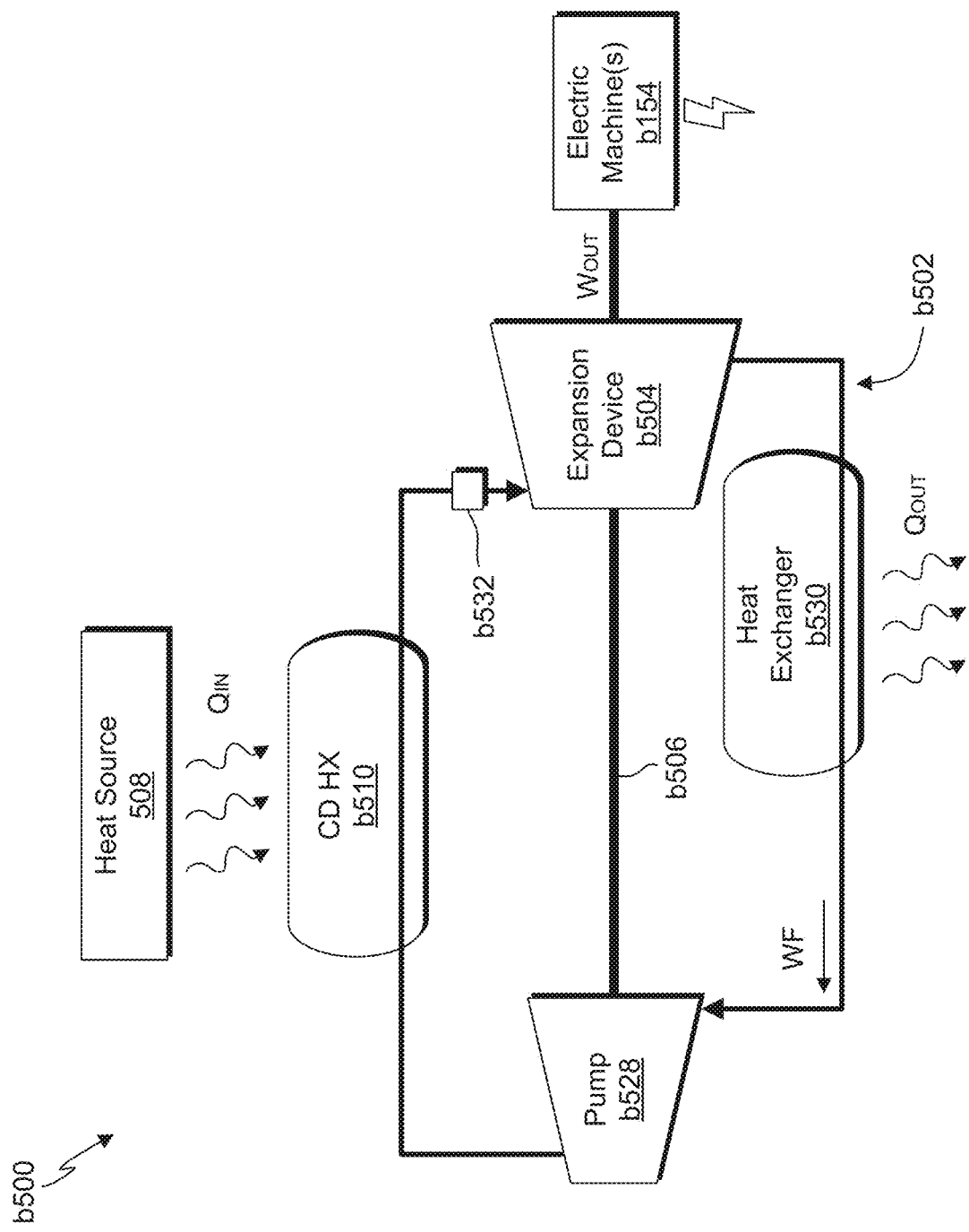
FIG. 11 provides a schematic view of another system operable to produce useful work according to an example embodiment of the present disclosure.

FIG. 11 provides a schematic view of another system operable to produce useful work according to an example embodiment of the present disclosure. For this embodiment, like the system of FIG. 8, the system is a so-called Notarnicola cycle system b500 that operates on a Notarnicola Cycle or a constant density heat addition principle.

The system includes a loop b502. For this embodiment, the loop b502 is a closed loop. The system includes various elements positioned along the loop b502. Particularly, a constant density heat exchanger b510, an expansion device b504, and a pump b528 are positioned along the loop b502. The constant density heat exchanger b510 is positioned between the expansion device b504 and the pump b528. For this embodiment, the constant density heat exchanger b510 is positioned downstream of the pump b528 and upstream of the expansion device b504. The expansion device b504 can be any suitable type of expansion device b504, such as a turbine rotatable about an axis of rotation. A working fluid WF is movable through the loop b502. The working fluid WF can be supercritical fluid, such as e.g., supercritical carbon dioxide. In other embodiments, the working fluid WF can be any suitable working fluid WF.

For this embodiment, the constant density heat exchanger b510 applies heat to a volume of working fluid WF held at constant density in the same manner as noted above with respect to the embodiment of FIG. 8. As the working fluid WF is held at constant density for a predetermined heating time during heat application, the flow of working fluid WF exiting the constant density heat exchanger b510 is effectively pulsed out of the constant density heat exchanger b510. For instance, FIG. 12 graphically depicts the mass flow rate of the working fluid WF at the outlet of the constant density heat exchanger b510 as a function of time. As noted above, the working fluid WF exiting the second heat exchanger exhibits pulse-like characteristics, which is embodied by the step wave shown in FIG. 12.

In some embodiments, as depicted in FIG. 11, the system includes one or more pulse converters b532. The one or more pulse converters b532 are positioned along the loop b502 upstream of the expansion device b504 and downstream of the constant density heat exchanger b510. Generally, the one or more pulse converters b532 are operable to smooth out or dampen the pulsed flow of working fluid WF flowing downstream from the constant density heat exchanger b510. Particularly, the one or more pulse converters b532 are operable to dampen the pulsed flow to substantially a steady-state flow. In this way, the downstream expansion device b504 can receive a substantially steady-state flow of working fluid WF. This can create a more steady useful workout by the expansion device b504 and can reduce undesirable vibration of the expansion device b504, among other benefits.

Furthermore, in some embodiments, a heat exchanger b530 is positioned along the loop b502. For this embodiment, the heat exchanger b530 is positioned downstream of the expansion device b504 and upstream of the pump b528. As shown, the heat exchanger b530 expels heat from the working fluid WF flowing along the loop b502, denoted by $Q_{OUT}$ in FIG. 11. In this way, the working fluid WF is better able to pick up or extract heat from the heat source b508 downstream thereof.

FIGS. 13 and 14 provide example pulse converters b532 that can be utilized with the system b500 of FIG. 11 and/or the system b500 of FIG. 8. As depicted in FIG. 13, in some embodiments, the one or more pulse converters b532 can be configured as a Venturi-style nozzle having a converging nozzle b534, a throat b536, and a diverging diffuser b538. In the depicted embodiment of FIG. 13, the ejector nozzle b534 converges the working fluid WF, thereby increasing the static pressure of the working fluid WF. The working fluid WF then flows through the throat b536 of the pulse converter b532 and accelerates into the diffuser b538. The working fluid WF slows as it flows along the diffuser b538 and downstream to the expansion device b504 (FIG. 11). Consequently, the pulsed flow exiting the constant density heat exchanger b510 can be smoothed out. That is, the working fluid WF exhibits a more steady state flow downstream of the pulse converter b532. Further, as depicted in FIG. 14, in some embodiments, the working fluid WF can enter the pulse converter b532 through multiple inlet conduits, such as the first inlet conduit b535 and a second inlet conduit b537. Although two inlet conduits are shown in FIG. 14, it will be appreciated that the working fluid WF can enter the pulse converter b532 through more than two inlet conduits. The multiple inlet conduits can facilitate smoothing of the working fluid WF by the pulse converter b532.

In some embodiments, at least two of the plurality of pulse converters b532 can be placed in series. In yet other embodiments, at least two of the plurality of pulse converters b532 can be placed in parallel. In some other embodiments, at least two pulse converters b532 can be placed in parallel with respect to one another and at least two pulse converters b532 can be placed in series. As noted above, such pulse converters b532 can dampen the pulsed flow of the working fluid WF exiting the constant density heat exchanger b510.

Returning to FIG. 11, as noted above, the system b500 also includes an expansion device b504 positioned downstream of the constant density heat exchanger b510. The expansion device b504 is operatively coupled with the pump b528 in this example embodiment. More specifically, the expansion device b504 is mechanically coupled with the pump b528 via a shaft b506 or shaft system. Furthermore, the expansion device b504 is in fluid communication with the constant density heat exchanger b510. The expansion device b504 is operable to extract thermal energy from the working fluid WF to generate useful work, as denoted by $W_{OUT}$. The extraction of thermal energy from the working fluid WF causes the pressure and temperature of the working fluid WF to decrease. The expansion of the working fluid WF can drivingly rotate the turbine about its axis of rotation, which in turn drives the shaft b506 and the pump b528 operatively coupled thereto. Moreover, when the shaft b506 is driven by rotation of the turbine, the useful work produced can be utilized to drive other components. In some embodiments, one or more electric machines b154 can be operatively coupled with the expansion device b504, and when driven by the expansion device b504, the one or more electric machines b154 can generate electrical power. Additionally or alternatively, in some embodiments, one or more pumps, compressors, blowers, gearboxes, electric motors, and/or the like can be operatively coupled with the expansion device b504 and can be driven by the expansion device b504. After the working fluid WF undergoes expansion at the expansion device b504, the working fluid WF flows downstream to the pump b528, where the working fluid WF is moved through the loop b502 once again.

Figure 15:
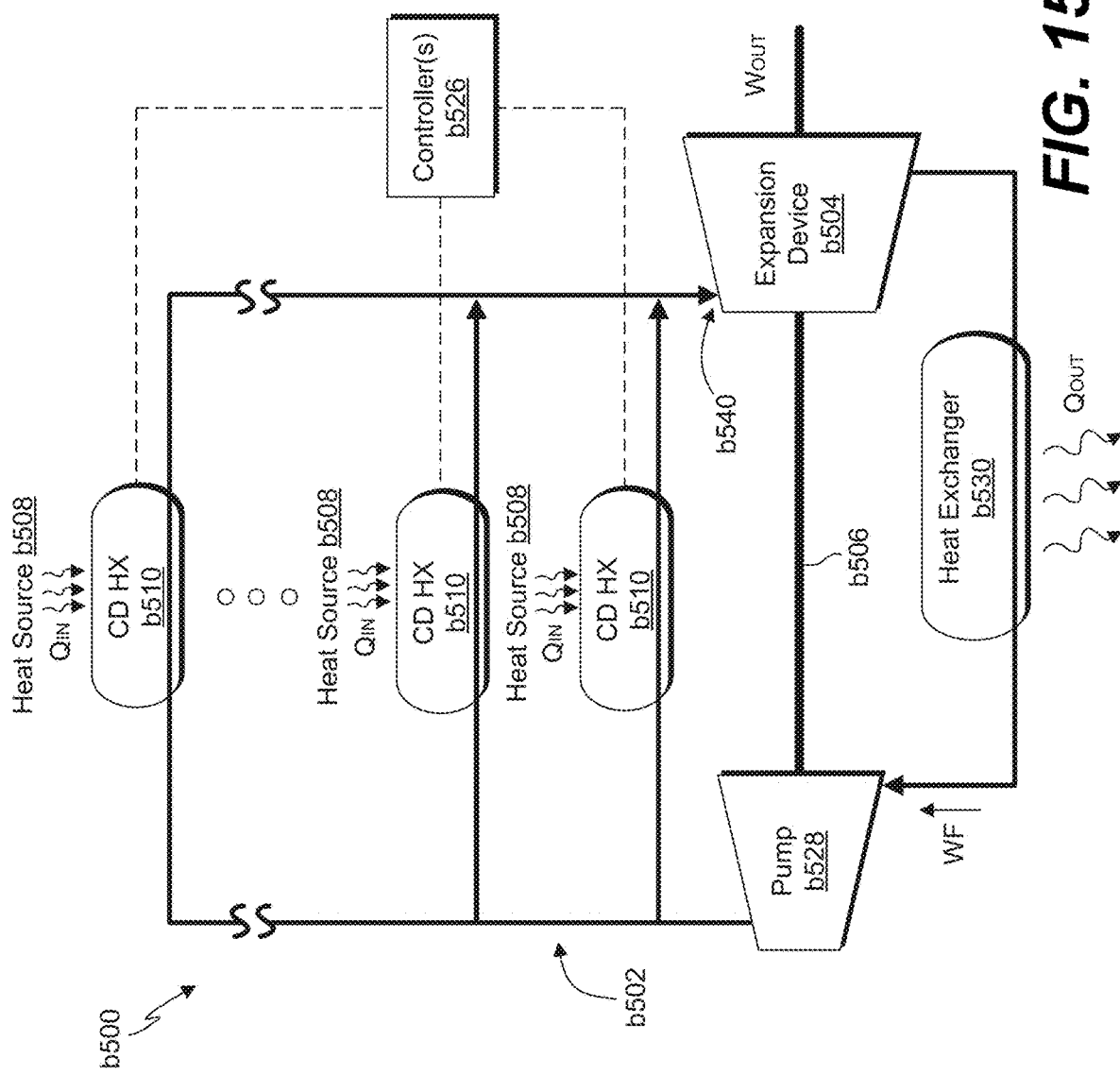
FIG. 15 provides a schematic view of yet another system operable to produce useful work according to an example embodiment of the present disclosure.

FIG. 15 provides a schematic view of yet another system operable to produce useful work according to an example embodiment of the present disclosure. The system of FIG. 15 is configured in a similar manner as the system of FIG. 11 except as provided below. For this embodiment, the system includes more than one constant density heat exchangers b510. Particularly, the system includes a plurality of constant density heat exchangers b510 arranged in parallel. The system can include any suitable number of constant density heat exchangers b510. A single heat source b508 can give off heat to the constant density heat exchangers b510, or alternatively, a plurality of heat sources b134 can give off heat to the constant density heat exchangers b510. For instance, in some embodiments, each constant density heat exchanger b510 has an associated heat source b508.

Moreover, for this embodiment, each constant density heat exchanger b510 is operable to hold a volume of working fluid WF at constant density during heat application, e.g. in a manner described above. Each constant density heat exchanger b510 can each include an inlet flow control device b514 and an outlet flow control device b516, e.g., as depicted in FIGS. 9 and 10. Notably, one or more controllers b526 of the system can control the timing of the constant density heat exchangers b510 such that an inlet b540 of the expansion device b504 receives substantially a steady state flow of working fluid WF. More particularly, the one or more controllers b526 can cause the opening and closing of the inlet and outlet flow control devices b514, b516 such that the flow of working fluid WF flowing downstream to the inlet of the expansion device b504 is substantially steady state. In this way, the expansion device b504 can generate a more constant work output and undesirable vibration associated with a pulsed flow can be eliminated or reduced. The timing of the inlet and outlet flow control devices b514, b516 can be set based at least in part on the number of constant density heat exchangers b510, the distance from the outlet of the working chamber b524 of the constant density heat exchangers b510 to the inlet of the turbine, and the mass flow of the working fluid WF through the conduits of the loop b502, among other parameters.

Notarnicola Cycle as Bottoming Cycle

Figure 16:
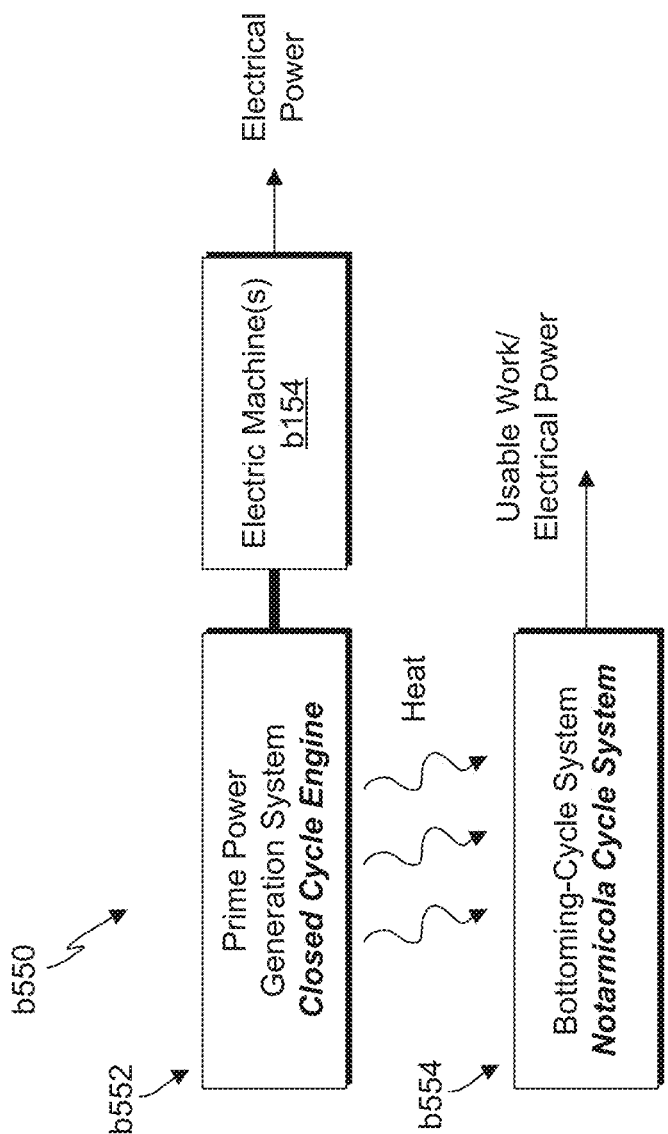
FIG. 16 provides a schematic view of a power generation system according to an example embodiment of the present disclosure.

FIG. 16 provides a schematic view of a power generation system b550 according to an example embodiment of the present disclosure. The power generation system b550 includes a prime power generation system b552 and a heat recovery or bottoming-cycle system b554 operable to recover heat from the prime power generation system b552 and use the recovered waste heat to produce useful mechanical work. The mechanical work can be used for various applications, such as generating electrical power and/or driving various elements operatively coupled thereto.

As depicted in FIG. 16, for this embodiment, the prime power generation system b552 includes a closed cycle engine operable to produce useful work. In other embodiments, the prime power generation system b552 can include other suitable types of power generators, including for example, a gas or steam turbine engine, solar panels, etc. The useful work produced by the closed cycle engine can be used for any suitable purpose, such as for causing one or more electric machines b154 operatively coupled thereto to generate electrical power. The closed cycle engine can be any of the closed cycle engines described herein, including for example, any of the Stirling engines described herein. As will be explained further below, heat from the closed cycle engine, or the waste heat source in this example, can be recovered/extracted and used by the bottoming-cycle system b554 to produce useful mechanical work. For instance, heat can be recovered from the cold side and/or the hot side of the closed cycle engine and used by the bottoming-cycle system b554 to produce useful mechanical work. The useful work produced by the bottoming-cycle system b554 can be used in turn to drive one or more elements, such as e.g., a compressor. Moreover, in some embodiments, one or more electric machines can be operatively coupled with components of the bottoming-cycle system b554. In this way, the mechanical work can be used for generating electrical power. Furthermore, notably, the bottoming-cycle system b554 of FIG. 16 is a Notarnicola cycle system that operates on a Notarnicola Cycle, or stated another way, on a constant density heat addition principle as explained above.

Figure 17:
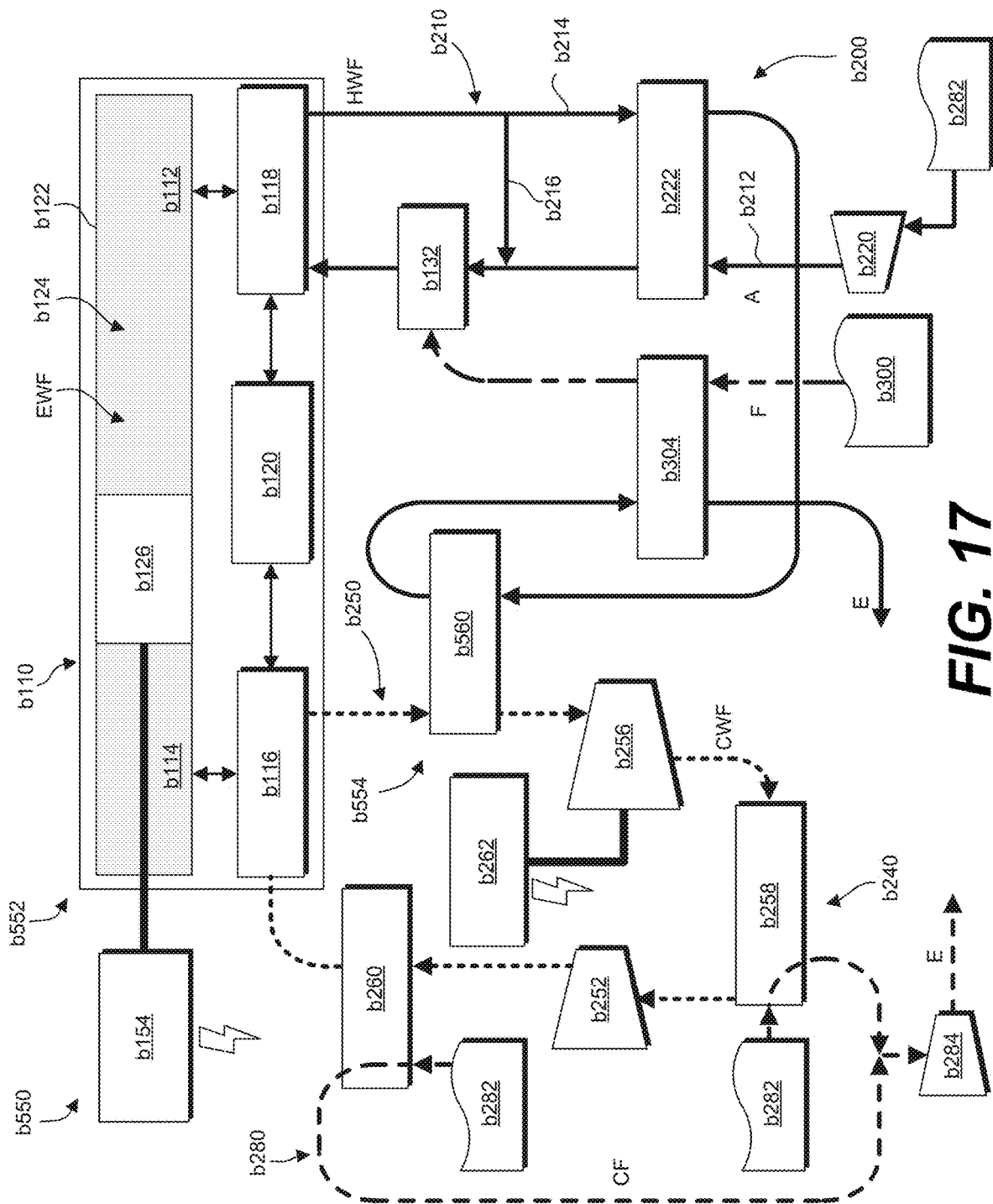
FIG. 17 provides a schematic view of a power generation system according to an example embodiment of the present disclosure.

FIG. 17 provides a schematic view of a power generation system b550 according to an example embodiment of the present disclosure. FIG. 17 provides a schematic view of a power generation system b100 according to an example embodiment of the present disclosure. Generally, the power generation system b100 of FIG. 17 includes a prime power generation system b100 and a balance of plant b200. The balance of plant b200 includes a heat recovery system to recover heat from the prime power generation system b100. Particularly, the heat recovery system operates a Rankine-based bottoming cycle to recover heat (e.g., engine exhaust) generated by the prime power generation system b100. The recovered heat can then be used in a useful way. For instance, the energy recovered by the heat recovery system can be used to "pay" for pumps and other accessories associated with the balance of plant b200 so such components do not rob the closed cycle engine b110 of efficiency. Further, in some embodiments, some or all of the balance of plant b200 components can be additively manufactured, e.g., by one or more of the additive manufacturing techniques described herein. In this way, the costs associated with manufacturing such components can minimized, particularly for relatively smaller mobile applications.

As depicted in FIG. 17, the prime power generation system b100 of the power generation system b100 is a closed cycle engine b110. The closed cycle engine b110 can be any of the closed cycle engines described herein. For instance, the closed cycle engine b110 can be one of the Stirling engines described herein. The closed cycle engine b110 includes one or more piston assemblies b126 each movable within their respective piston bodies b122. Additionally, the closed cycle engine b110 includes a regenerator b120, a hot side heat exchanger b118 operable to heat or impart thermal energy to the working fluid within the piston bodies b122, and a cold side heat exchanger b116 operable to remove heat from the working fluid within the piston bodies b122. Consequently, the closed cycle engine b110 generally defines a hot side b112 and a cold side b114. Furthermore, as shown, one or more electric machines b154 are operatively coupled with the piston assemblies b126. When the piston assemblies b126 are moved within their respective piston bodies b122, the electric machines b154 are operable to generate electrical power.

Notably for this embodiment, the heater loop b210 of the balance of plant b200 is positioned at least in part in a heat exchange relationship with the chiller loop b240 of the balance of plant b200. Accordingly, as will be explained below, heat captured from the hot side b112 of the engine can be used as a heat source b134 for increasing the temperature of the chiller working fluid CWF flowing along the bottoming-cycle loop b250 to ultimately increase the potential energy thereof. In this way, more or supplemental electrical power can be generated by the one or more electric machines b262 operatively coupled with the expansion device b256 of the chiller loop b240. Additionally, heat can be captured from the hot side b112 of the engine and fed directly back to the engine or to one or more components for increasing the temperature of fuel and/or air flowing to the combustor b132.

For this embodiment, the heater loop b210 includes a compressor b220 positioned along an intake line b212 of the heater loop b210. The compressor b220 moves air into the heater loop b210 from an air source b218 (e.g., an ambient environment) and pressurizes the air. A recuperator b222 is positioned downstream of the compressor b220 along the intake line b212 of the heater loop b210 as well as along a heat recovery loop b214 of the heater loop b210. The air pressurized by the compressor b220 flows downstream to the recuperator b222 along the intake line b212 where the pressurized air is pre-heated by hot combustion gases recovered from the closed cycle engine b110, or more particularly, from the hot side heat exchanger b118 of the closed cycle engine b110. As the pressurized and now pre-heated air flows downstream, the pressurized/pre-heated air combines or mixes with hot combustion gases recirculated from the hot side heat exchanger b118, e.g., via a recirculation loop b216 of the heat recovery loop b214.

The heated air mixes with fuel and the fuel/air mixture is combusted in a combustor b132 or burner of the closed cycle engine b110. The combustion gases generated by the combustion process are provided to the hot side heat exchanger b118 via the intake line b212. The hot side heat exchanger b118 facilitates heat exchange between the hot combustion gases and the engine working fluid EWF within the piston body b122. The heat imparted to the engine working fluid EWF creates a temperature differential between the hot side b112 and the cold side b114 of the closed cycle engine b110. The expansion and compression of the engine working fluid EWF causes the piston assemblies b126 to move within their respective piston bodies b122, thereby producing useful work. The useful mechanical work can be converted into electrical power, e.g., by the one or more electric machines b154 operatively coupled with the piston assemblies b126.

After the relatively hot combustion gases impart thermal energy to the engine working fluid EWF within the piston body b122, the combustion gases are captured and directed downstream along the heat recovery loop b214 for further useful purposes. For instance, a portion of the combustion gases are recirculated via the recirculation loop b216 back to the combustor b132 and a portion of the combustion gases are used to impart thermal energy to the pressurized air passing through the recuperator b222. That is, a portion of the combustion gases are used to preheat the incoming pressurized air at the recuperator b222.

After flowing through the recuperator b222, the hot combustion gases recovered from the hot side heat exchanger b118 of the closed cycle engine b110 continue downstream along the heat recovery loop b214 to the constant density heat exchanger b560 of the chiller loop b240. Thus, as noted above, the heater loop b210 is at least in part in a heat exchange relationship with the chiller loop b240. Particularly, for this embodiment, the heater loop b210 is at least in part in a heat exchange relationship with the chiller loop b240 at the constant density heat exchanger b560. The hot combustion gases heat or impart thermal energy to the chiller working fluid CWF flowing through the bottoming-cycle loop b250 at the constant density heat exchanger b560. In this way, the temperature of the chiller working fluid CWF is increased even further prior to expanding at the expansion device b256 downstream of the constant density heat exchanger b560. The increased potential energy of the chiller working fluid CWF allows the expansion device b256 to extract more useful work therefrom. Accordingly, more electrical power can be generated by the one or more electric machines b262 operatively coupled with the expansion device b256.

After imparting thermal energy to the chiller working fluid CWF at the constant density heat exchanger b560, the combustion gases flow downstream along the heat recovery loop b214 to the fuel preheater b304. The combustion gases impart thermal energy to fuel flowing downstream along a fuel line 302 from a fuel source b300 (e.g., a fuel tank) at the fuel preheater b304. In this way, the fuel can be preheated prior to being mixed with the heated/pressurized air. Preheating the fuel prior to mixing with the heated/pressurized air can reduce the amount of fuel required for the same work output. After heat exchange at the fuel preheater b304, the combustion gases flow downstream along the heat recovery loop b214 of the heater loop b210 and are exhausted from the system.

Notably, for this embodiment, the heat recovered from the hot side heat exchanger b118 is exchanged with the various elements along the heater loop b210 in an ordered manner to achieve high efficiency of the power generation system b100. For instance, for the depicted embodiment of FIG. 17, the thermal energy generated by the combustor b132 is first used by the hot side heat exchanger b118 to heat the engine working fluid EWF within the piston body b122. Thereafter, the hot combustion gases continue downstream. Some of the recovered combustion gases are directed back to the combustor b132 via the recirculation loop b216 and some of the combustion gases are directed to the recuperator b222 for pre-heating the compressed air, which also returns heat to the engine. Next, the hot combustion gases are used to heat the chiller working fluid CWF flowing along the bottoming-cycle loop b250 at the constant density heat exchanger b560. The hot combustion gases are then used to pre-heat the fuel at the fuel preheater b304, thereby returning heat to the engine. Finally, the combustion gases are exhausted from the system.

The chiller loop b240 of the balance of plant b200 is operable to remove heat or thermal energy from the cold side b114 of the closed cycle engine b110. Particularly, a working fluid can be passed through the cold side heat exchanger b116. The engine working fluid EWF can exchange heat with the relatively cool working fluid flowing through the cold side heat exchanger b116, and thus, the working fluid removes heat from the closed cycle engine b110 to provide cooling thereto, e.g., at the cold side b114. The cooled engine working fluid EWF facilitates compression thereof when the piston assembly b126 is moved toward the compression space by the expansion of the working fluid at the other end of the regenerative engine.

As illustrated in FIG. 17, the chiller loop b240 includes two linked loops, including a bottoming-cycle loop b250 and a cooling loop b280. The bottoming-cycle loop b250 or system is a recovered heat to power system. Particularly, a chiller working fluid CWF, such as e.g., a supercritical carbon dioxide or some other suitable low temperature working fluid, is moved through the bottoming-cycle loop b250 to remove heat from the cold side b114 of the engine (e.g., to increase the temperature differential between the hot and cold sides of the engine). Components of the bottoming-cycle loop b250 utilize the captured heat to generate electrical power. The cooling loop b280 is operable to cool certain components positioned along the bottoming-cycle loop b250. Specifically, a cooling fluid CF, such as e.g., ambient air or some other suitable heat-sink fluid, is moved through the cooling loop b280 and exchanges heat with the various components of the bottoming-cycle loop b250 to provide cooling thereto. The chiller loop b240 will be described in detail below.

For this embodiment, the bottoming-cycle loop b250 of the chiller loop b240 includes a pump b252 operable to move the chiller working fluid CWF along or through the bottoming-cycle loop b250. As noted above, the chiller working fluid CWF can be a supercritical carbon dioxide fluid or some other suitable low temperature working fluid. A precooler b260 is optionally positioned downstream of the pump b252 along the bottoming-cycle loop b250. The precooler b260 cools the chiller working fluid CWF as the chiller working fluid CWF flows therethrough. The cold side heat exchanger b116 (e.g., an evaporator) is positioned downstream of the precooler b260 along the bottoming-cycle loop b250. The cold side heat exchanger b116 is positioned in a heat exchange relationship with the cold side b114 of the closed cycle engine b110 as shown in FIG. 17. During operation of the closed cycle engine b110, the chiller working fluid CWF flowing through the cold side heat exchanger b116 picks up or removes heat from the engine working fluid EWF and walls of the piston body b122 at or proximate the cold side b114 of the engine b110. That is, the engine working fluid EWF and walls at or proximate the cold side b114 of the engine b110 impart thermal energy to the chiller working fluid CWF flowing through the cold side heat exchanger b116. Accordingly, the heat captured from the cold side b114 of the engine b110 can be utilized to generate electrical power and/or produce useful work.

In some embodiments, optionally, the relatively hot chiller working fluid CWF flows downstream from the cold side heat exchanger b116 to a constant density heat exchanger b560 or second heat exchanger positioned along the bottoming-cycle loop b250. For this embodiment, the heat source b134 that imparts thermal energy to the chiller working fluid CWF flowing through the bottoming-cycle loop b250 at the constant density heat exchanger b560 is the hot combustion gases flowing along the heat recovery loop b214 of the heater loop b210. Accordingly, heat recovered from the hot side b112 of the engine is utilized for electrical power generation.

An expansion device b256 is positioned downstream of the cold side heat exchanger b116 along the bottoming-cycle loop b250. In some embodiments, the expansion device b256 is immediately downstream of the cold side heat exchanger b116. In yet other embodiments, as noted above, the expansion device b256 is downstream of the cold side heat exchanger b116 but directly downstream of the constant density heat exchanger b560. The expansion device b256 can be a turbine, for example. The expansion device b256 can be operatively coupled with one or more elements of the chiller loop b240 and/or the heater loop b210. For instance, the expansion device b256 can be mechanically coupled with the pump b252 of the bottoming-cycle loop b250, the compressor b220 of the heater loop b210, and/or a fan b284 of the cooling loop b280 of the chiller loop b240, among other components. The expansion device b256 can be mechanically coupled with such components via one or more shafts or a shaft system. The expansion device b256 is operable to extract thermal energy from the chiller working fluid CWF to produce useful work such that electrical power can be generated. Particularly, the expansion of the chiller working fluid CWF can drivingly rotate the expansion device b256 about its axis of rotation, which in turn drives the one or more shafts and the components operatively coupled thereto. Moreover, when the shaft system is driven by rotation of the expansion device b256, the useful work produced can be utilized to drive one or more electric machines b262 operatively coupled to the expansion device b256. In this way, the electric machines b262 can generate electrical power. The electrical power generated can be used to pay or operate the various devices or components of the power generation system b100, such as e.g., fans, pumps, outside air conditioning units, onboard vehicle systems, among other potential uses.

After expanding at the expansion device b256 to produce useful work such that electrical power can ultimately be generated, the chiller working fluid CWF flows downstream from the expansion device b256 to a third heat exchanger b258 or third heat exchanger positioned along the bottoming-cycle loop b250. The third heat exchanger b258 is positioned between the expansion device b256 and the pump b252 along the bottoming-cycle loop b250. The third heat exchanger b258 cools the chiller working fluid CWF before the chiller working fluid CWF flows downstream to the pump b252 where the chiller working fluid CWF is pumped or moved along the bottoming-cycle loop b250 once again.

As noted above, the chiller loop b240 includes the cooling loop b280 linked to the bottoming-cycle loop b250. As depicted in FIG. 17, the cooling fluid CF is introduced into the cooling loop b280 at the precooler b260 via a pressure differential. The relatively cool cooling fluid CF can pick up or remove heat from the chiller working fluid CWF flowing through the bottoming-cycle loop b250 at the precooler b260. That is, the chiller working fluid CWF of the bottoming-cycle loop b250 can impart thermal energy to the cooling fluid CF of the cooling loop b280 at the precooler b260. In addition, cooling fluid CF is introduced into the cooling loop b280 at the third heat exchanger b258 via a pressure differential. The relatively cool cooling fluid CF can pick up heat from the chiller working fluid CWF flowing through the bottoming-cycle loop b250 at the third heat exchanger b258. That is, the chiller working fluid CWF flowing along the bottoming-cycle loop b250 can impart thermal energy to the cooling fluid CF of the cooling loop b280 at the third heat exchanger b258. As illustrated in FIG. 17, the cooling fluid CF can flow downstream from the precooler b260 and downstream from the third heat exchanger b258 to a fan b284 positioned along the cooling loop b280. The fan b284 moves the cooling fluid CF through the cooling loop b280. Particularly, the fan b284 can cause the pressure differential at the inlet of the precooler b260 and the inlet of the third heat exchanger b258 such that the cooling fluid CF is moved into and through the cooling loop b280 of the chiller loop b240. After removing heat from the chiller working fluid CWF flowing through the bottoming-cycle loop b250 at the precooler b260 and the third heat exchanger b258, the cooling fluid CF is exhausted from the system.

The chiller working fluid CWF flowing through the bottoming-cycle loop b250 at the superheater b560 can be held at constant density during heat application to increase the temperature and pressure of the chiller working fluid CWF. The hot combustion gases or heating working fluid HWF flowing through the heat recovery loop b214 apply heat to the chiller working fluid CWF held at constant density at the superheater b560.

Returning to FIG. 18, as noted above, the bottoming-cycle system b554 embodied as a Notarnicola cycle system b500 also includes an expansion device b256 positioned downstream of the constant density superheater b560. The expansion device b256 can be a turbine, for example. The expansion device b256 is operatively coupled with the pump b252 in this example embodiment. More specifically, the expansion device b256 is mechanically coupled with the pump b252 via a shaft or shaft system. Furthermore, the expansion device b256 is in fluid communication with the constant density superheater b560. The expansion device b256 is operable to extract thermal energy from the chiller working fluid CWF to generate useful work, as denoted by $W_{OUT}$. Particularly, the expansion of the chiller working fluid CWF can drivingly rotate the expansion device b256 about its axis of rotation, which in turn drives the shaft and the pump b252 operatively coupled thereto. Moreover, when the shaft is driven by rotation of the expansion device b256, the useful work produced can be utilized to drive other components. For example, the useful work produced can drive a compressor of the closed cycle engine b110 operatively coupled with the expansion device b256 via a shaft. Consequently, waste heat from the closed cycle engine b110 can be utilized to produce work that can ultimately be utilized for driving one or more components of the closed cycle engine b110, such as e.g., compressors, fans, pumps, etc. Furthermore, for this embodiment, one or more electric machines b262 are operatively coupled with the expansion device b256. Accordingly, when the expansion device b256 is driven about its axis of rotation by expansion of the chiller working fluid CWF, the electric machines b262 operatively coupled with the expansion device b256 can generate electrical power.

Figure 18:
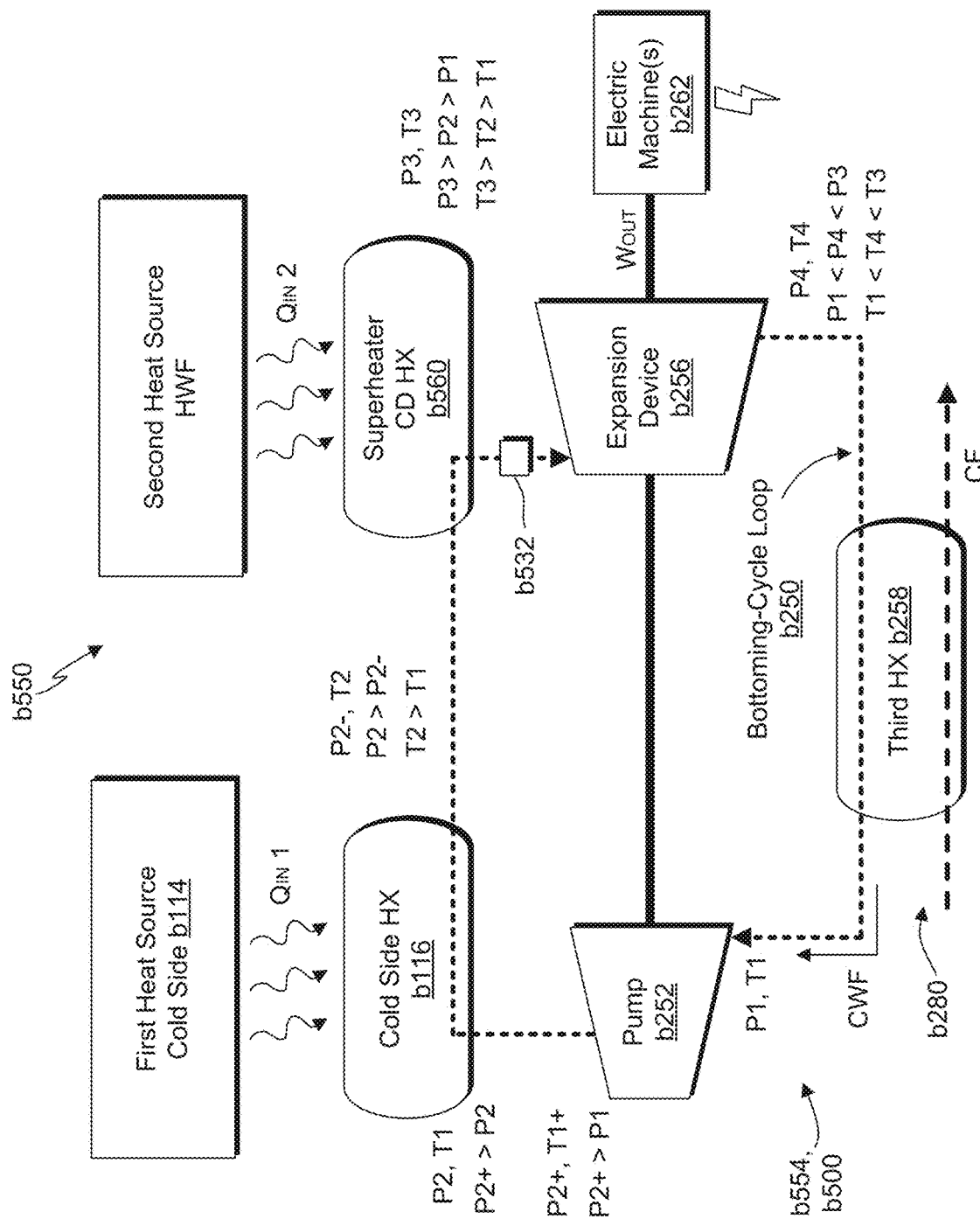
FIG. 18 provides a close-up schematic view of the bottoming-cycle system of the power generation system of FIG. 17.

When the working fluid exits the expansion device b256, the working fluid has a pressure P4 and a temperature T4. As depicted in FIG. 18, the pressure P4 is greater than the pressure P1 but less than the pressure P3. The pressure P4 is less than the pressure P3 due to the extraction of the energy from the working fluid by the expansion device b256. The temperature T4 is greater than the temperature T1 but less than the temperature T3. The temperature T4 is less than the temperature T3 due to the extraction of energy from the working fluid by the expansion device b256.

The system b554 also includes a third heat exchanger or third heat exchanger b258 positioned along the bottoming-cycle loop b250. The third heat exchanger b258 has an inlet and an outlet. The inlet of the third heat exchanger b258 is in fluid communication with the expansion device b256 and the outlet of the third heat exchanger b258 is in fluid communication with the pump b252. Accordingly, the third heat exchanger b258 is positioned downstream of and is in fluid communication with the expansion device b256 and the third heat exchanger b258 is positioned upstream of and is in fluid communication with the pump b252. Thus, the third heat exchanger b258 receives the working fluid from the expansion device b256 and the pump b252 receives the working fluid from the third heat exchanger b258. The third heat exchanger b258 is operable to decrease the temperature of the working fluid. In this way, the working fluid is better able to extract heat from the cold side b114 of the engine. As depicted, the third heat exchanger b258 is operable to decrease the temperature of the working fluid to a temperature T1, which is less than the temperature T4, the temperature T3, and the temperature T2. As the temperature decreases, the pressure of the working fluid decreases as well. As depicted, the pressure of the working fluid decreases to P1, which is less than the pressure P4, the pressure P3, and the pressure P2. A cooling fluid CF (e.g., air) flowing along the cooling loop b280 can be passed through the third heat exchanger b258 to remove heat from the chiller working fluid CWF flowing therethrough.

Figure 19:
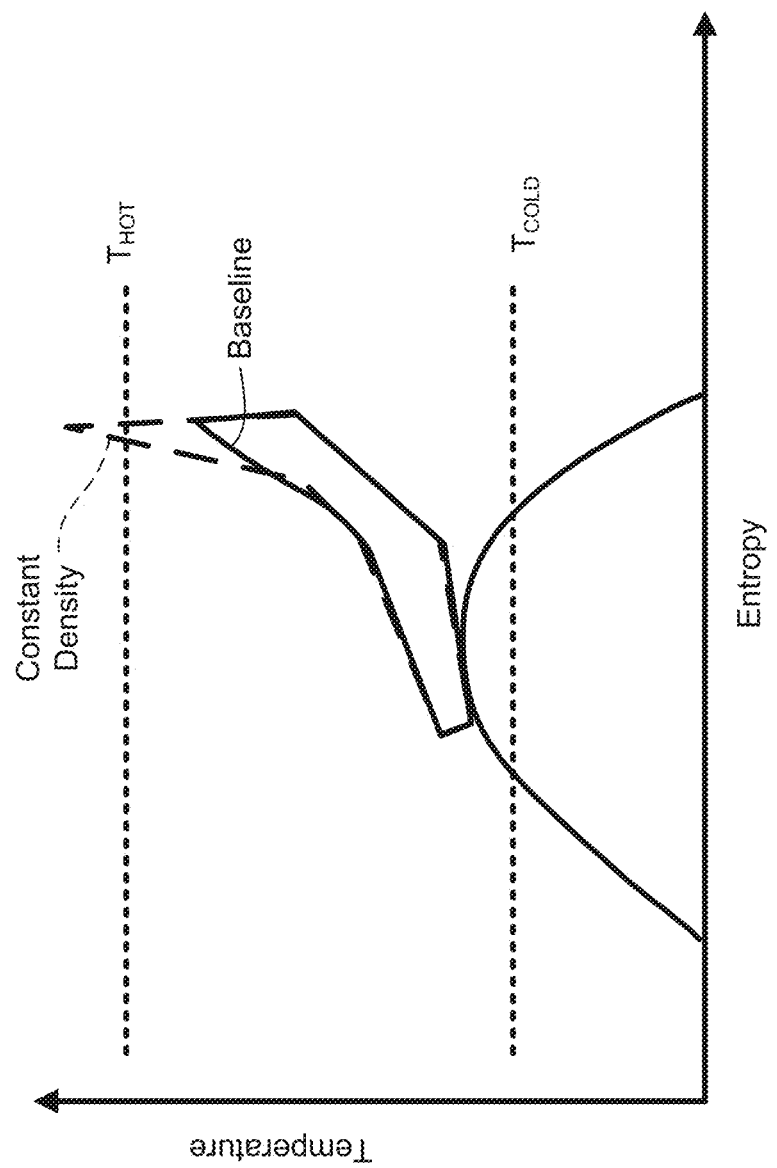
FIG. 19 graphically depicts the advantages of the constant density heat application process of a Notarnicola cycle system.

FIG. 19 depicts the advantages of the constant density heat application process described above. Particularly, FIG. 19 depicts a T-s diagram (i.e., a temperature-entropy diagram) of the closed cycle engine b110 utilizing the advantages of the constant density heat application process described above. As shown, using the constant density heat exchange process during super heating or reheating of the working fluid leads to a higher turbine inlet temperature, and therefore, more work out. This can be seen particularly on the T-s diagram where the constant density super heating causes the working fluid to increase isobars in temperature compared to a baseline system without constant density heat application. One benefit of the constant density heat exchange process is an increase of nearly twice the temperature difference across the expansion device b256 (FIG. 18) or turbine.

Figure 20:
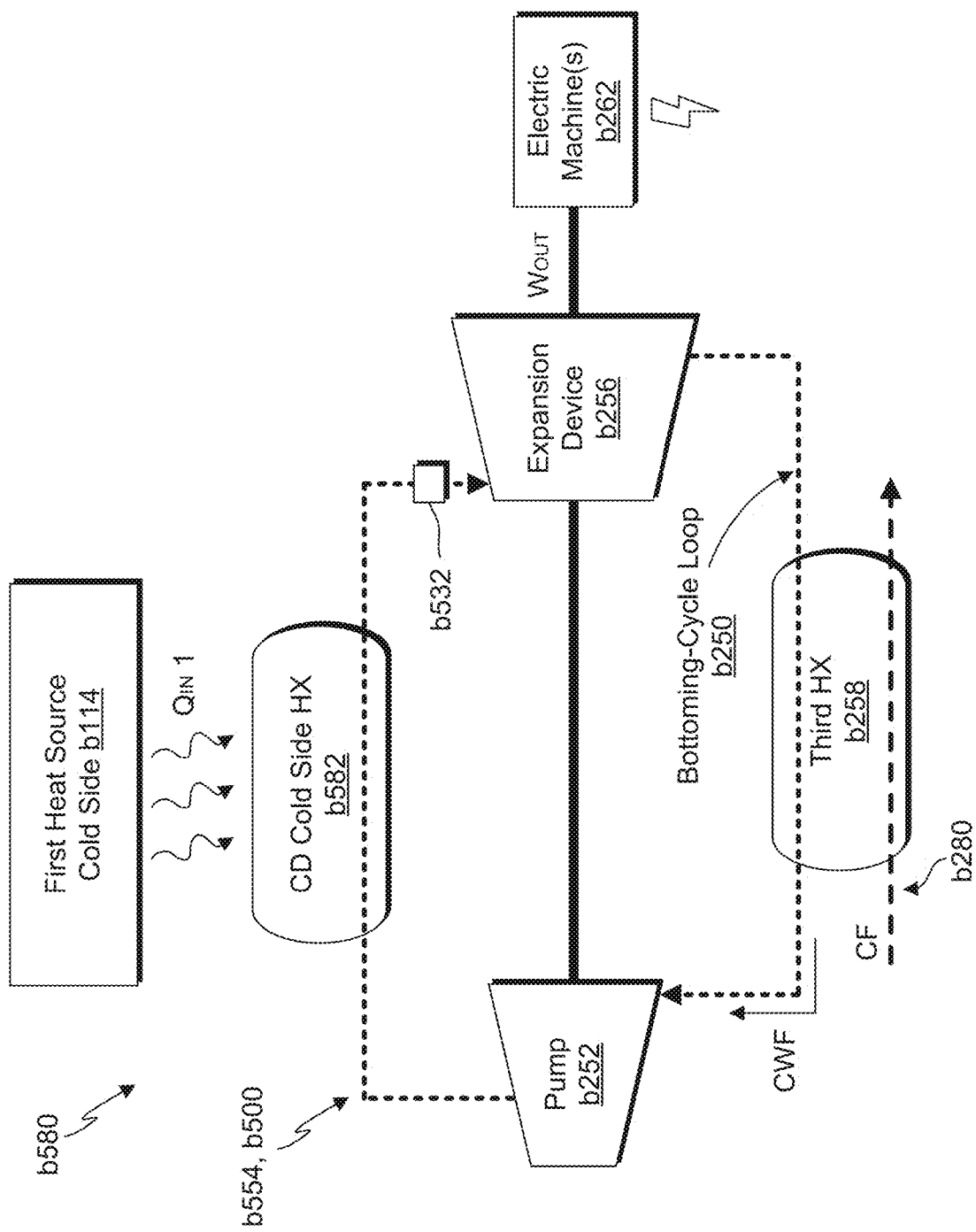
FIG. 20 provides a schematic view of another power generation system b100 according to an example embodiment of the present disclosure.

FIG. 20 provides a schematic view of another power generation system b580 according to an example embodiment of the present disclosure. The power generation system b580 depicted in FIG. 20 has a similar configuration to the system b550 of FIG. 18 except as provided below. Notably, for this embodiment, the cold side heat exchanger is a constant density heat exchanger b582. The cold side constant density heat exchanger b582 can be configured and can operate in the same or similar manner as described above. As depicted, the heat source can be the heat extracted from the cold side b114 of the closed cycle engine b110.

Figure 21:
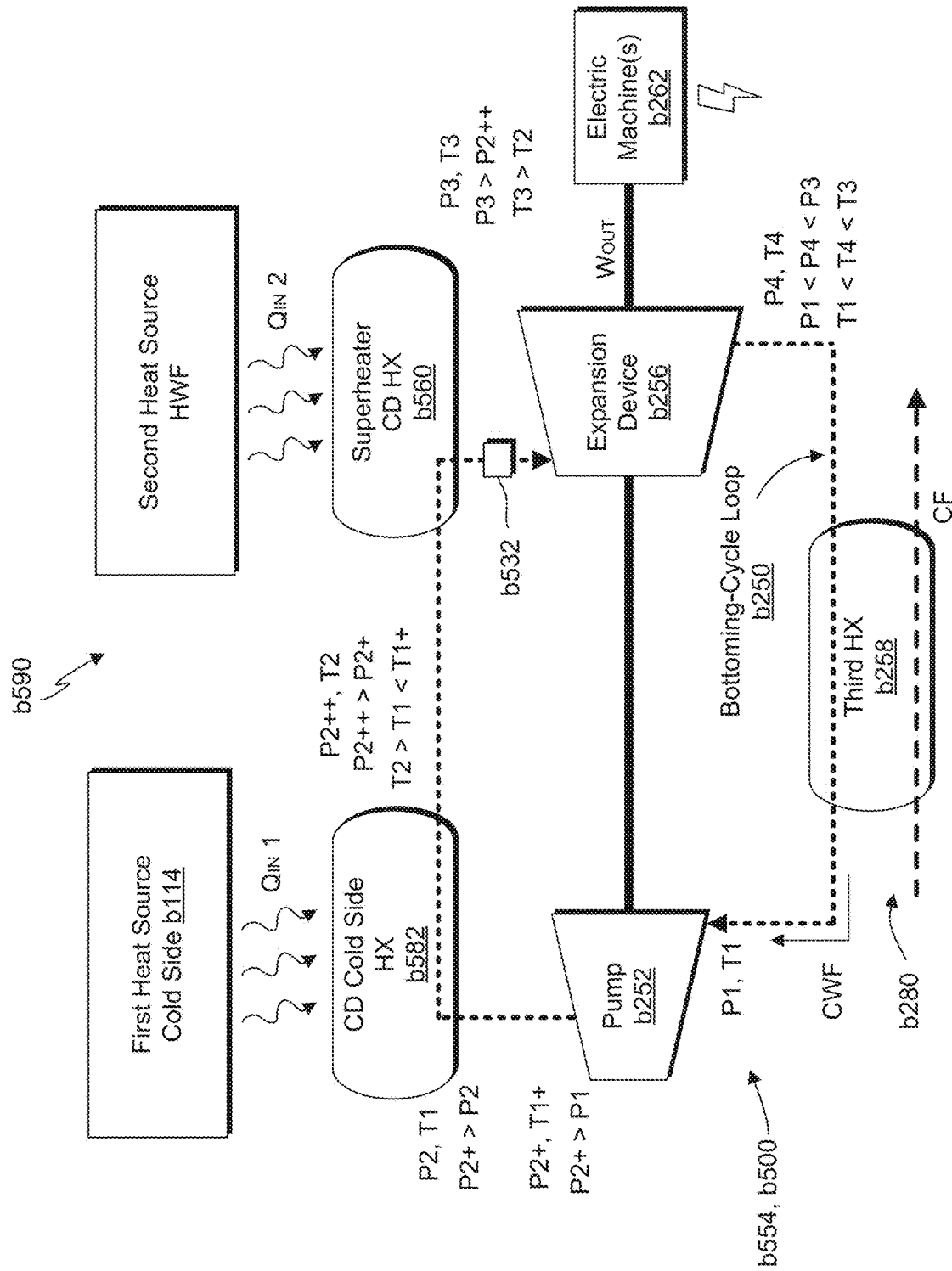
FIG. 21 provides a schematic view of another power generation system b100 according to an example embodiment of the present disclosure.

FIG. 21 provides a schematic view of another power generation system b590 according to an example embodiment of the present disclosure. The power generation system b590 depicted in FIG. 21 has a similar configuration to the system b550 of FIG. 18, except as provided below. Notably, for this embodiment, the cold side heat exchanger and the superheater are both constant density heat exchangers. Thus, the cold side heat exchanger is a constant density cold side heat exchanger b582 and the superheater is a constant density superheater b560. The cold side constant density heat exchanger b582 and the constant density superheater b560 can be configured and can operate in the same or similar manner as the constant density heat exchangers described above.

As shown in FIG. 21, for instance, the constant density cold side heat exchanger b582 is operable to hold a volume of working fluid (e.g., chiller working fluid CWF) at fixed density while increasing, via the heat source b508, the temperature and pressure of the working fluid. Particularly, the constant density cold side heat exchanger b582 is operable to hold the volume of working fluid at a fixed density while increasing, via the heat source (e.g., the heat extracted from the cold side b114 of the engine), i) the temperature of the working fluid such that an outlet temperature T2 of the working fluid is greater than the inlet temperature T1 of the working fluid; and ii) the pressure of the working fluid such that an outlet pressure P2++ of the working fluid is greater than the inlet pressure P2 of the working fluid. Thus, instead of a pressure drop across the cold side heat exchanger b116 (e.g., as occurs in the depicted embodiment of FIG. 18), the pressure of the working fluid is increased, e.g., from P2 to P2++).

Furthermore, the constant density superheater b560 is operable to hold a volume of working fluid at fixed density while increasing, via the heat source b508, the temperature and pressure of the working fluid flowing along the bottoming-cycle loop b250. Particularly, the constant density superheater b560 is operable to hold the volume of working fluid at a fixed density while increasing, via the heat source b508 (e.g., waste heat from the hot side b112 of the closed cycle engine b110 and/or some other source), i) the temperature of the working fluid such that an outlet temperature T3 of the working fluid is greater than the inlet temperature T2 of the working fluid; and ii) the pressure of the working fluid such that an outlet pressure P3 of the working fluid is greater than the inlet pressure P2++ of the working fluid. By increasing the pressure of the working fluid at the constant density cold side heat exchanger b582 and at the constant density superheater b560, the potential energy of the working fluid can be increased beyond what is achievable simply by heating the working fluid or by increasing its pressure by a single constant density heat exchanger, and thus, more useful work can be extracted, e.g., by the expansion device b256.

Figure 22:
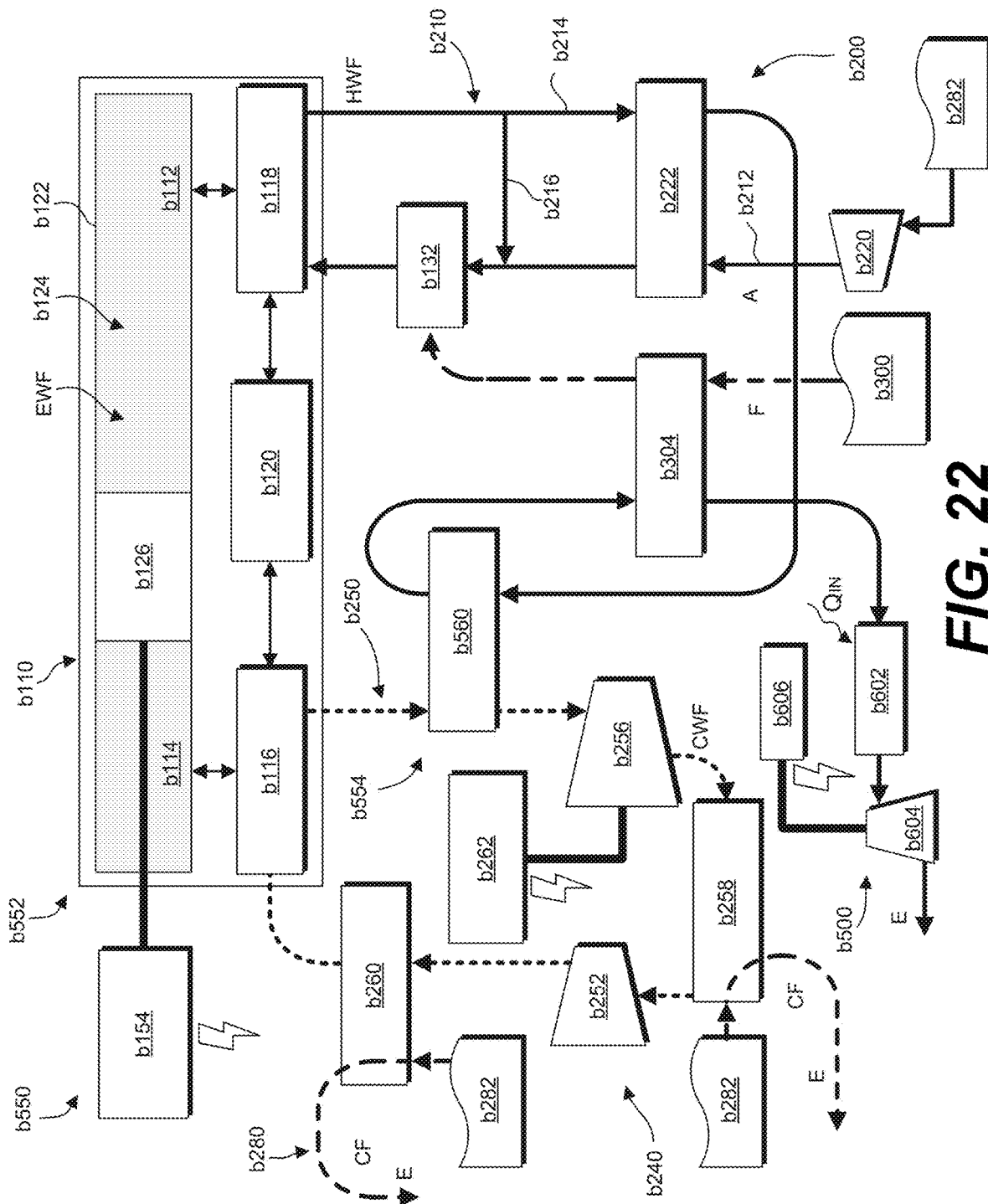
FIG. 22 provides a schematic view of a power generation system b100 according to an example embodiment of the present disclosure.

FIG. 22 provides a schematic view of a power generation system b100 according to an example embodiment of the present disclosure. FIG. 22 is configured in a similar manner as the power generation system b100 of FIG. 17, except as provided below.

For this embodiment, a Notarnicola cycle system b500 is positioned along the heater loop b210. Particularly, the Notarnicola cycle system b500 is positioned along the heat recovery loop b214 of the heater loop b210. As depicted, a constant density heat exchanger b602 is positioned downstream of the fuel preheater b304 along the heat recovery loop b214. A turbine b604 or expansion device is positioned downstream of the constant density heat exchanger b602 along the heat recovery loop b214. In some embodiments, a pulse converter b532 can be positioned between the constant density heat exchanger b602 and the turbine b604, e.g., for smoothing out or dampening the pulses of working fluid. Combustion gases or heating working fluid HWF flowing along the heat recovery loop b214 can flow through the constant density heat exchanger b602. In some embodiments, the constant density heat exchanger b602 can hold a volume of combustion gases at constant density during heat application, e.g., by a heat source as denoted by $Q_{IN}$ in FIG. 22. The working chamber of the constant density heat exchanger b602 can iteratively receive volumes of combustion gases and hold or trap them at constant density during heat application. After a volume of combustion gases is heated at constant density, the volume of combustion gases can then flow downstream to the turbine b604 such that the turbine b604 can extract thermal energy therefrom to produce useful work. One or more electric machines b154 operatively coupled with the turbine b604 can then generate electrical power. After expansion of the combustion gases at the turbine b604, the combustion gases can be exhausted from the system, e.g., to an ambient environment, and/or can flow downstream to one or more thermal applications b140.

In other embodiments, the combustion gases can be used as the heat source b508 for applying heat to a working fluid flowing through the constant density heat exchanger b602.

For instance, a working fluid (e.g., ambient air) can be passed through the constant density heat exchanger b602 and held at constant density while the heat from the heating working fluid HWF (e.g., combustion gases) heats or imparts thermal energy to the working fluid. In this way, the temperature and pressure of the working fluid can be increased and thus its potential energy can be increased as well. The working fluid can then flow downstream to an expansion device. The expansion device can extract thermal energy from the working fluid to produce useful work. One or more electric machines b154 operatively coupled with the turbine b604 can then generate electrical power. After expansion of the working fluid at the turbine b604, the working fluid can be exhausted from the system, e.g., to an ambient environment, and/or can flow downstream to one or more thermal applications b140. Similarly, the combustion gases can be exhausted from the system, e.g., to an ambient environment, and/or can flow downstream to one or more thermal applications b140.

Figure 23:
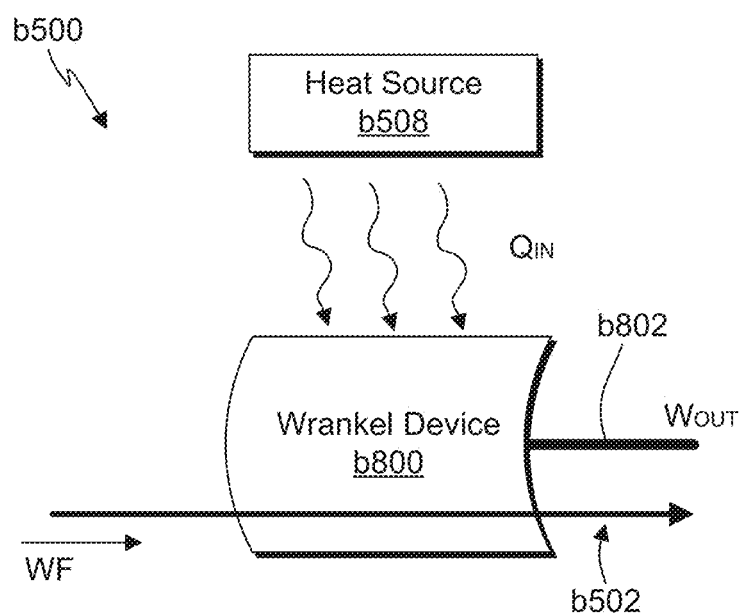
FIG. 23 provides a schematic view of another Notarnicola cycle system operable to produce useful work according to an example embodiment of the present disclosure.

FIG. 23 provides a schematic view of another system operable to produce useful work according to an example embodiment of the present disclosure. For this embodiment, the system is a Notarnicola cycle system b500 that operates on a Notarnicola cycle, or stated another way, on a constant density heat addition principle.

The system includes a loop b502. For this embodiment, the loop b502 is an open loop. In other embodiments, however, the loop b502 can be a closed loop. A working fluid WF is movable through the loop b502. The working fluid WF can be supercritical fluid, such as e.g., supercritical carbon dioxide. In other embodiments, the working fluid WF can be any suitable working fluid WF, such as air. Notably, for this embodiment, the functions of the constant density heat exchanger and the expansion device are combined into a single device positioned along the loop b502, referred to herein as a constant density heat exchanger expansion device, or more concisely stated, a "Wrankel device b800."

The Wrankel device b800 is positioned in thermal communication with a heat source b508. That is, the Wrankel device b800 is positioned in a heat exchange relationship with the heat source b508. The heat source b508 can be any suitable type of heat source b508, such as the cold side b114 and/or hot side b112 of a closed cycle engine b110 (e.g., one of the Stirling engines described herein), solar energy, geothermal energy, wind energy, a turbine engine, an internal combustion engine, a battery or battery system, a braking system, some combination thereof, etc. In some embodiments, the heat source b508 in thermal communication with the Wrankel device b800 can be switched or otherwise changed. For instance, the heat source b508 in thermal communication with the Wrankel device b800 can be switched between a closed cycle engine b110 and solar energy. As shown, the heat source b508 gives off heat and the heat is captured by the Wrankel device b800, denoted by $Q_{IN}$ in FIG. 23. The captured heat imparts thermal energy to the working fluid WF flowing through the Wrankel device b800 while the density of the working is held constant or fixed for a predetermined heating time. That is, the Wrankel device b800 is operable to hold a volume of working fluid WF moving through the loop b502 at constant density during heat application. In this way, the pressure and temperature of the working fluid WF is increased, which ultimately increases the potential energy of the working fluid WF.

The Wrankel device b800 then facilitates expansion of the volume of working fluid WF held at constant density during heat application. In this manner, the Wrankel device b800 can produce useful work. For instance, the expansion of the working fluid WF can drive a shaft b802 of the Wrankel device b800 about its axis of rotation. In some embodiments, one or more components can be operatively coupled to the shaft b802 such that they are driven by the Wrankel device b800. After the Wrankel device b800 extracts energy from the working fluid WF during expansion to produce useful work, the working fluid WF is exhausted downstream of the Wrankel device b800. In some embodiments, the working fluid WF can be used to provide a heat source b508 to one or more thermal applications b140 downstream of the Wrankel device b800.

Figure 24:
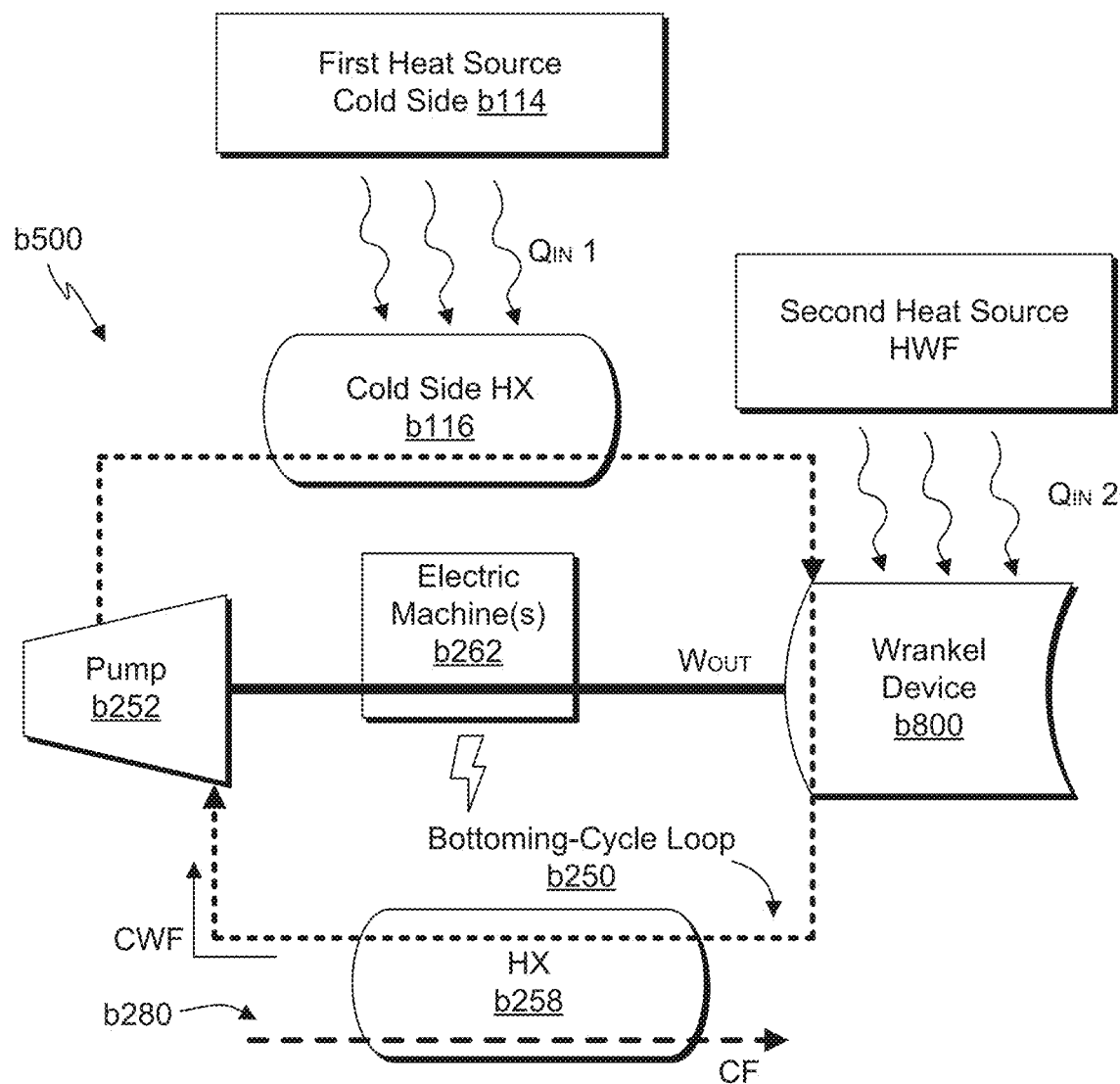
FIG. 24 provides a schematic view of another Notarnicola cycle system operable to produce useful work according to an example embodiment of the present disclosure.

FIG. 24 provides a schematic view of another system operable to produce useful work according to an example embodiment of the present disclosure. For this embodiment, the system is a Notarnicola cycle system b500 that operates on a Notarnicola cycle or a constant density heat addition principle. FIG. 24 is configured in a similar manner as the power generation system b100 of FIG. 18, except as provided below.

For this embodiment, the Notarnicola cycle system b500 is a bottoming-cycle system b250 of a closed cycle engine b110, such as any of the closed cycle engines described herein. Further, notably, the superheater and the expansion device are combined into a Wrankel device b800 in this embodiment. That is, the superheater and the expansion device are combined into a single device that functions as a constant density heat exchanger and expansion device.

The Wrankel device b800 is positioned in thermal communication with a heat source, which is the heating working fluid HWF (e.g., hot combustion gases) flowing along the heat recovery loop b214 of the heater loop b210. That is, the Wrankel device b800 is positioned in a heat exchange relationship with the hot combustion gases flowing along the heat recovery loop b214. As shown, the hot combustion gases give off heat and the heat is captured by the Wrankel device b800, denoted by $Q_{IN}2$ in FIG. 24. The captured heat imparts thermal energy to the chiller working fluid CWF flowing through the Wrankel device b800 while the density of the working is held constant or fixed for a predetermined heating time. That is, the Wrankel device b800 is operable to hold a volume of chiller working fluid CWF moving through the loop b250 at constant density during heat application. In this way, the pressure and temperature of the chiller working fluid CWF is increased, which ultimately increases the potential energy of the chiller working fluid CWF. In some embodiments, the Wrankel device b800 is operable to superheat the chiller working fluid CWF held at constant density.

The Wrankel device b800 then facilitates expansion of the volume of chiller working fluid CWF held at constant density during heat application. In this manner, the Wrankel device b800 can produce useful work. For instance, the expansion of the chiller working fluid CWF can drive a shaft of the Wrankel device b800 about its axis of rotation. In some embodiments, one or more components can be operatively coupled to the shaft such that they are driven by the Wrankel device b800. For instance, for this embodiment, one or more electric machines b262 are operatively coupled with the Wrankel device b800 via the shaft or shaft system. Accordingly, when the shaft is driven about its axis of rotation, the one or more electric machines b262 operatively coupled thereto are configured to generate electrical power. After the Wrankel device b800 extracts energy from the chiller working fluid CWF during expansion to produce useful work and ultimately electrical power, the chiller working fluid CWF is moved downstream to the third heat exchanger b258 where the chiller working fluid CWF is cooled, e.g., by cooling fluid CF flowing through the cooling loop b280. Next, the cooled chiller working fluid CWF flows downstream to the pump b252. The pump b252 moves the chiller working fluid CWF through the bottoming-cycle loop b250. After flowing through the pump b252, the chiller working fluid CWF picks up or extracts heat from the cold side b114 of the closed cycle engine b110, e.g., to provide cooling thereto. Thereafter, as noted above, the chiller working fluid CWF flows downstream to the Wrankel device b800.

Linear Constant Density Heat Exchanger

Figure 25:
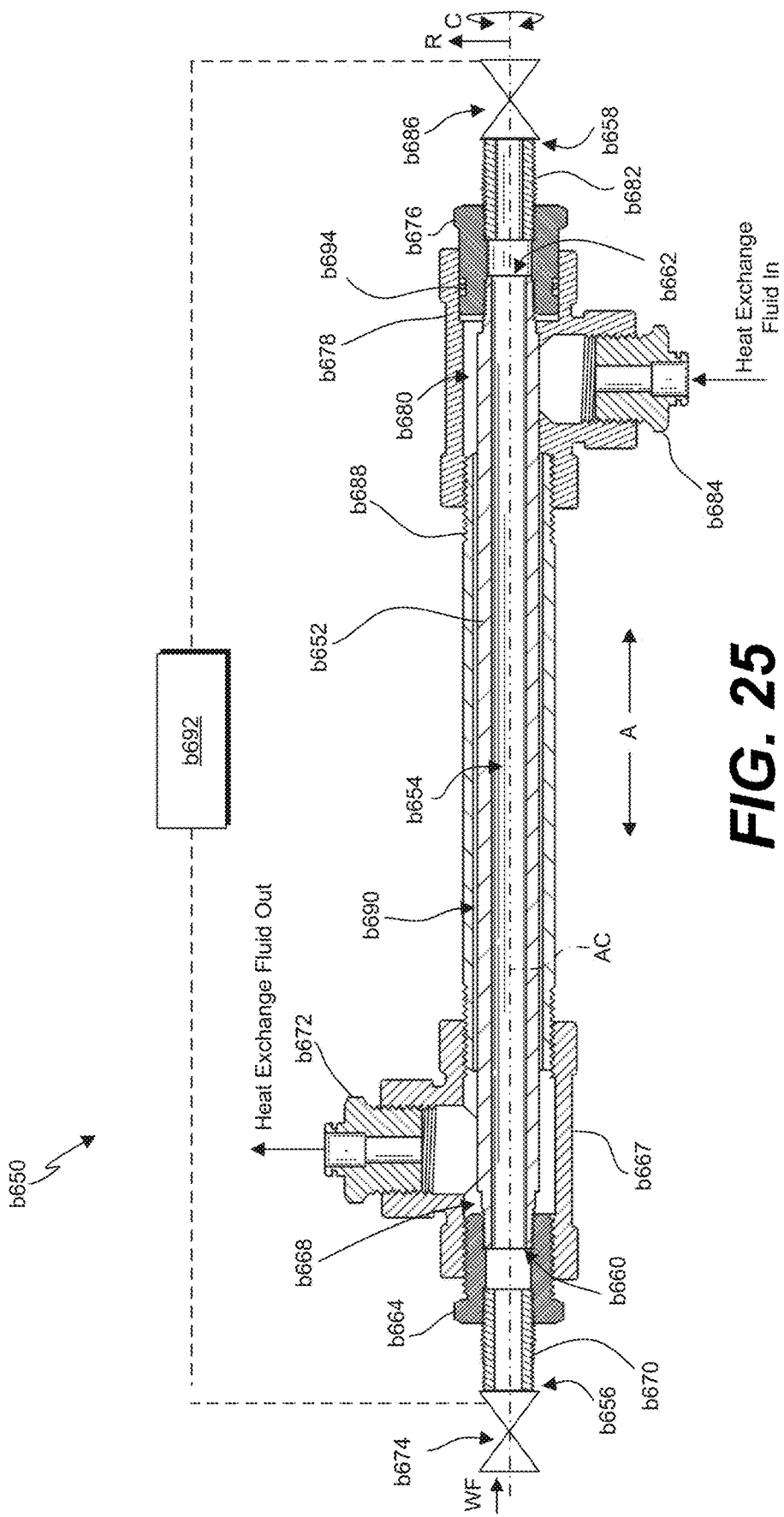
FIG. 25 provides a schematic cross-sectional view of an example linear constant density heat exchanger according to an aspect of the present disclosure.

FIG. 25 provides a schematic cross-sectional view of a linear constant density heat exchanger b650 according to an aspect of the present disclosure. Generally, the linear constant density heat exchanger b650 is operable to hold a volume of working fluid at constant density for a predetermined heating time while heat is applied to the working fluid. The linear constant density heat exchanger b650 can be implemented in any of the embodiments of the Notarnicola cycle system b500 and/or any of the systems described herein. For reference, the linear constant density heat exchanger b650 defines an axial direction A, a radial direction R, a circumferential direction C, and an axial centerline AC extending along the axial direction A. The radial direction R extends to and from the axial centerline AC in a direction orthogonal to the actual direction A. The circumferential direction C extends 360° around the axial centerline AC.

The linear constant density heat exchanger b650 includes a housing b652 defining at least a portion of a working chamber b654 operable to receive a working fluid therein. The working fluid is denoted in FIG. 25 as "WF" and can be any suitable fluid. For instance, in some embodiments, the working fluid WF is a supercritical fluid. For example, in some embodiments, the working fluid WF is a supercritical carbon dioxide. For the depicted embodiment of FIG. 25, the housing b652 is tubular. The tubular housing b652 is elongated and extends between a first end b660 and a second end b662 along the axial direction A. The first end b660 of the tubular housing b652 is connected to (e.g., threadingly engaged with) an inlet port b664. The inlet port b664 is in turn connected to (e.g., threadingly engaged with) an inlet housing b667. The inlet port b664 is also connected to (e.g., threadingly engaged with) an inlet conduit b670 that provides a means for the working fluid to flow into the linear constant density heat exchanger b650. In addition, the inlet housing b667 is connected to (e.g., threadingly engaged with) a first heat exchanger port b672, which in this embodiment is an outlet heat exchanger port in this embodiment. As will be explained further below, a heat exchange fluid HXF flowing through the linear constant density heat exchanger b650 can exit the constant density heat exchanger via the first heat exchanger port b672. The heat exchange fluid HXF can be any suitable type of fluid. For instance, as one example, the heat exchange fluid HXF can be combustion gases flowing along a heat recovery loop b214. The inlet housing b667 defines an inlet chamber b668 operable to receive the tubular housing b652, as well as a portion of the inlet port b664 and a portion of the first heat exchanger port b672. Furthermore, a heater housing b688 is also connected to (e.g., threadingly engaged with) the inlet housing b667.

The linear constant density heat exchanger b650 also includes an outlet housing b678 spaced from the inlet housing b667 along the axial direction A. The outlet housing b678 defines an outlet chamber b680 operable to receive at least portion of the tubular housing b652 therein. The second end b662 of the tubular housing b652 is connected to (e.g., threadingly engaged with) an outlet port b676. The outlet port b676 is in turn connected to an outlet housing b678. The outlet port b676 is also connected to (e.g., threadingly engaged with) an outlet conduit b682 that provides a means for the working fluid to flow out of or exit the linear constant density heat exchanger b650. In addition, the outlet housing b678 is connected to (e.g., threadingly engaged with) a second heat exchanger port b684, which in this embodiment is an inlet heat exchanger port, labeled as the second heat exchanger port b684 in FIG. 25. As will be explained further below, a heat exchange fluid HXF flowing through the linear constant density heat exchanger b650 can enter the heat exchanger via the second heat exchanger port b684. The outlet housing b678 defines an outlet chamber b680 operable to receive at least a portion of the tubular housing b652, as well as a portion of the outlet port b676 and a portion of the second heat exchanger port b684. The heater housing b688 is also connected to (e.g., threadingly engaged with) the outlet housing b678.

The heater housing b688 extends between the inlet housing b667 and the outlet housing b678 along the axial direction A, and as noted above, the heater housing b688 is connected to (e.g., threadingly engaged with) the inlet housing b667 at one end and the outlet housing b678 at its opposite end. Notably, the heater housing b688 annularly surrounds the tubular housing b652 between the inlet housing b667 and the outlet housing b678. That is, the heater housing b688 extends annularly around the tubular housing b652 at least between the inlet housing b667 and the outlet housing b678 along the axial direction A. An annular or ring-shaped heat exchange chamber b690 is defined between the heater housing b688 and the tubular housing b652. However, in some embodiments, the heat exchange chamber b690 need not be annular. The heat exchange chamber b690 provides fluid communication between the inlet chamber b668 defined by the inlet housing b667 and the outlet chamber b680 defined by the outlet housing b678. In this way, heat exchange fluid HXF can flow therebetween and impart heat or thermal energy to the working fluid contained within the working chamber b654. Stated another way, heat exchange fluid HXF can enter the linear constant density heat exchanger b650 through second heat exchanger port b684 and can flow downstream into the outlet chamber b680 defined by the outlet housing b678. The heat exchange fluid HXF can then flow further downstream into the heat exchange chamber b690 defined between the radially outer surface of the tubular housing b652 and the inner radial surface of the heater housing b688. The heat exchange fluid HXF can flow along the axial direction A through the heat exchange chamber b690 of the tubular housing b652. In this example embodiment, the heat exchange fluid HXF flows from right to left in FIG. 25. The heat exchange fluid HXF eventually flows downstream into the inlet chamber b668 defined by the inlet housing b667. The heat exchange fluid HXF then exits the linear constant density heat exchanger b650 via the first heat exchanger port b672. In alternative embodiments, the linear constant density heat exchanger b650 can be configured such that the heat exchange fluid HXF flows from left to right in the depicted embodiment of FIG. 25.

The linear constant density heat exchanger b650 also includes one or more flow control devices operable to selectively allow a volume of working fluid to enter and exit the working chamber b654. In this example embodiment, the flow control devices are valves. The one or more valves include a first valve b674 or first flow control device and a second valve b686 or second flow control device. The first valve b674 is positioned along the inlet conduit b670 at or proximate the inlet of the constant density heat exchanger and the second valve b686 is positioned along the outlet conduit b682 at the outlet of the constant density heat exchanger. In some embodiments, the first valve b674 and the second valve b686 are both solenoid valves. However, in other embodiments, the first and second valve b674, b686 can be other suitable types of valves.

Moreover, as depicted, the working chamber b654 has an inlet and an outlet. In some embodiments, the inlet and the outlet of the working chamber b654 are defined by the tubular housing b652, e.g., at the first end b660 and the second end b662, respectively. In yet other embodiments, the inlet and the outlet of the working chamber b654 are defined by other components of the linear constant density heat exchanger b650. For instance, for the depicted embodiment of FIG. 25, the inlet of the working chamber b654 is defined by the inlet conduit b670 immediately downstream of the first valve b674 and the outlet of the working chamber b654 is defined by the outlet conduit b682 immediately upstream of the second valve b686. The first valve b674 is movable between an open position and a closed position. Likewise, the second valve b686 is movable between an open position and a closed position. In some embodiments, the one or more valves are communicatively coupled with one or more controllers b692. The one or more controllers b692 can cause the valves to move between their respective open and closed positions. The one or more controllers b692 can cause the valves to open and/or close simultaneously or at offset times from one another.

An example manner in which the linear constant density heat exchanger b650 can heat working fluid held at constant density will now be described. That is, an example heating cycle will now be described. In some embodiments, the one or more controllers b692 are configured to cause the first valve b674 and the second valve b686 to move to their respective open positions such that a first volume of working fluid flows into the working chamber b654. As this occurs, a volume of working fluid heated while held at constant density during a previous heating cycle exits the working chamber b654. That is, in causing the first valve b674 and the second valve b686 to move to their respective open positions, a new or unheated volume of working fluid flows into the working chamber b654 while the volume of working fluid heated at constant density during a previous heating cycle flows out of the working chamber b654. Thus, when the valves are moved to their respective open positions, a volume of working fluid heated at constant density exits the working chamber b654 and a non-heated volume of working fluid enters the working chamber b654.

After a predetermined open time has elapsed, the one or more controllers b692 cause the first valve b674 and the second valve b686 to move to their respective closed positions such that a volume of working fluid is contained within the working chamber b654 at constant density. The first and second valves b674, b686 can be closed simultaneously. With the density of the working fluid held constant within the working chamber b654, the heat exchange fluid HXF flowing through the heat exchange chamber b690 heats or imparts thermal energy to the working fluid held at constant density for a predetermined heating time (e.g., about five seconds, about one second, about 250 milliseconds, etc.). For instance, the heat exchange fluid HXF can flow serially through the outlet chamber b680, the heat exchange chamber b690, and the inlet chamber b668 as described above (e.g., in a direction generally to the left in FIG. 25). As this occurs, the heat exchange fluid HXF heats the working fluid held at constant density within the working chamber b654. As the working fluid is held at constant density within the working chamber b654 during heat application, the temperature and pressure of the working fluid increases. The increased temperature and pressure of the working fluid increases the potential energy of the working fluid, and consequently, more useful work can be produced from the working fluid, by an expansion device positioned downstream of the linear constant density heat exchanger b650.

After the predetermined heating time has elapsed and the working fluid is heated at constant density to increase the temperature and pressure of the working fluid, the one or more controllers b692 can cause the first valve b674 and the second valve b686 to move to their respective open positions such that the heated volume of working fluid flows out of the working chamber b654. As this occurs, a non-heated volume of working fluid flows into the working chamber b654. That is, in causing the first valve b674 and the second valve b686 to move to their respective open positions, the heated volume of working fluid flows out of the working chamber b654 and another or second volume of working fluid is permitted to flow into the working chamber b654, e.g., to start the heating cycle once again. The first and second valves b674, b686 can be opened simultaneously. Alternatively, the first and second valves b674, b686 can be controlled by the one or more controllers b692 to open at offset times.

Figure 26:
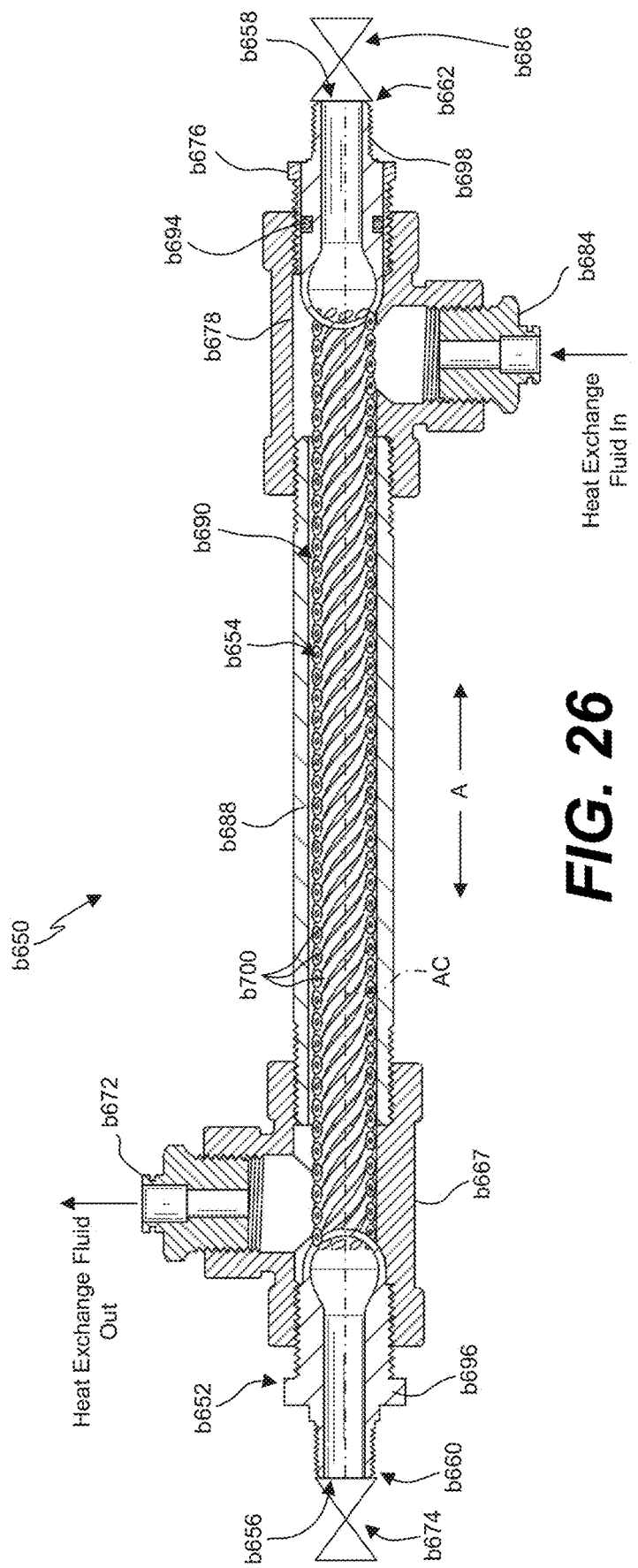
FIG. 26 provides a schematic cross sectional view of another linear constant density heat exchanger according to an example embodiment of the present disclosure.

FIG. 26 provides a schematic cross sectional view of another linear constant density heat exchanger b650 according to an example embodiment of the present disclosure. Generally, the linear constant density heat exchanger b650 of FIG. 26 is configured in a similar manner as the linear constant density heat exchanger b650 of FIG. 25, except as provided below.

For this embodiment, the housing extends between a first end b660 and a second end b662 along the axial direction A. The housing has a housing inlet port b696 at the first end b660 defining an inlet b656 of the working chamber b654 and a housing outlet port b698 at the second end b662 defining an outlet b658 of the working chamber b654. The housing inlet port b696 of the housing is connected to (e.g., threadingly engaged with) the inlet housing b667, which is connected to (e.g., threadingly engaged with) the first heat exchanger port b672. An outlet port b676 is disposed around the housing outlet port b698 and is connected to (e.g., threadingly engaged with) the outlet housing b678. The housing outlet port b698 is received within the outlet port b676 as shown in FIG. 26. A sealing member b694 extends annularly around the housing outlet port b698 and provides a seal between the housing outlet port b698 and the outlet port b676. The sealing member b694 prevents heat exchange fluid HXF from exiting the outlet housing b678. The heater housing b688 is connected to (e.g., threadingly engaged with) the inlet housing b667 at one end and the outlet housing b678 at its other end.

Figure 27:
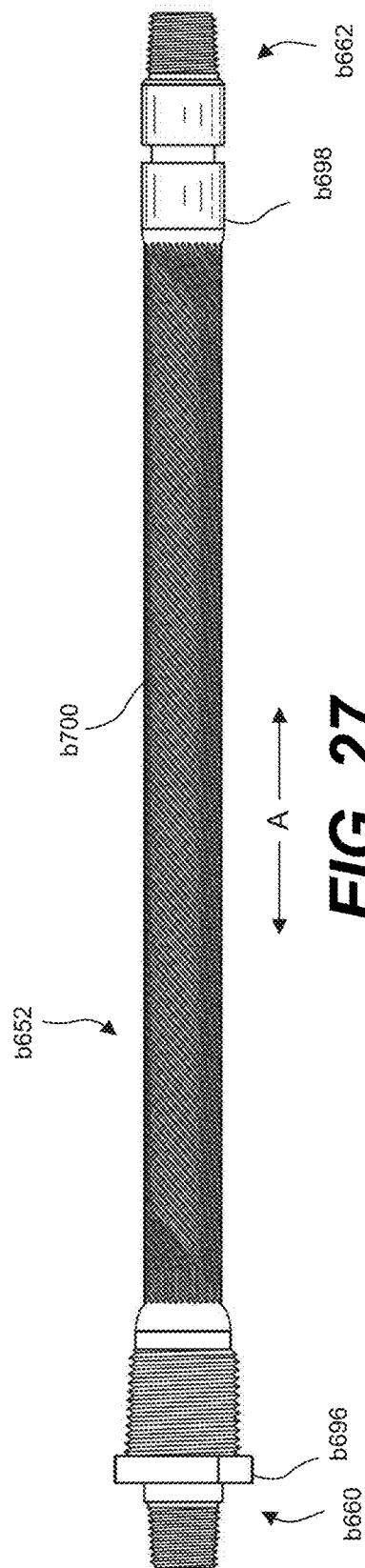
FIG. 27 provides a side view of a housing that can be implemented in a linear constant density heat exchanger according to an example embodiment of the present disclosure.
Figure 28:
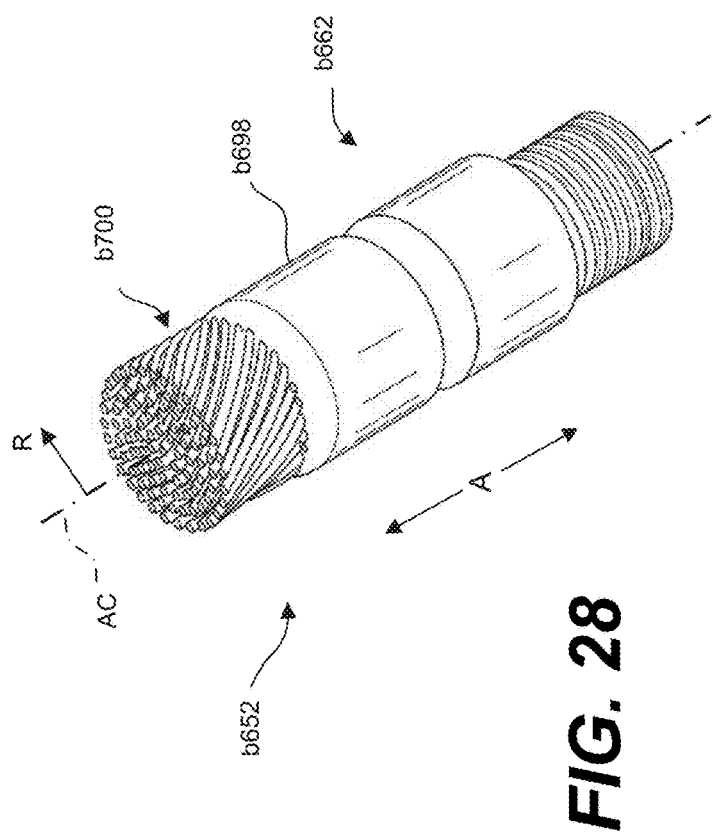
FIG. 28 provides a close-up view of a second end of the housing of FIG. 27 and depicts a plurality of heat exchange tubes with their ends cutoff for illustrative purposes.

Notably, for this embodiment, the housing has a plurality of heat exchange tubes b700 extending between the housing inlet port b696 and the housing outlet port b698 of the housing. In some embodiments, the plurality of heat exchange tubes b700 include at least two (2) heat exchange tubes b700 extending between the inlet port b664 and the outlet port b676. In other embodiments, the plurality of heat exchange tubes b700 include at least eight (8) heat exchange tubes b700 extending between the inlet port b664 and the outlet port b676. In yet other embodiments, the plurality of heat exchange tubes b700 include at least twenty (20) heat exchange tubes b700 extending between the inlet port b664 and the outlet port b676 (e.g., as shown in FIGS. 27 and 28). In some further embodiments, the plurality of heat exchange tubes b700 include at least fifty (50) heat exchange tubes b700 extending between the inlet port b664 and the outlet port b676 (e.g., as shown in FIGS. 27 and 28). The plurality of heat exchange tubes b700 spiral about a center axis (e.g., the axial centerline) defined by the housing. Further, the heat exchange tubes b700 provide fluid communication between the housing inlet port b696 and the housing outlet port b698. Accordingly, working fluid can flow from the housing inlet port b696, through the plurality of heat exchange tubes b700, and into the housing outlet port b698 (e.g., in a left to right direction in FIG. 26). The outlet housing b678, the heater housing b688, and the inlet housing b667 define a heat exchange chamber b690, denoted as the HX chamber in FIG. 26. The heat exchange tubes b700 are received within the HX chamber. A heat exchange fluid HXF (e.g., exhaust gases from a closed cycle engine b110 disclosed herein) can flow into the linear constant density heat exchanger b650 through the second heat exchanger port b684 and into the HX chamber. The heat exchange fluid HXF can then flow in a right to left direction in FIG. 26 along the axial direction A and can impart thermal energy to the working fluid flowing through the working chamber b654, or more specifically, through the plurality of heat exchange tubes b700. The heat exchange fluid HXF eventually flows into the inlet housing b667 and exits the linear constant density heat exchanger b650 through the first heat exchanger port b672. Advantageously, the heat exchange tubes b700 increase the surface area in which heat exchange fluid HXF can flow along or against. Thus, heat transfer exchange between the heat exchange fluid HXF and the working fluid flowing through the working chamber b654 (e.g., through the heat exchange tubes b700) can be made more efficient with the spiraling heat exchange tubes b700. In some embodiments, the housing is additively manufactured, e.g., by one or more of the methods described herein.

Referring now to FIGS. 27 and 28, FIG. 27 provides a side view of a housing that can be implemented in a linear constant density heat exchanger b650 and FIG. 28 provides a close-up view of a second end b662 of the housing of FIG. 27 and depicts a plurality of heat exchange tubes b700 with their ends cutoff for illustrative purposes. In some embodiments, for example, the housing can be implemented in the linear constant density heat exchanger b650 of FIG. 26. As shown, the housing includes a plurality of heat exchange tubes b700 extending between the housing inlet port b696 and the housing outlet port b698 of the housing. The plurality of heat exchange tubes b700 spiral about a center axis (e.g., the axial centerline) defined by the housing. Specifically, the heat exchange tubes b700 are helically wound about the axial centerline as they extend between the housing inlet port b696 and the housing outlet port b698 of the housing. Further, for this embodiment, the plurality of tubes are arranged in radially spaced rows. Stated another way, the heat exchange tubes b700 are arranged in circular arrays with adjacent arrays being radially spaced from one another as viewed from an axial cross section of the housing. In some embodiments, the circular arrays are concentrically arranged. Further, in some embodiments, the heat exchange tubes b700 are capillary or micro capillary tubes.

When the housing depicted in FIGS. 27 and 28 is implemented in a linear constant density heat exchanger b650, the heat exchange tubes b700 provide fluid communication between the housing inlet port b696 and the housing outlet port b698. Accordingly, working fluid can flow from the housing inlet port b696, through the plurality of heat exchange tubes b700, and into the housing outlet port b698. The outlet housing b678, the heater housing b688, and the inlet housing b667 can define a heat exchange chamber b690, e.g., as noted above. The heat exchange tubes b700 are received within the HX chamber. A heat exchange fluid HXF (e.g., exhaust gases from a closed cycle engine b110 disclosed herein) can flow into the linear constant density heat exchanger b650 through the second heat exchanger port b684 and into the HX chamber. The heat exchange fluid HXF can then flow along the axial direction A and can impart thermal energy to the working fluid flowing through the working chamber b654, or more specifically, through the plurality of heat exchange tubes b700. The heat exchange fluid HXF eventually flows into the inlet housing b667 and exits the linear constant density heat exchanger b650 through the first heat exchanger port b672. Advantageously, the heat exchange tubes b700 increase the surface area in which heat exchange fluid HXF can flow along or against. Thus, heat transfer exchange between the heat exchange fluid HXF and the working fluid flowing through the working chamber b654 (e.g., through the heat exchange tubes b700) can be made more efficient with the spiraling heat exchange tubes b700 arranged in radially spaced rows. In some embodiments, the housing is additively manufactured, e.g., by one or more of the methods described herein.

Figure 29:
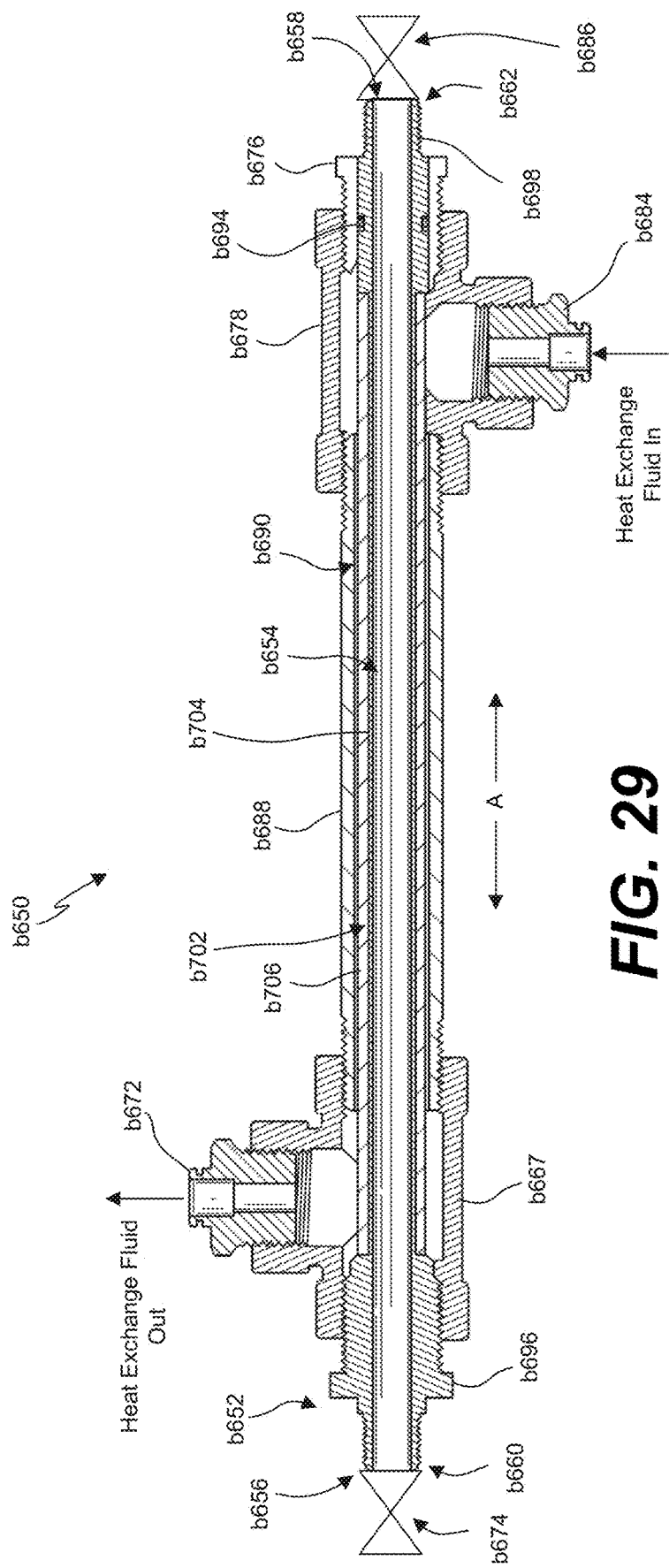
FIG. 29 provides a schematic cross sectional view of another example linear constant density heat exchanger according to an aspect of the present disclosure.

FIG. 29 provides a schematic cross sectional view of another example linear constant density heat exchanger b650 according to an aspect of the present disclosure. Generally, the linear constant density heat exchanger b650 of FIG. 29 is configured in a similar manner as the linear constant density heat exchanger b650 of FIG. 25, except as provided below.

For this embodiment, the housing extends between a first end b660 and a second end b662 along the axial direction A. The housing has a housing inlet port b696 at the first end b660 and a housing outlet port b698 at the second end b662. The housing inlet port b696 defines an inlet of the working chamber b654 and the housing outlet port b698 defines an outlet of the working chamber b654. The housing has a main body b702 extending between the housing inlet port b696 and the housing outlet port b698 along the axial direction A. The main body b702 is generally tubular in this example embodiment. The housing inlet port b696 of the housing is connected to (e.g., threadingly engaged with) the inlet housing b667, which is connected to (e.g., threadingly engaged with) the first heat exchanger port b672. The outlet port b676 is disposed around the housing outlet port b698. The outlet port b676 is connected to (e.g., threadingly engaged with) the outlet housing b678. The housing outlet port b698 is received within the outlet port b676 as shown in FIG. 29. A sealing member b694 extends annularly around the housing outlet port b698 and provides a seal between the housing outlet port b698 and the outlet port b676. The sealing member b694 prevents heat exchange fluid HXF from exiting the outlet housing b678. The heater housing b688 is connected to (e.g., threadingly engaged with) the inlet housing b667 at one end and the outlet housing b678 at its other end. The heater housing b688 annularly surrounds the main body b702 of the housing.

In addition, for this embodiment, the tubular housing b652 defines or has a mesh or mesh portion b706 that extends annularly around a wall b704 of the tubular housing b652. The mesh portion b706 also extends along the entire main body b702 of the housing b652 along the axial direction A. In some embodiments, the mesh portion b706 is a lattice structure. The lattice structure can be generally porous. The mesh portion b706 allows for heat exchange fluid HXF to flow radially closer to the working fluid and also provides additional surface area in which heat exchange fluid HXF can flow along or against. Thus, heat transfer exchange between the heat exchange fluid HXF and the working fluid flowing through the working chamber b654 can be made more efficient with the mesh portion b706. In some embodiments, the housing b652 is additively manufactured, e.g., by one or more of the methods described herein.

Figure 30:
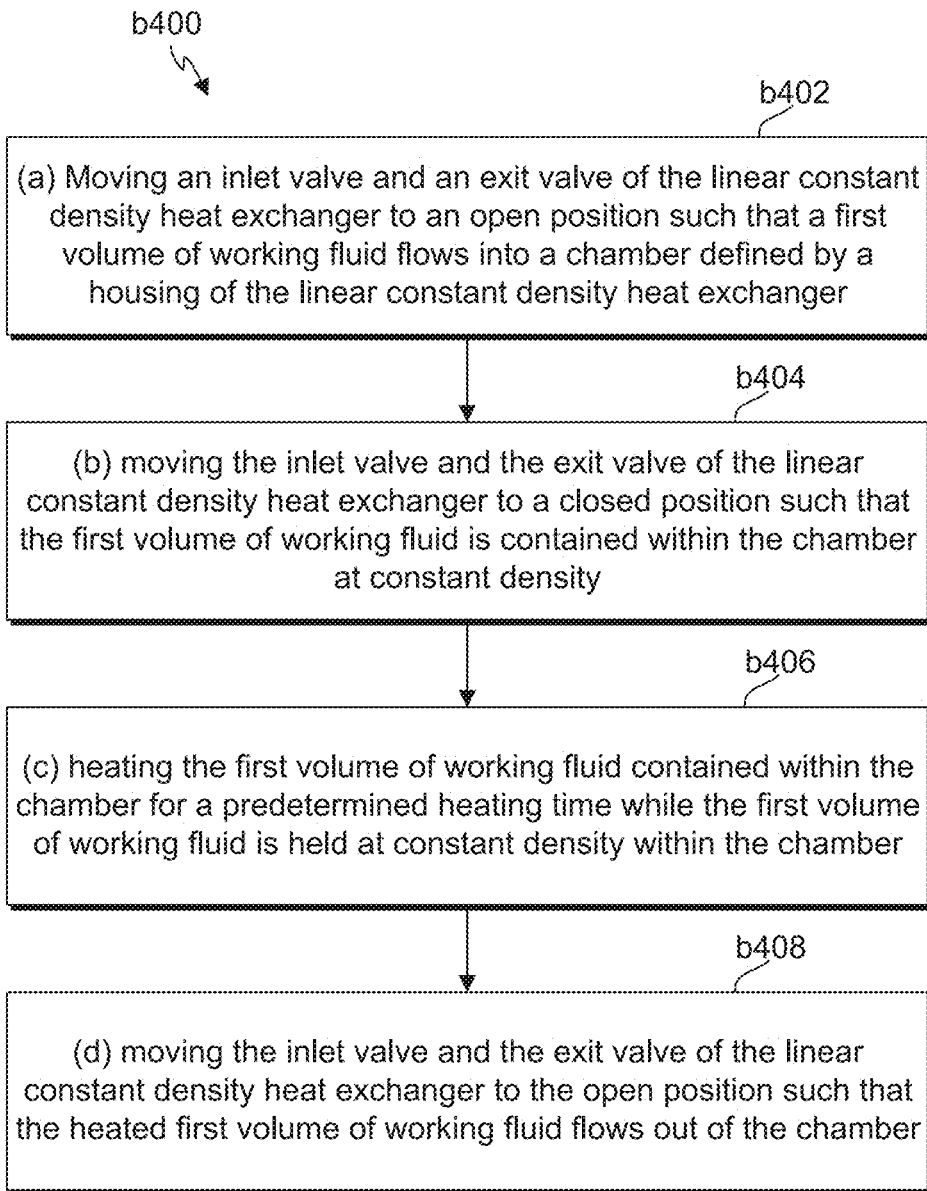
FIG. 30 provides a flow diagram for a method of controlling a linear constant density heat exchanger according to an aspect of the present disclosure.

FIG. 30 provides a flow diagram for a method (400) of controlling a linear constant density heat exchanger b650 according to an aspect of the present disclosure. For instance, the method (400) can be implemented to control any of the linear constant density heat exchangers b650 described herein. However, the scope of method (400) is not limited to the linear constant density heat exchangers b650 provided herein. Some or all of the method (400) can be implemented by the one or more controllers b692 and flow control devices described herein. In addition, it will be appreciated that exemplary method (400) can be modified, adapted, expanded, rearranged and/or omitted in various ways without deviating from the scope of the present subject matter.

At (402), the method (400) includes (a) moving an inlet valve and an exit valve of the linear constant density heat exchanger b650 to an open position such that a first volume of working fluid flows into a chamber defined by a housing of the linear constant density heat exchanger b650. In some implementations, in moving the inlet valve and the exit valve of the linear constant density heat exchanger b650 to the open position at (a), a second volume of working fluid flows out of the chamber as the first volume of working fluid flows into the chamber. Furthermore, in some implementations, in moving the inlet valve and the exit valve of the linear constant density heat exchanger b650 to the open position such that the first volume of working fluid flows into the chamber at (a), the inlet valve and the exit valve are moved to their respective open positions simultaneously.

At (404), the method (400) includes (b) moving the inlet valve and the exit valve of the linear constant density heat exchanger b650 to a closed position such that the first volume of working fluid is contained within the chamber at constant density. In some implementations, when the inlet valve and the exit valve of the linear constant density heat exchanger b650 are moved to their respective closed positions at (b), the second volume of working fluid is substantially removed from the chamber. Moreover, in some implementations, in moving the inlet valve and the exit valve of the linear constant density heat exchanger b650 to the closed position such that the first volume of working fluid is contained within the chamber at (b), the inlet valve and the exit valve are moved to the closed position simultaneously.

At (406), the method (400) includes (c) heating the first volume of working fluid contained within the chamber for a predetermined heating time while the first volume of working fluid is held at constant density within the chamber. Stated another way, at (406), heat is applied to the working fluid trapped in the working chamber b654. Accordingly, during heat application, no additional working fluid is allowed to flow into the working chamber b654 and working fluid is prevented from flowing out of the working chamber b654. In this way, not only is the temperature of the working fluid increased, the pressure of the working fluid is increased as well. Thus, the potential energy of the working fluid heated at constant density can be increased.

At (408), the method (400) includes (d) moving the inlet valve and the exit valve of the linear constant density heat exchanger b650 to the open position such that the heated first volume of working fluid flows out of the chamber. In some implementations, in moving the inlet valve and the exit valve of the linear constant density heat exchanger b650 to the open position at (d), the heated first volume of working fluid flows out of the chamber and a third volume of working fluid flows into the chamber. Furthermore, in some implementations, in moving the inlet valve and the exit valve of the linear constant density heat exchanger b650 to the open position such that the first volume of working fluid flows out of the chamber at (d), the inlet valve and the exit valve are moved to their respective open positions simultaneously.

In some implementations of method (400), moving the inlet valve and the exit valve of the linear constant density heat exchanger b650 to the open position at (a) or (402), moving the inlet valve and the exit valve of the linear constant density heat exchanger b650 to the closed position at (b) or (404), heating the first volume of working fluid contained within the chamber for the predetermined heating time while the first volume of working fluid is held at constant density within the chamber at (c) or (406), and moving the inlet valve and the exit valve of the linear constant density heat exchanger b650 to the open position such that the heated first volume of working fluid flows out of the chamber at (d) or (408) defines or constitutes a heating cycle for the first volume of working fluid. The heating cycle can be iterated for a plurality of subsequent volumes of working fluid. Further, in some implementations, the heating cycle is performed by the linear constant density heat exchanger b650 at a frequency of less than about 1.5 Hz. In some implementations, the heating cycle is performed by the linear constant density heat exchanger b650 at a frequency between 4 Hz and 10 Hz.

In addition, in some implementations, the method (400) further includes determining a steady state exit mass flow rate at the outlet of the chamber for a predetermined calibration time. For instance, the steady state exit mass flow can be determined by opening the inlet and exit valves for a predetermined calibration time to determine the steady state exit mass flow rate at the outlet of the chamber. For instance, a sensor can be positioned at or proximate the outlet of the working chamber b654. The sensor can be operable to sense characteristics of the working fluid mass flow at the outlet so that the steady state exit mass flow rate can be determined. In some implementations, the method (400) can further include setting a cycle time of the heating cycle based at least in part on the determined steady state exit mass flow rate.

In some implementations, setting the cycle time of the heating cycle based at least in part on the determined steady state exit mass flow rate includes: i) determining an average pulse exit mass flow rate at the outlet of the chamber for a predetermined averaging time; and setting the cycle time of the heating cycle such that the determined steady state exit mass flow rate and the average pulse exit mass flow rate are about equal. In yet other implementations, the method (400) includes setting a cycle time of the heating cycle about equal to a time in which a particle of the working fluid flows from the inlet to the outlet of the linear constant density heat exchanger b650.

Rotary Constant Density Heat Exchanger

FIGS. 31 and 32 provide views of a rotary constant density heat exchanger b710 according to an example embodiment of the present disclosure. Particularly, FIG. 31 provides a perspective view of the rotary constant density heat exchanger b710 and FIG. 32 provides a front view thereof. Generally, like the linear constant density heat exchangers b650 described herein, the rotary constant density heat exchanger b710 is operable to hold a volume of working fluid at constant density during heat application. The rotary constant density heat exchanger b710 can be implemented in any of the embodiments of the Notarnicola cycle system b500 and/or any of the systems described herein. For reference, the rotary constant density heat exchanger b710 defines an axial direction A, a radial direction R, a circumferential direction C, and an axial centerline AC extending along the axial direction A. The radial direction R extends to and from the axial centerline AC in a direction orthogonal to the actual direction A. The circumferential direction C extends 360° around the axial centerline AC.

The rotary constant density heat exchanger b710 includes a housing b712 extending between a first end b714 and a second end b716 along the axial direction A. The housing b712 is cylindrically shaped in the depicted embodiment of FIGS. 31 and 32. However, in alternative embodiments, the housing b712 can have another suitable shape or configuration. The housing b712 defines at least one working chamber b724 having an inlet b726 and an outlet b728. For this embodiment, the housing b712 defines a plurality of working chambers each having an inlet b726 and an outlet b728. The inlet b726 of each working chamber is defined at or proximate the first end b714 of the housing b712 and the outlet b728 of each working chamber is defined at or proximate the second end b716 of the housing b712. Each working chamber extends along the axial direction A between the first end b714 and the second end b716 of the housing b712. Particularly, the housing b712 has a first axial face b730 (FIG. 33) at the first end b714 and a second axial face b732 (FIG. 33) at the second end b716. The first axial face b730 defines the respective inlets b726 of the working chambers and the second axial face b732 defines the respective outlets b728 of the working chambers. Further, the working chambers are generally cylindrically shaped in this example embodiment, however, the working chambers can have other suitable shapes in alternative embodiments.

In addition, for this embodiment, the plurality of working chambers are arranged in a circular array along the outer periphery of the cylindrical housing b712 as shown best in FIG. 32. Specifically, the plurality of working chambers are spaced from one another along the circumferential direction C and are arranged in the positions of the hours of a clock face. For instance, for this embodiment, the plurality of working chambers include a first working chamber positioned at a one o'clock position (WC-1), a second working chamber positioned at a two o'clock position (WC-2), a third working chamber positioned at a three o'clock position (WC-3), a fourth working chamber positioned at a four o'clock position (WC-4), a fifth working chamber positioned at a five o'clock position (WC-5), a sixth working chamber positioned at a six o'clock position (WC-6), a seventh working chamber position at a seven o'clock position (WC-7), an eighth working chamber positioned at an eight o'clock position (WC-8), a ninth working chamber positioned at a nine o'clock position (WC-9), a tenth working chamber positioned at a ten o'clock position (WC-10), a eleventh working chamber positioned at a eleven o'clock position (WC-11), and finally, a twelfth working chamber positioned at a twelve o'clock or noon position (WC-12).

The rotary constant density heat exchanger b710 also includes a first plate b718 positioned at the first end b714 of the housing b712 and a second plate b720 positioned at the second end b716 of the housing b712. The first plate b718 is shown transparent in FIGS. 31 and 32 for illustrative purposes. The first and second plates b718, b720 are cylindrically shaped, however, the plates b718, b720 can have other configurations in other example embodiments. The first plate b718 is rotatable about an axis of rotation (e.g., the axial centerline AC) such that the first plate b718 selectively allows working fluid to flow into one of the working chambers. The second plate b720 is likewise rotatable about an axis of rotation (e.g., the axial centerline AC) such that the second plate b720 selectively allows working fluid to flow out of one of the working chambers. The first plate b718 and the second plate b720 can be rotatable about the axis of rotation in unison, for example.

The first plate b718 defines a port b722 at its outer periphery. The port b722 defined by the first plate b718 is sized complementary to axial cross section of one of the working chambers. When the port b722 of the first plate b718 is aligned with the inlet b726 of a given working chamber, the first plate b718 selectively allows working fluid to flow into that working chamber. For instance, as shown in FIGS. 31 and 32, the port b722 of the first plate b718 is shown aligned with the inlet b726 of the third working chamber WC-3. Accordingly, the first plate b718 and port b722 thereof selectively allow working fluid to flow into the third working chamber WC-3 (assuming the third working chamber can receive an additional volume of working fluid). In contrast, when the port b722 of the first plate b718 is not aligned with the inlet b726 of a given working chamber, the first plate b718 prevents working fluid from flowing into that particular chamber. For instance, as illustrated in FIGS. 31 and 32, the port b722 of the first plate b718 is shown aligned with the inlet b726 of the third working chamber WC-3. Accordingly, the first plate b718 prevents working fluid from flowing into any of the working chambers (e.g., WC-1, WC-2, WC-4, WC-5, WC-6, WC-7, WC-8, WC-9, WC-10, WC-11, and WC-12) that are not the third working chamber WC-3.

The second plate b720 likewise defines a port b723, e.g., in a similar manner as the first plate b718 defines the port b722. The port b723 defined by the second plate b720 is sized complementary to axial cross section of one of the working chambers. When the port b723 of the second plate b720 is aligned with the outlet b728 of a given working chamber, the second plate b720 selectively allows working fluid to flow out of that given working chamber. For example, if the port b723 of the second plate b720 is aligned with the outlet of the third working chamber WC-3, the second plate b720 and port b723 thereof selectively allow working fluid to flow out of the third working chamber WC-3 (assuming the third working chamber contains working fluid). In contrast, when the port b723 of the second plate b720 is not aligned with the outlet of a given working chamber, the second plate b720 prevents working fluid from flowing out of that particular working chamber. For example, if the port b723 of the second plate b720 is aligned with the outlet of the third working chamber WC-3, the second plate b720 prevents working fluid from flowing out of any of the working chambers that are not the third working chamber WC-3.

Figure 33:
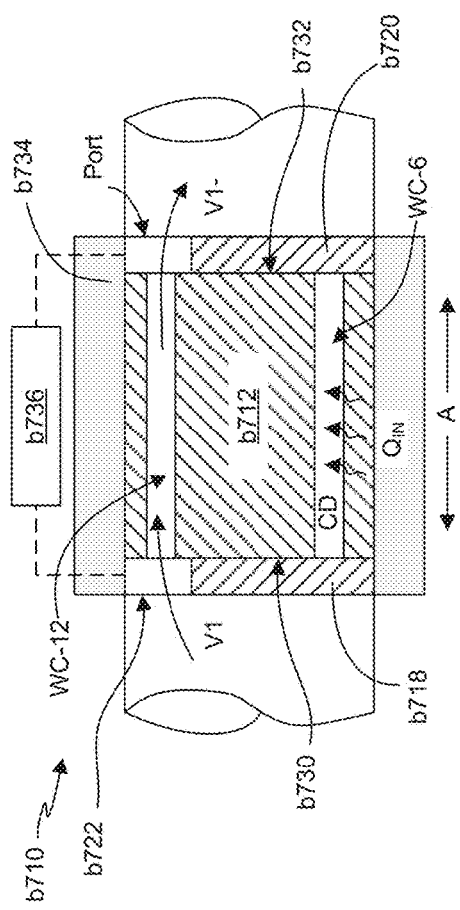
FIG. 33 provides a cross-sectional view of the rotary constant density heat exchanger of FIGS. 31 and 32 with the ports of the first plate and second plate positioned at a twelve o'clock position.
Figure 34:
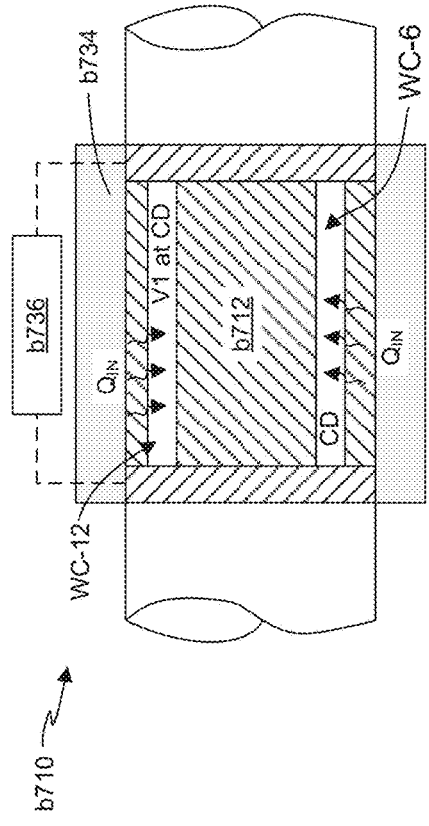
FIG. 34 provides a cross-sectional view of the rotary constant density heat exchanger of FIGS. 31 and 32 with the ports of the first plate and second plate not positioned at the twelve o'clock position.

FIGS. 33, 34, and 35 provide cross sectional views of the rotary constant density heat exchanger b710 of FIGS. 31 and 32. Particularly, FIG. 33 provides a cross-sectional view of the rotary constant density heat exchanger b710 with the ports b722, b723 of the first plate b718 and second plate b720 positioned at a twelve o'clock position. FIG. 34 provides a cross-sectional view of the rotary constant density heat exchanger b710 with the ports b722, b723 of the first plate b718 and second plate b720 positioned not at the twelve o'clock position. FIG. 35 provides a cross-sectional view of the rotary constant density heat exchanger b710 with the ports b722, b723 of the first plate b718 and second plate b720 positioned at a twelve o'clock position after one revolution of the plates.

As depicted, a heat source b734 annularly surrounds the cylindrically shaped housing b712. The heat source b734 is operable to impart thermal energy to the housing b712, and in turn, the housing b712 imparts thermal energy to the working fluid contained within the working chambers. The heat source b734 can be any suitable heat source b734, such as e.g., exhaust gases from a closed cycle engine b110 described herein, an electric heater, etc. Further, although the heat source b734 is shown positioned annularly around the cylindrical housing b712, the heat source b734 can additionally or alternatively be positioned radially inward of the plurality of working chambers, e.g., as shown in FIG. 36. Moreover, the first plate b718 and the second plate b720 can be operatively coupled with one or more controllers b736. For instance, one or more controllers b736 can be communicatively coupled with an electric motor or drive mechanically coupled with the plates b718, b720, e.g., via a shaft. The electric motor or drive can drivingly rotate the plates about the axis of rotation. As will be explained more fully below, the first plate b718 and the second plate b720 are rotatable about the axis of rotation such that the heat source b734 imparts thermal energy to working fluid held at constant density within the working chambers for a predetermined heating time.

Generally, the rotary constant density heat exchanger b710 operates in a revolver-like fashion. Particularly, the plates b718, b720 are rotated to sequentially allow working fluid to enter/exit a given working chamber, and while a new volume of working fluid enters a given working chamber and a heated volume of working fluid exits that particular working chamber, the other volumes of working fluid contained within the other working chambers are heated at constant density. Thus, as the plates b718, b720 are rotated about, a high pressure, high temperature volume of working fluid exits one of the working chambers, and at the same time, a lower pressure, lower temperature volume of working fluid enters one of the working chambers. As this occurs, as noted above, heat is applied to the working fluid held at constant density within the other working chambers until released by alignment of the ports b722, b723 with the working chamber.

An example manner of operation of the rotary constant density heat exchanger b710 will now be provided. In some embodiments, the one or more controllers b736 are configured to cause the first plate b718 and the second plate b720 to rotate such that a first volume of the working fluid flows into a working chamber. More specifically, the first plate b718 and the second plate b720 are rotated about the axis of rotation in unison such that the port b722 defined by the first plate b718 is aligned with the port b723 defined by the second plate b720 along the circumferential direction C. For instance, as shown in FIG. 33, the one or more controllers b736 can cause the first and second plates b718, b720 to rotate such that their respective ports b722, b723 are positioned at the twelve o'clock position. When the ports b722, b723 are positioned at the twelve o'clock position, a first volume of working fluid V1 can flow into the twelfth working chamber WC-12 through the port of the first plate b718. In causing the first plate b718 and the second plate b720 to rotate such that the first volume V1 of working fluid flows into the working chamber, a second volume of working fluid is removed from the working chamber. For instance, as the first volume V1 of working fluid flows into the twelfth working chamber WC-12, a second volume of fluid V1– can flow out of the twelfth working chamber WC-12 through the port of the second plate b720 as shown in FIG. 33. Thus, when the ports b722, b723 are aligned with a particular working chamber, a new or unheated volume of working fluid flows into the working chamber and a heated volume of working fluid flows out of the working chamber.

After a predetermined open time, the one or more controllers b736 cause the first plate b718 and the second plate b720 to rotate such that the first volume of working fluid is contained or trapped within the working chamber. In this way, the working fluid can be held at constant density during heat application. For instance, as shown in FIG. 34, the first plate b718 and the second plate b720 can be rotated such that the port of the first plate b718 and the port of the second plate b720 are no longer positioned at the twelve o'clock position. For example, if the first and second plates b718, b720 are rotated clockwise, the ports b722, b723 of the first and second plates b718, b720 can be positioned at the one o'clock position (or some other position that is not the 12 o'clock position). If, on the other hand, the first and second plates b718, b720 are rotated counterclockwise, the ports b722, b723 of the first and second plates b718, b720 can be positioned at an 11 o'clock position (or some other position that is not the 12 o'clock position). Notably, when the ports b722, b723 of the first and second plates b718, b720 are no longer positioned at the twelve o'clock position, the first volume V1 of working fluid is held at constant density within the twelfth working chamber WC-12, e.g., as shown in FIG. 34. Similarly, the other volumes of working fluid held within all of the other working chambers not in aligned with the ports b722, b723 of the first and second plates b718, b720, and thus, the working fluid in these working chambers is heated at constant density as well. For instance, if the first and second plates b718, b720 are rotated clockwise after allowing the first volume V1 of working fluid into the twelfth working chamber WC-12 such that the ports b722, b723 of the first and second plates b718, b720 are positioned at the one o'clock position, working fluid is held at constant density and is heated within the second, third, fourth, fifth, sixth, seventh, eighth, ninth, tenth, eleventh, and as noted above, the twelfth working chambers WC-2, WC-3, WC-4, WC-5, WC-6, WC-7, WC-8, WC-9, WC-10, WC-11, and WC-12.

The one or more controllers b736 are further configured to cause the heat source b734 to impart thermal energy to the first volume of working fluid for a predetermined heating time as the first plate b718 and the second plate b720 hold the first volume of the working fluid at constant density within the working chamber. For instance, as the first volume V1 is held at constant density in the twelfth working chamber WC-12 as shown in FIG. 34, the heat source b734 imparts thermal energy (e.g., heats) to the first volume V1 of working fluid held therein as denoted by $Q_{IN}$. The first volume V1 is heated for the predetermined heating time. For example, the predetermined heating time can correspond to the time is takes the first and second plates b718, b720 to rotate one revolution. The one or more controllers b736 can cause or continue to cause the first plate b718 and the second plate b720 to rotate such that the heated first volume V1 of the working fluid flows out of the twelfth working chamber WC-12, e.g., as shown in FIG. 35. In causing the first plate b718 and the second plate b720 to rotate such that the heated first volume V1 of the working fluid flows out of the twelfth working chamber WC-12, a third volume V1+ of working fluid is permitted to flow into the twelfth working chamber WC-12.

As noted above, the process described above can be iterated such that working fluid is moved into and out of a given working chamber sequentially as the first and second plates b718, b720 rotate about the axis of rotation. Further, in some embodiments, the rotary constant density heat exchanger b710 is additively manufactured, e.g., by one or more of the methods described herein.

Figure 37:
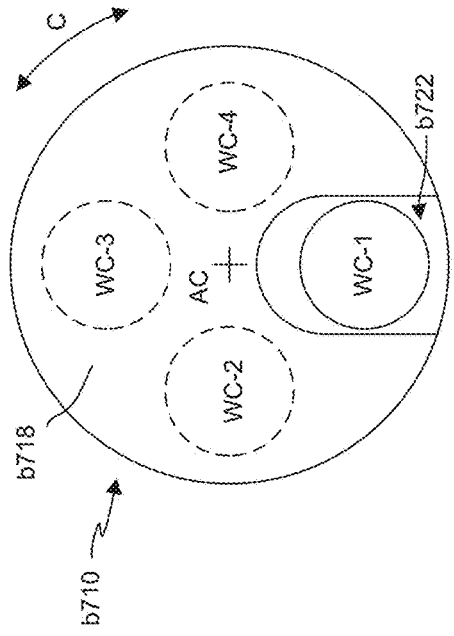
FIG. 37 provides a front view of another rotary constant density heat exchanger according to an example embodiment of the present disclosure.

FIG. 37 provides a front view of another rotary constant density heat exchanger b710 according to an example embodiment of the present disclosure. The rotary constant density heat exchanger b710 of FIG. 37 is similarly configured as the rotary constant density heat exchanger b710 of FIGS. 31 through 35, expect as provided below. The housing b712 (hidden in FIG. 37) of the rotary constant density heat exchanger b710 can define any suitable number of working chambers. For instance, for this embodiment, the housing b712 defines four working chambers, including a first working chamber WC-1, a second working chamber WC-2, a third working chamber WC-3, and a fourth working chamber WC-4. As illustrated, the working chambers are spaced from one another along the circumferential direction C and are arranged in a circular array. Notably, in this embodiment, the housing b712 defines only four working chambers (as opposed to the twelve working chambers of the embodiment depicted in FIGS. 31 through 35. The rotary constant density heat exchanger b710 of FIG. 37 can heat working fluid held at constant density for a predetermined heating time in the same or similar manner described above, except that in this embodiment, the rotating first plate b718 and second plate b720 (hidden in FIG. 37) rotate between the four working chambers.

Figure 39:
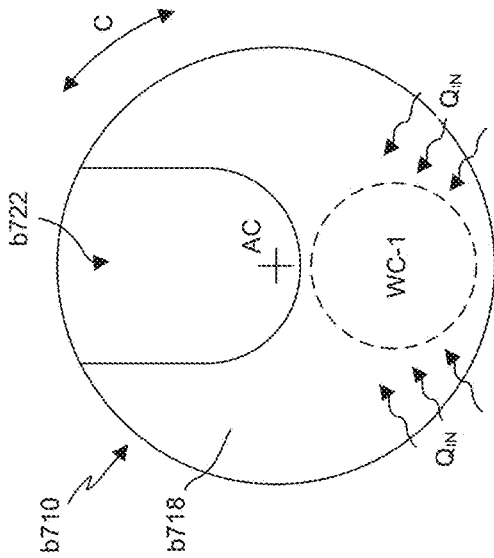
FIGS. 38 and 39 provide front views of another rotary constant density heat exchanger according to an example embodiment of the present disclosure.
Figure 38:
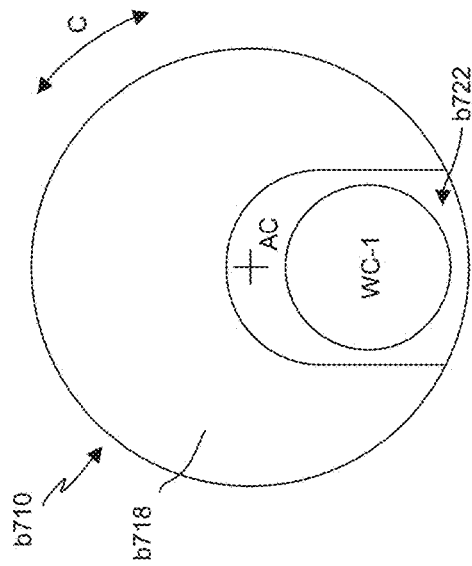

FIG. 38 and FIG. 39 provide front views of another rotary constant density heat exchanger b710 according to an example embodiment of the present disclosure. The rotary constant density heat exchanger b710 of FIGS. 38 and 39 is similarly configured as the rotary constant density heat exchanger b710 of FIGS. 31 through 35, expect as provided below. For this embodiment, the housing b712 defines only a single working chamber, denoted as first working chamber WC-1. As illustrated in FIG. 38, the port defined by the first plate b718 is aligned with the first working chamber WC-1 along the circumferential direction C. The port defined by the second plate b720 is aligned with the first working chamber WC-1 along the circumferential direction C as well (not shown in FIG. 38). Thus, non-heated working fluid can flow into the first working chamber WC-1 and working fluid heated at constant density can flow out of the first working chamber WC-1. Once the non-heated volume of working fluid has moved into the first working chamber WC-1, one or more controllers b736 can cause the first and second plates b718, b720 to rotate about the circumferential direction C to trap the working fluid in the first working chamber WC-1. As the first and second plates b718, b720 are rotated about the circumferential direction C, the heat is applied to the working fluid held at constant density, e.g., as shown in FIG. 39. As noted previously, this can increase the temperature and pressure of the working fluid, thereby increasing the potential energy of the working fluid. After a predetermined heating time, which can be synchronized with the time associated with the plates making one or more revolutions, the ports b722, b723 of the plates can be realigned with the first working chamber along the circumferential direction C. In this way, the heating cycle is completed and a new heating cycle can commence.

Figure 41:
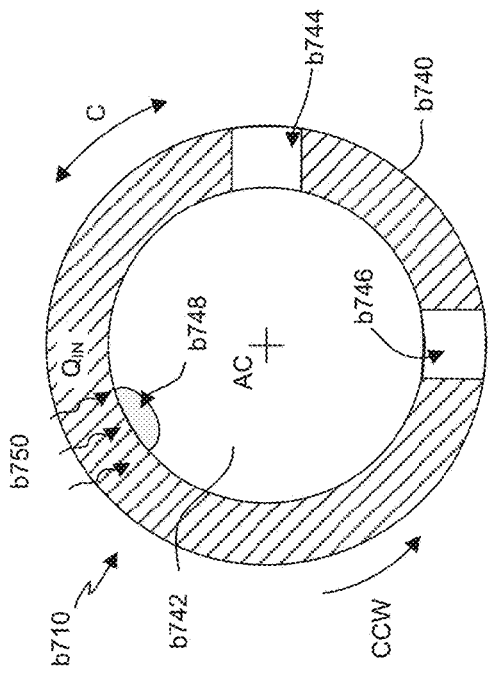
FIGS. 40, 41, and 42 provide various views of another rotary constant density heat exchanger according to an example embodiment of the present disclosure.
Figure 40:
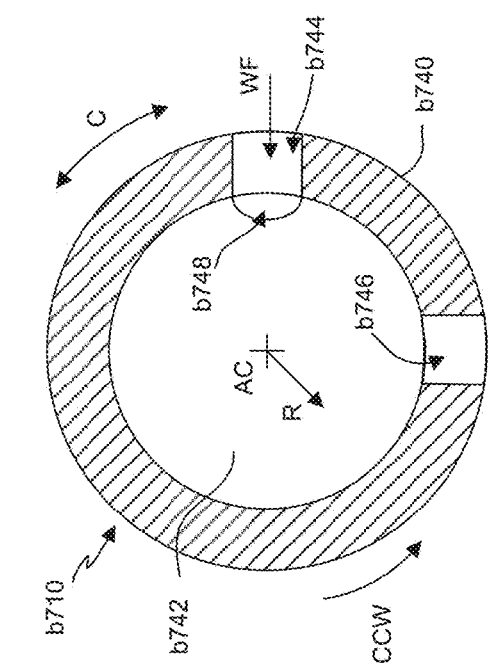
Figure 42:
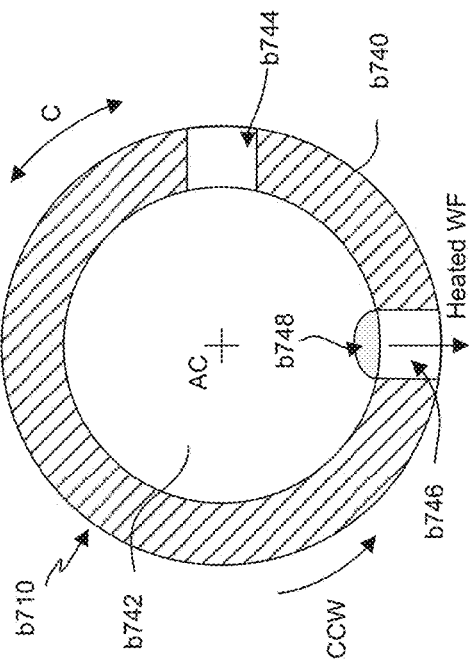

FIGS. 40, 41, and 42 provide various views of another rotary constant density heat exchanger b710 according to an example embodiment of the present disclosure. For reference, the rotary constant density heat exchanger b710 defines an axial direction, a radial direction R, a circumferential direction C, and an axial centerline AC extending along the axial direction (into and out of the page in FIG. 40). The radial direction R extends to and from the axial centerline AC in a direction orthogonal to the actual direction. The circumferential direction C extends 360° around the axial centerline AC.

For this embodiment, the rotary constant density heat exchanger b710 includes an annular stationary housing b740 and a rotating member b742 disposed within the stationary housing b740. The rotating member b742 is rotatable about an axis of rotation, which in this embodiment is an axial centerline, denoted as AC in FIG. 40. Thus, the rotating member b742 is rotatable within the stationary housing b740. The rotating member b742 can have a cylindrical shape, for example. In some embodiments, the rotating member b742 can be rotated continuously at a predetermined rotational speed. In yet other embodiments, the rotating member b742 can be rotated in a non-continuous manner. The stationary housing b740 defines an inlet port b744 and an outlet port b746. The inlet port b744 is spaced from the outlet port b746 along the circumferential direction C. The inlet port b744 of the stationary housing b740 is operable to receive a volume of working fluid. In contrast, the working fluid can exit the rotary constant density heat exchanger b710 via the outlet port b746. The rotating member b742, which has a cylindrical shape in this embodiment, defines one or more working chambers. For this example embodiment, the rotating member b742 defines a single working chamber at an outer periphery of the rotating member b742.

As shown in FIG. 40, when the working chamber is in communication with or aligned with the inlet port b744 of the stationary housing b740 along the circumferential direction C, working fluid, denoted by WF, can be moved through the inlet port b744 and into the working chamber. As the rotating member b742 is rotated about the circumferential direction C, e.g., in a counterclockwise direction (CCW), the working fluid is held at constant density as heat is applied as denoted by $Q_{IN}$ in FIG. 41 Eventually, the working chamber becomes in communication with or aligned with the outlet port b746 along the circumferential direction C. As shown in FIG. 42, when the working chamber is aligned with the outlet port b746 of the stationary housing b740 along the circumferential direction C, the working fluid WF heated at constant density can be moved out of the working chamber and through the outlet port b746. The application of heat to the working fluid held at constant density increases the temperature and pressure of the working fluid, which ultimately increases the potential energy of the working fluid and thus more useful work can be produced therefrom.

To summarize, for this embodiment, the rotary constant density heat exchanger b710 has a stationary housing b740 defining an inlet port b744 and an outlet port b746. The rotary constant density heat exchanger b710 also has a rotating member b742 disposed within the stationary housing b740 and rotatable about an axis of rotation (e.g., the axial centerline). The rotating member b742 defines a working chamber b748. The working chamber b748 can have any suitable shape. Notably, a volume of working fluid is movable through the inlet port b744 and into the working chamber b748 when the working chamber b748 is in communication with the inlet port b744, e.g., as depicted in FIG.

40. When the working chamber b748 is not in communication with the inlet port b744 or the outlet port b746 as the rotating member b742 rotates about the axis of rotation, the volume of working fluid is held at constant density within the working chamber b748 and is heated by a heat source b750, e.g., as shown in FIG. 41. The volume of working fluid heated at constant density is movable out of the working chamber b748 and through the outlet port b746 when the working chamber b748 is in communication with the outlet port b746, e.g., as shown in FIG. 42.

Figure 43:
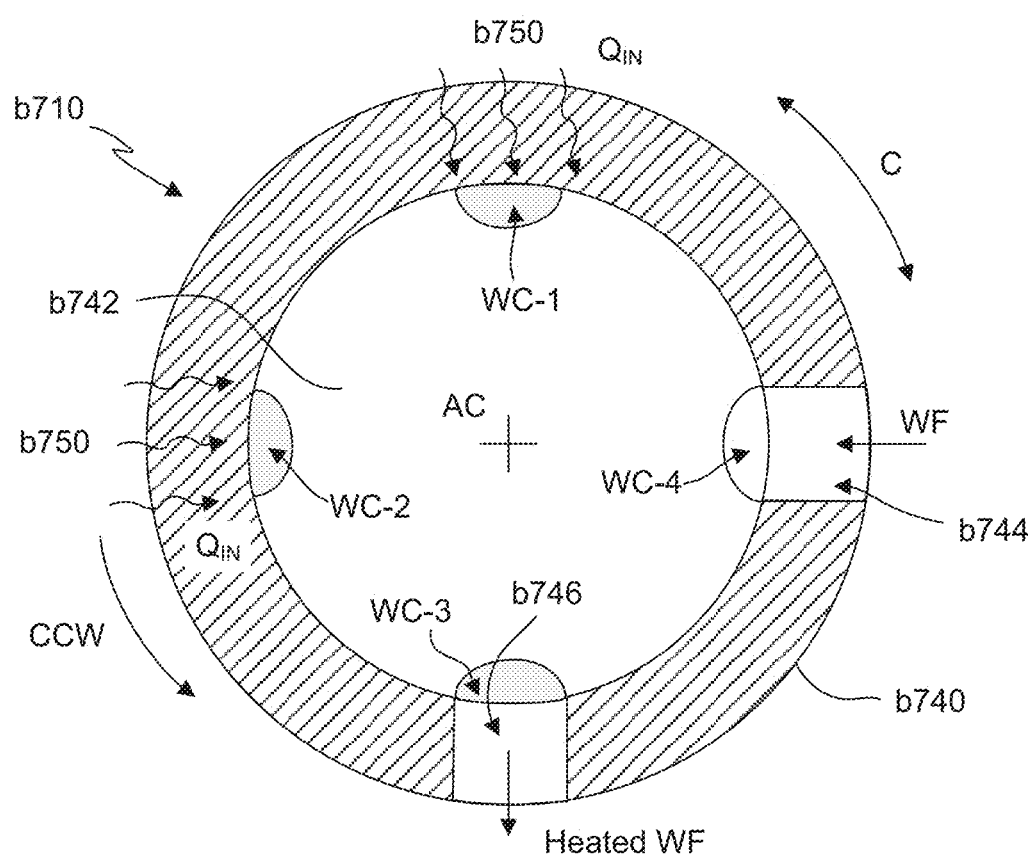
FIG. 43 provides a schematic view of another rotary constant density heat exchanger according to an example embodiment of the present disclosure.

FIG. 43 provides a schematic view of another rotary constant density heat exchanger b710 according to an example embodiment of the present disclosure. The rotary constant density heat exchanger b710 of FIG. 43 is similarly configured as the rotary constant density heat exchanger b710 of FIGS. 40 through 32, expect as provided below. The rotating member b742 of the rotary constant density heat exchanger b710 can define any suitable number of working chambers. For instance, for this embodiment, the rotating member b742 defines a plurality of working chambers, including a first working chamber WC-1, a second working chamber WC-2, a third working chamber WC-3, and a fourth working chamber WC-4. The working chambers are spaced from one another along the circumferential direction C. Particularly, the working chambers are spaced evenly from one another along the circumferential direction C. The rotary constant density heat exchanger b710 of FIG. 43 can operate in substantially the same way as the rotary constant density heat exchanger b710 of FIGS. 40 through 32 except that heated working fluid is pulsed from the outlet port b746 of the stationary housing b740 at a higher frequency. Moreover, having a plurality of working chambers may allow for the rotating member b742 to rotate at a slower speed with no loss in heated working fluid output and the heat source b734 may require less energy to heat the working fluid as the working fluid can be heated for a longer period of time.

Constant Density Heat Exchanger Utilizing a Positive Displacement Pump

In some example embodiments, the constant density heat exchanger can include a positive displacement pump. In some embodiments, for example, the constant density heat exchanger can be a positive displacement rotary pump. In other embodiments, the constant density heat exchanger can be a positive displacement reciprocating pump. Example positive displacement pumps include rotary lobe pumps, progressing cavity pumps, rotary gear pumps, piston pumps, diaphragm pumps, screw pumps, gear pumps, vane pumps, regenerative or peripheral pumps, and peristaltic pumps.

In one example embodiment, a constant density heat exchanger includes a positive displacement rotary pump defining a chamber. The chamber receives a working fluid and holds the working fluid at constant density while a heat source b508 applies heat to the working fluid for a predetermined heating time. In some embodiments, the heat source b508 is one or more electric heating elements. For instance, the one or more electric heating elements can include one or more electrical resistance heating elements. Further, in yet other embodiments, the heat source b508 is one or more flames.

In yet other embodiments, the heat source b508 is a cooling fluid CF having a temperature greater than a temperature of the working fluid held within the chamber of the positive displacement rotary pump at constant volume. The positive displacement rotary pump can include a wall defining one or more channels. The one or more channels can receive the cooling fluid CF. In this way, the cooling fluid CF can heat or impart thermal energy to the working fluid held within the chamber at constant density.

In another example embodiment, a constant density heat exchanger includes a positive displacement reciprocating pump defining a chamber. The chamber receives a working fluid and holds the working fluid at constant density while a heat source b508 applies heat to the working fluid for a predetermined heating time. In some embodiments, the heat source b508 is one or more electric heating elements. For instance, the one or more electric heating elements can include one or more electrical resistance heating elements. Further, in yet other embodiments, the heat source b508 is one or more flames.

In yet other embodiments, the heat source b508 is a cooling fluid CF having a temperature greater than a temperature of the working fluid held within the chamber of the positive displacement reciprocating pump at constant volume. The positive displacement reciprocating pump can include a wall defining one or more channels. The one or more channels can receive the cooling fluid CF. In this way, the cooling fluid CF can heat or impart thermal energy to the working fluid held within the chamber at constant density.

Wrankel Device

In some embodiments, the Notarnicola cycle systems b500 described herein can include a Wrankel device b800. By way of example, FIG. 23 and FIG. 24 provide schematic views of Notarnicola cycle systems b500 that include Wrankel devices b800. Generally, a Wrankel device b800, or constant density heat addition expansion device is operable to accomplish two primary tasks. First, the Wrankel device b800 holds a volume of working fluid at constant density during heat application for a predetermined heating time. Second, the Wrankel device b800 facilitates expansion of the high pressure, high temperature working fluid. Energy from the expansion of the high pressure, high temperature working fluid can be extracted and used to produce useful work. For instance, the work produced can be utilized to drive a compressor and/or other accessories of one or more of the closed cycle engines described herein.

Figure 44:
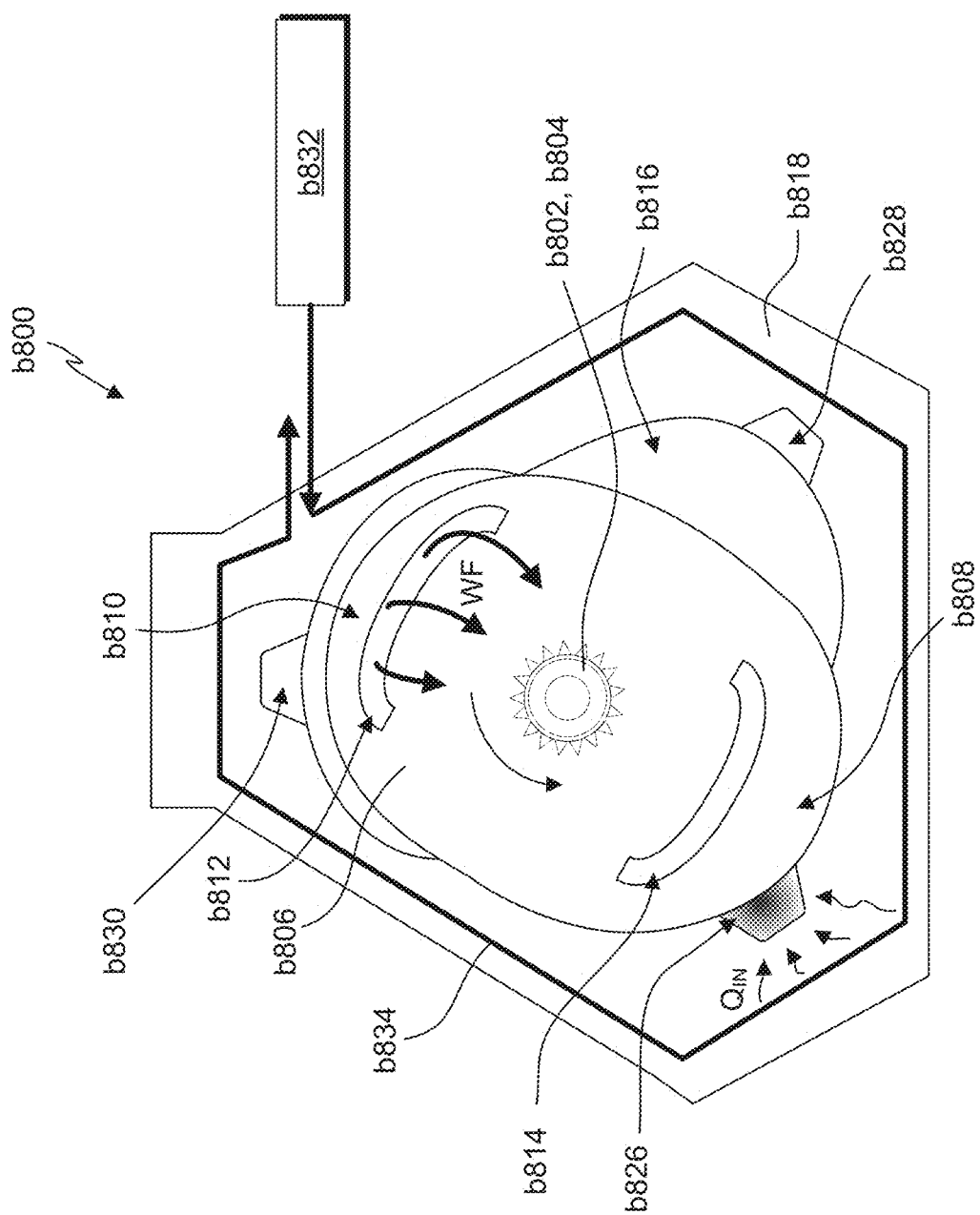
Figure 47:
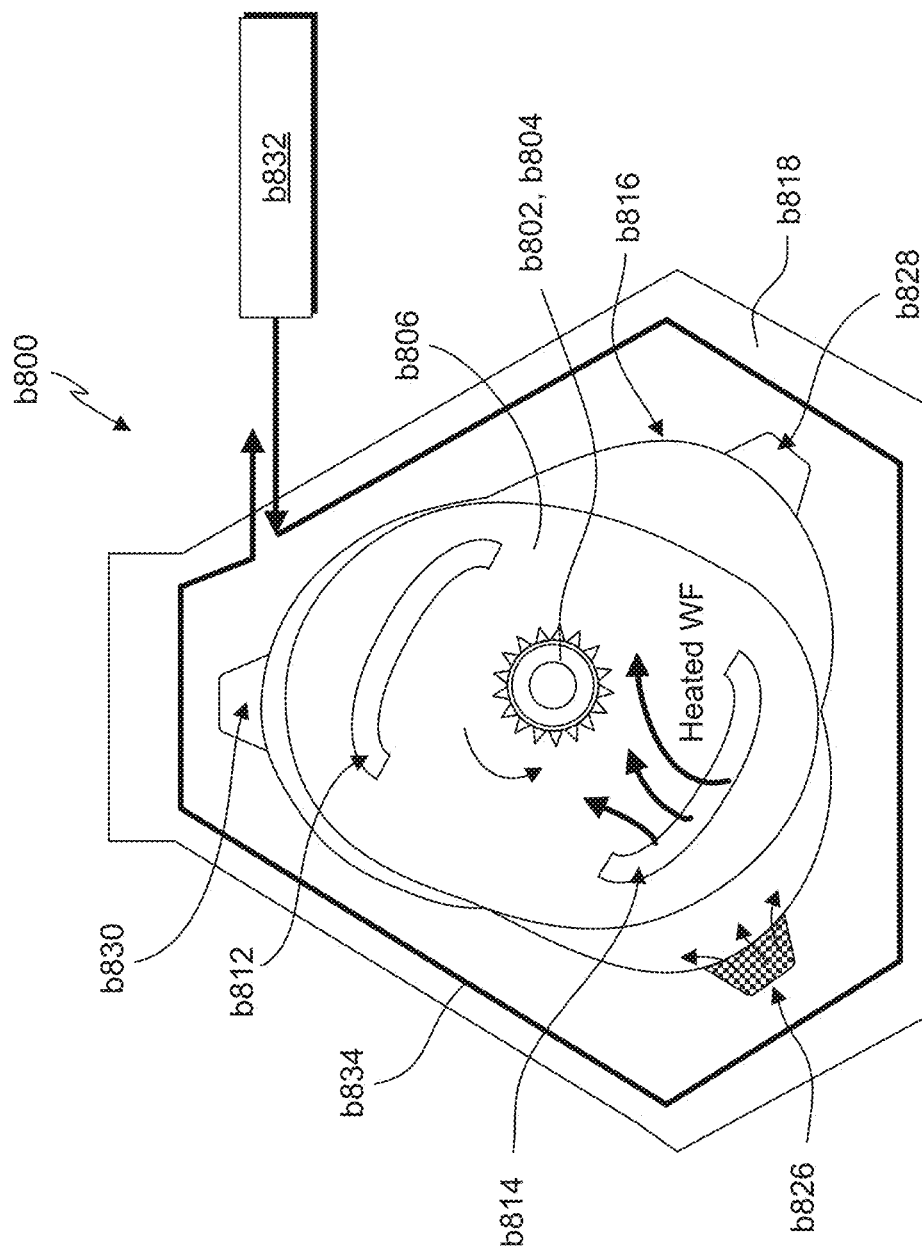

FIGS. 44, 45, 46, and 47 provide various views of an example Wrankel device b800 and components thereof according to an aspect of the present disclosure. Particularly, FIG. 44 provides a schematic axial view of the Wrankel device b800 and depicts working fluid contained at constant density during heat application. FIG. 45 provides a perspective view of an example rotor b806 of the Wrankel device b800 of FIG. 44 operatively coupled with a shaft b802 having an eccentric portion b804. FIG. 46 provides an axial view of a housing b818 of the Wrankel device b800 of FIG. 44. FIG. 47 provides another schematic axial view of the Wrankel device b800 of FIG. 44 and depicts heated working fluid expanding to produce useful work.

As shown best in FIG. 44, the Wrankel device b800 includes a rotor b806 having N lobes, wherein N is an integer. The rotor b806 can have any suitable number of lobes. For this embodiment, the Wrankel device b800 includes two (2) lobes, including a first lobe b808 and an opposing second lobe b810. The rotor b806 has a generally oval shape in this example embodiment, but other shapes are possible. The rotor b806 is operatively coupled with a shaft b802 having an eccentric portion b804. Particularly, the rotor b806 is disposed on the eccentric portion b804 of the shaft b802 as shown best in FIG. 45. Thus, the rotor b806 can move in or along an eccentric motion or path. The shaft b802 can be geared to an output shaft, e.g., that can be used to drivingly rotate a pump, a compressor, an electric motor, etc. In addition, the rotor b806 defines an inlet port b812 operable to receive working fluid (e.g., a supercritical fluid, such as supercritical carbon dioxide) into a main chamber b816 defined by a housing b818 of the Wrankel device b800. The rotor b806 also defines an outlet port b814 operable to receive an expanding volume of working fluid as will be described below.

The Wrankel device b800 also includes a housing b818 defining a main chamber b816 as noted above. As shown best in FIG. 46, the main chamber b816 defined by the housing b818 has lobe receiving regions for receiving the lobes of the rotor b806 as the rotor b806 rotates within the main chamber b816, e.g., along an eccentric path. In some embodiments, the main chamber b816 defined by the housing b818 has N+1 lobe receiving regions, or stated differently, the main chamber b816 has one more lobe receiving region than the rotor b806 has lobes. As noted above, N is an integer. For this embodiment, the main chamber b816 has three (3) lobe receiving regions, including a first lobe receiving region 820, a second lobe receiving region b822, and a third lobe receiving region b824. Each of the lobe receiving regions b820, b822, b824 are sized complementary to the lobes of the rotor b806 such that the lobes can be received therein. For instance, as shown in FIG. 44, the first lobe b808 of the rotor b806 is received within the first lobe receiving region 820.

The housing b818 defines a plurality of constant density working chambers. Particularly, as shown best in FIG. 46, each lobe receiving region has an associated constant density working chamber. The first lobe receiving region 820 has an associated first constant density working chamber, or first CD working chamber b826. The second lobe receiving region b822 has an associated second constant density working chamber, or second CD working chamber b828. The third lobe receiving region b824 has an associated third constant density working chamber, or third CD working chamber b830. The CD working chambers b826, b828, b830 are defined by the housing b818 as noted above and are positioned at the apex of each lobe receiving region. The CD working chambers b826, b828, b830 are positioned outward of the lobe receiving regions b820, b822, b824 along the radial direction R with respect to an axial centerline AC, e.g., as shown in FIG. 46. In FIG. 46, the axial centerline extends into and out of the page.

During operation of the Wrankel device b800, the CD working chambers b826, b828, b830 are each operable to receive a volume of working fluid therein. In some embodiments, the CD working chambers b826, b828, b830 can receive working fluid in a sequential manner. Particularly, when a given lobe of the rotor b806 is received within one of the lobe receiving regions b820, b822, b824, a volume of working fluid is received within that CD working chamber. More specifically, a volume of working fluid is received within that CD working chamber and held at constant density during heat application. For instance, as shown best in FIG. 44, the first lobe b808 is received within the first lobe receiving region 820. Accordingly, a portion of working fluid, denoted as WF in FIG. 44, that has entered the main chamber b816 via the inlet port b812 becomes trapped or otherwise contained within the first CD working chamber b826. The first lobe b808 of the rotor b806 traps the working fluid within the first CD working chamber b826. The volume of working fluid held within the first CD working chamber b826 can be held at constant density for a predetermined heating time as will be explained further below.

As further shown in FIG. 44, the housing b818 defines one or more heating loops. In some embodiments, the housing b818 is additively manufactured. Accordingly, in such embodiments, the heating loops can be printed or otherwise defined during the additive manufacturing process. The heating loops can be any suitable type of loop. For instance, in some embodiments, the one or more heating loops are configured to receive a heat exchange fluid, such as e.g., hot combustion gases from a closed cycle engine b110. In yet other embodiments, the one or more heating loops are configured as electrical resistance wires operable to receive an electric current therethrough, e.g., for imparting thermal energy to surrounding structures and fluid. Accordingly, the heat source b832 can be a closed cycle engine b110 (e.g., such as one of the closed cycle engines described herein), an electric heating element, some combination thereof, or some other suitable heat source b832.

The one or more heating loops b834 extend around the perimeter of the housing b818 in this example embodiment. Notably, the one or more heating loops b834 extend proximate each of the CD working chambers b826, b828, b830. In this way, when a volume of working fluid is held at constant density within one of the CD working chambers b826, b828, b830, a heat exchange fluid or electric current passing through the one or more heating loops b834 can impart thermal energy to the volume of working fluid. Stated another way, the one or more heating loops are positioned at least in part in a heat exchange relationship with the CD working chambers b826, b828, b830. Although the one or more heating loops are shown in FIG. 44 as having only a single inlet and a single outlet, in other example embodiments the one or more heating loops b834 can have multiple inlets and/or outlets. For instance, each CV working chamber can have a dedicated heating loop. In this manner, the CD working chambers b826, b828, b830 and their contents can be heated more uniformly.

When a volume of working fluid is held at constant density within one of the CD working chambers b826, b828, b830, e.g., when one of the lobes of the rotor b806 is received within one of the lobe receiving regions b820, b822, b824, the heat source b832 imparts thermal energy to the volume of working fluid held at constant density for a predetermined heating time via the heating loops b834. For instance, as shown in FIG. 44, the first lobe b808 is received within the first lobe receiving region 820, and a volume of working fluid is held at constant density within the first CD working chamber b826. As the working fluid is held at constant density, the heat source b832, or more particularly the heat exchange fluid and/or electric current flowing through the one or more heating loops b834, imparts thermal energy to the volume of working fluid held at constant density for a predetermined heating time. Thermal energy or heat is shown being applied to the working fluid held at constant density in the first CD working chamber b826, as denoted by $Q_{IN}$. The predetermined heating time can be on the order of milliseconds or seconds, for example.

The application of heat to the working fluid held at constant density increases the temperature and pressure of the working fluid, which ultimately increases the potential energy of the working fluid. Thus, more useful work can be produced therefrom. Indeed, the temperature and pressure of the working fluid can increased such that after the heat source b832 imparts thermal energy to the volume of working fluid held at constant density within one of the CD working chambers b826, b828, b830 for the predetermined heating time, the now-heated volume of working fluid undergoes expansion. That is, the working fluid is heated to a temperature and pressure such that the working fluid rapidly expands. The rapid expansion of the working fluid causes the rotor b806 to rotate. The rotation or movement of the rotor b806 produces useful work that in turn causes the eccentric portion b804 and shaft b802 to rotate. Accordingly, the shaft b802 can drive one or more components, such as e.g., a compressor of one of the closed cycle engines described herein. As shown best in FIG. 47, the high pressure, high temperature working fluid heated at constant density expands outward from of the first CD working chamber b826, causing the rotor b806 to rotate. The now-expanded working fluid can exit the main chamber b816 through the outlet port b814 of the rotor b806 and can flow downstream, e.g., to a pump or cold side heat exchanger b116 of a regenerative engine. Notably, for this embodiment, the working fluid is heated at constant density to raise the temperature and pressure thereof, but the working fluid is not combusted. Advantageously, this may allow for the working fluid to be moved back through the Wrankel device b800, e.g., in a closed loop Notarnicola cycle system b500.

In some embodiments, as depicted in FIG. 46, the housing b818 has a peak disposed between each pair of adjacent lobe-receiving regions. The Wrankel device b800 includes a plurality of peak seals b838. As shown, each peak b836 has an associated peak seal b838. Notably, at least one of the plurality of peak seals b838 is configured to maintain contact with the rotor b806 throughout a period of rotation of the rotor b806. In this way, at least one of the peak seals b838 is in contact with the rotor b806 at all times. Furthermore, the peak seals b838 facilitate directing the working fluid from the inlet port b812 into the CD working chambers b826, b828, b830, e.g., for heating at constant density, and from the CD working chambers b826, b828, b830 to the outlet port b814, e.g., after expansion.

With reference to FIGS. 48 through 53, an example manner of operation of the Wrankel device b800 will now be provided. FIGS. 48 through 53 provide various schematic axial views of the Wrankel device b800 and show the rotor b806 in different positions through its rotation or eccentric path. In FIGS. 48 through 53 the rotor b806 rotates counterclockwise along an eccentric path, however, in other example embodiments, the rotor b806 can rotate clockwise along an eccentric path.

Figure 48:
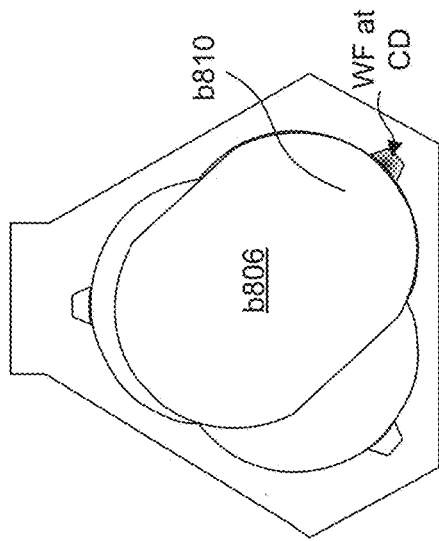
FIGS. 48 through 53 provide various schematic axial views of the Wrankel device of FIGS. 44 through 47 and show the rotor in different positions through its rotation or eccentric path.

As shown in FIG. 48, the first lobe b808 of the rotor b806 is received within the third lobe receiving region b824 (FIG. 46), and accordingly, some or a portion of working fluid within the main chamber b816 becomes contained within the third CD working chamber b830. As the working fluid is held at constant density within the third CD working chamber b830 by the first lobe b808 of the rotor b806, the heat source b832 (FIG. 47) heats or imparts thermal energy to the working fluid held at constant density. This causes the pressure and temperature of the working fluid held within the third CD working chamber b830 to increase.

Figure 49:
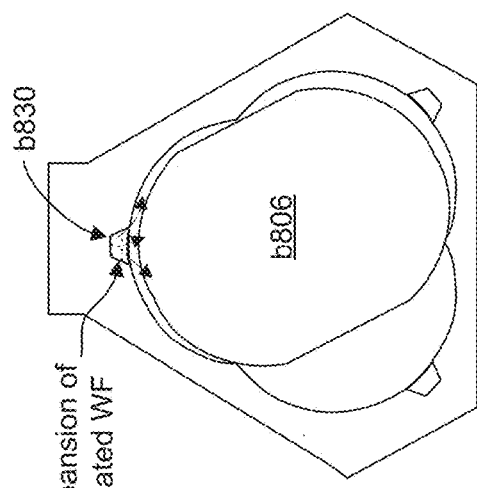

As shown in FIG. 49, after a predetermined heating time or upon the working fluid reaching a critical pressure within the third CD working chamber b830, the now-heated and pressurized working fluid expands, causing the rotor b806 to move, e.g., in a counterclockwise direction. That is, the expansion of the now-heated and pressurized working fluid causes the rotor b806 to rotate, which in turn causes the eccentric portion b804 and shaft b802 thereof to rotate, thereby producing useful work.

Figure 50:
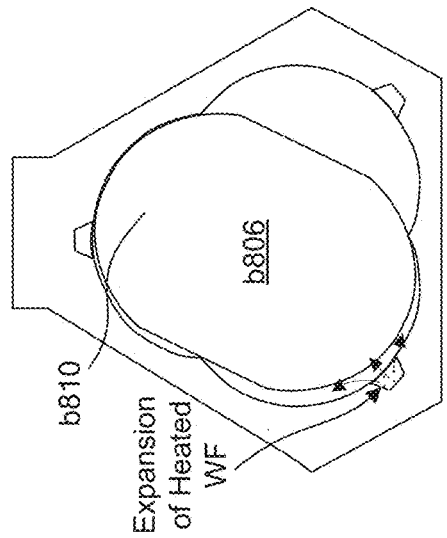

As shown in FIG. 50, the second lobe b810 of the rotor b806 is received within the second lobe receiving region b822 (FIG. 46), and accordingly, some working fluid within the main chamber b816 becomes contained or trapped within the second CD working chamber b828 (FIG. 46). As the working fluid is held at constant density within the second CD working chamber b828, the heat source b832 heats or imparts thermal energy to the working fluid held at constant density. This causes the pressure and temperature of the working fluid held within the second CD working chamber b828 to increase.

Figure 51:
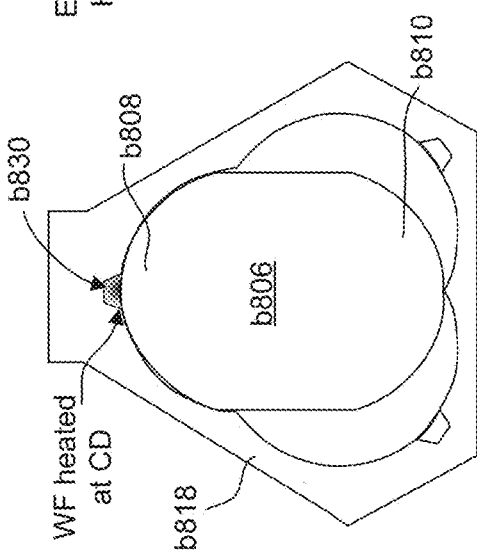

As shown in FIG. 51, after a predetermined heating time or upon the working fluid reaching a critical pressure within the second CD working chamber b828, the now-heated and pressurized working fluid expands, causing the rotor b806 to move, e.g., in a counterclockwise direction. That is, the expansion of the now-heated and pressurized working fluid causes the rotor b806 to rotate, which in turn causes the eccentric portion b804 and shaft b802 thereof to rotate, thereby producing useful work.

Figure 52:
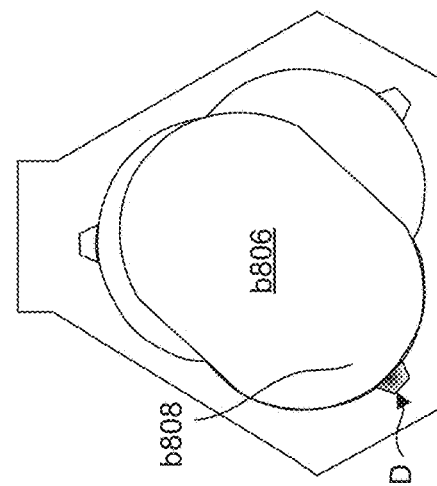

As shown in FIG. 52, the first lobe b808 of the rotor b806 is received within the first lobe receiving region 820 (FIG. 46), and accordingly, some working fluid within the main chamber b816 becomes contained or trapped within the first CD working chamber b826. As the working fluid is held at constant density within the first CD working chamber b826, the heat source b832 heats or imparts thermal energy to the working fluid held at constant density. This causes the pressure and temperature of the working fluid held within the first CD working chamber b826 to increase.

Figure 53:
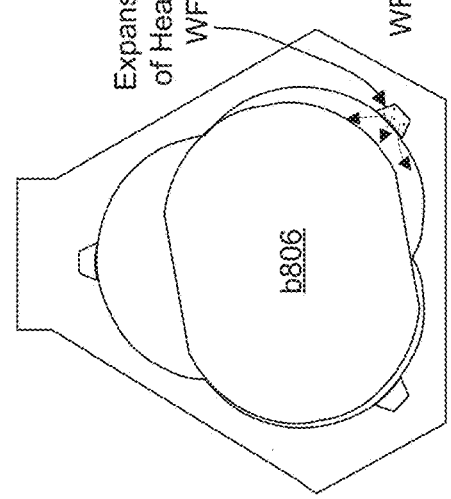

As shown in FIG. 53, after a predetermined heating time or upon the working fluid reaching a critical pressure within the first CD working chamber b826, the now-heated and pressurized working fluid expands, causing the rotor b806 to move, e.g., in a counterclockwise direction. That is, the expansion of the now-heated and pressurized working fluid causes the rotor b806 to rotate, which in turn causes the eccentric portion b804 and shaft b802 thereof to rotate, thereby producing useful work. After expansion, the rotor b806 can return to its position shown in FIG. 48 except that the second lobe b810 of the rotor b806 is received within the third lobe receiving region b824.

To summarize, as the rotor b806 rotates within the main chamber b816 defined by the housing b818, the rotor b806 holds working fluid at constant density within one of the CD working chambers b826, b828, b830 during heat application. The high temperature, high pressure working fluid then expands, driving the rotor b806 and shaft b802 operatively coupled thereto to rotate, thereby producing useful work. The rotor b806 rotates within the main chamber b816 and one of the lobes of the rotor b806 is received within a receiving lobe region in a sequential manner thereby also utilizing the momentum of the rotor b806 to garner improved efficiency.

Figure 54:
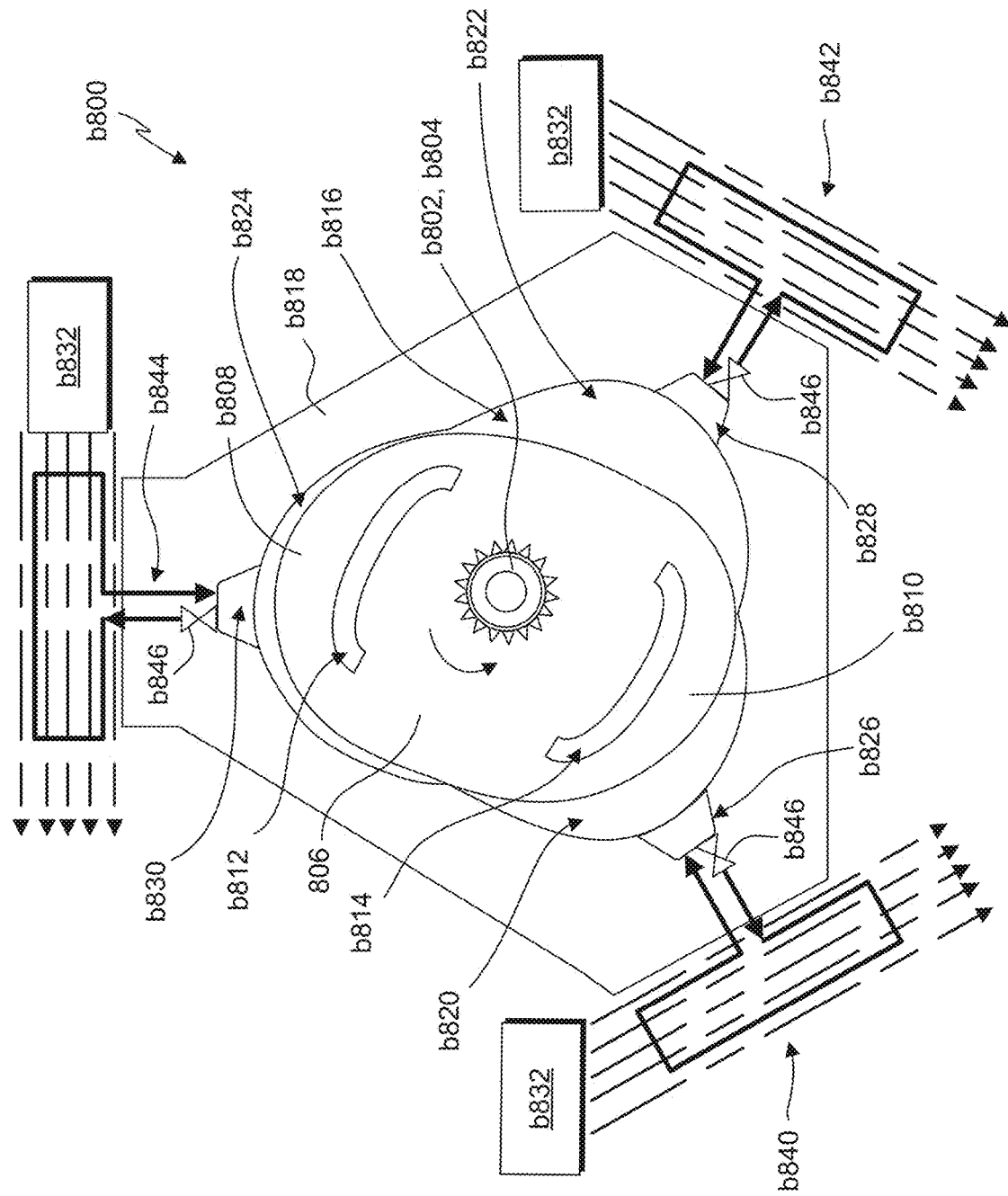
FIG. 54 provides a schematic axial view of another Wrankel device according to an example embodiment of the present disclosure.

FIG. 54 provides a schematic axial view of another Wrankel device b800 according to an example embodiment of the present disclosure. The Wrankel device b800 of FIG. 54 is configured in a similar manner as the Wrankel device b800 of FIGS. 44 through 53, except as provided below.

For this embodiment, each of the CD working chambers b826, b828, b830 have an associated heat exchange loop. For instance, the first CD working chamber b826 has an associated first heat exchange loop b840, the second CD working chamber b828 has an associated second heat exchange loop b842, and the third CD working chamber b830 has an associated third heat exchange loop b844. The heat exchange loops b840, b842, b844 are positioned in fluid communication with their respective CD working chambers b826, b828, b830 and are each in thermal communication with a heat source b832. That is, the heat exchange loops b840, b842, b844 are positioned at least in part in a heat exchange relationship with a heat source b832. Each heat exchange loop can be in thermal communication with the same heat source b832, e.g., combustion gases recovered from the hot side b112 of a closed cycle engine b110, or different heat sources b832. As depicted in FIG. 54, hot combustion gases can flow past or across the heat exchange loops b840, b842, b844. In this way, working fluid disposed within the heat exchange loops b840, b842, b844 can be heated by the combustion gases.

A valve b846 is positioned along each heat exchange loop b840, b842, b844. For instance, the valves b846 can be poppet valves b846. The valve b846 of each heat exchange loop b840, b842, b844 is operable to selectively allow working fluid to flow through its associated heat exchange loop b840, b842, b844. For instance, if the pressure of the working fluid within one of the CD working chambers reaches a predetermined pressure threshold, the valve b846 can be moved to an open position to selectively allow working fluid to flow through the heat exchange loop. On the other hand, if the pressure of the working fluid within the CD working chamber has not reached the predetermined pressure threshold, the valve b846 remains in the closed position and thus prevents working fluid from flowing through the heat exchange loop.

An example manner of operation of the Wrankel device b800 of FIG. 54 will now be provided. The first lobe b808 of the rotor b806 can first be received within the third lobe receiving region b824, and accordingly, some or a portion of working fluid within the main chamber b816 becomes contained or trapped within the third CD working chamber b830. As the working fluid is moved into the third CD working chamber b830 by the first lobe b808 of the rotor b806, the pressure of the working fluid within the third CD working chamber b830 reaches a predetermined pressure threshold. Accordingly, the valve b846 is moved to an open position and consequently working fluid flows into the first heat exchange loop b840. The heat source b832 applies heat to the working fluid held at constant density within the first heat exchange loop b840 and the third CD working chamber b830. For this example, the heat source b832 includes combustion gases recovered from a closed cycle engine b110, such as one of the closed cycle engines described herein. The combustion gases impart thermal energy to the working fluid flowing through the first heat exchange loop b840. As the working fluid is heated at constant density, the temperature and pressure of the working fluid increases. As the pressure of the working fluid increases, the force the working fluid places on the first lobe b808 of the rotor b806 increases as well. The force the working fluid places on the first lobe b808 of the rotor b806 eventually becomes sufficient to move the rotor b806. Particularly, the working fluid heated at constant density rapidly expands thereby causing the rotor b806 to move or rotate, which in turn causes the eccentric portion b804 and shaft b802 thereof to rotate, thereby producing useful work.

The rotor b806 can be moved along an eccentric path such that the second lobe b810 of the rotor b806 is received within the second lobe receiving region b822, and accordingly, some working fluid within the main chamber b816 becomes contained or trapped within the second CD working chamber b828. As the working fluid is moved into the second CD working chamber b828 by the second lobe b810 of the rotor b806, the pressure of the working fluid within the second CD working chamber b828 reaches a predetermined pressure threshold. Accordingly, the valve b846 is moved to an open position and consequently working fluid flows into the second heat exchange loop b842. The heat source b832 applies heat to the working fluid held at constant density within the second heat exchange loop b842 and the second CD working chamber b828. As noted above, for this example, the heat source b832 includes combustion gases recovered from a closed cycle engine b110, such as one of the closed cycle engines described herein. The combustion gases impart thermal energy to the working fluid flowing through the second heat exchange loop b842. As the working fluid is heated at constant density, the temperature and pressure of the working fluid increases. As the pressure of the working fluid increases, the force the working fluid places on the second lobe b810 of the rotor b806 increases as well. The force the working fluid places on the second lobe b810 of the rotor b806 eventually becomes sufficient to move the rotor b806. Particularly, the working fluid heated at constant density rapidly expands thereby causing the rotor b806 to move or rotate, which in turn causes the eccentric portion b804 and shaft b802 thereof to rotate, thereby producing useful work.

The rotor b806 can continue to move along the eccentric path such that the first lobe b808 of the rotor b806 is received within the first lobe receiving region 820, and accordingly, some working fluid within the main chamber b816 becomes contained or trapped within the first CD working chamber b826. As the working fluid is moved into the first CD working chamber b826 by the first lobe b808 of the rotor b806, the pressure of the working fluid within the first CD working chamber b826 reaches a predetermined pressure threshold. Accordingly, the valve b846 is moved to an open position and consequently working fluid flows into the first heat exchange loop b840. The heat source b832 applies heat to the working fluid held at constant density within the first heat exchange loop b840 and the first CD working chamber b826. For this embodiment, the heat source b832 includes combustion gases recovered from a closed cycle engine b110, such as one of the closed cycle engines described herein. The combustion gases impart thermal energy to the working fluid flowing through the first heat exchange loop b840. As the working fluid is heated at constant density, the temperature and pressure of the working fluid increases. As the pressure of the working fluid increases, the force the working fluid places on the first lobe b808 of the rotor b806 increases as well. The force the working fluid places on the first lobe b808 of the rotor b806 eventually becomes sufficient to move the rotor b806. Particularly, the working fluid heated at constant density rapidly expands thereby causing the rotor b806 to move or rotate, which in turn causes the eccentric portion b804 and shaft b802 thereof to rotate, thereby producing useful work. After expansion, the rotor b806 can continue along its eccentric path and can continue along its eccentric path in the sequential manner noted above.

Figure 55:
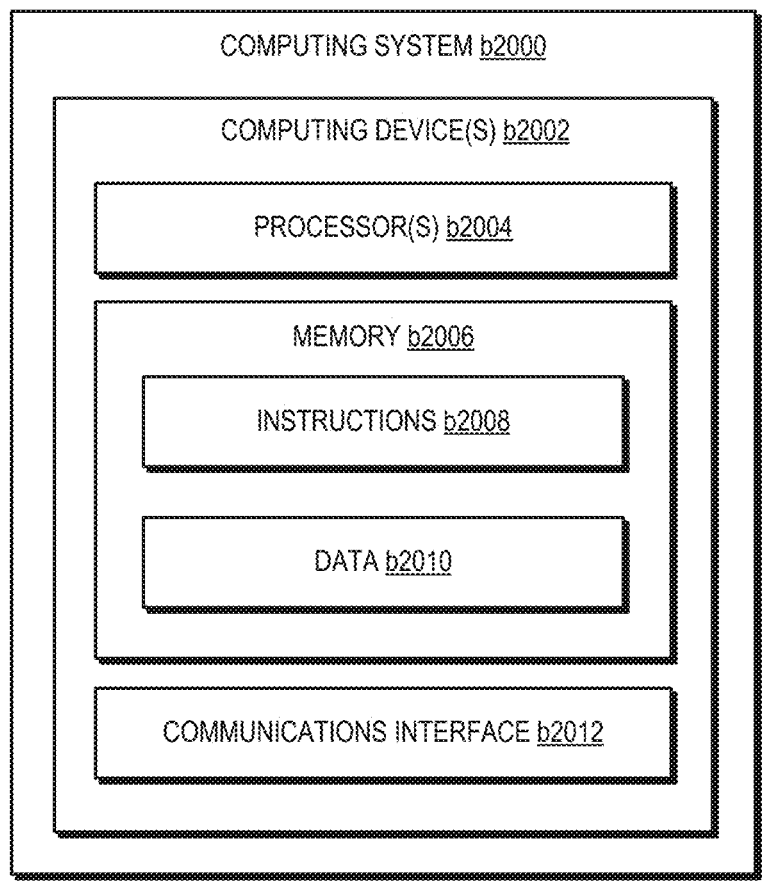
FIG. 55 provides an exemplary computing system according to aspects of the present disclosure.

FIG. 55 provides an example computing system in accordance with an example embodiment of the present disclosure. The one or more controllers, computing devices, or other control devices described herein can include various components and perform various functions of the one or more computing devices of the computing system b2000 described below.

As shown in FIG. 55, the computing system b2000 can include one or more computing device(s) b2002. The computing device(s) b2002 can include one or more processor(s) b2004 and one or more memory device(s) b2006. The one or more processor(s) b2004 can include any suitable processing device, such as a microprocessor, microcontroller, integrated circuit, logic device, and/or other suitable processing device. The one or more memory device(s) b2006 can include one or more computer-readable media, including, but not limited to, non-transitory computer-readable media, RAM, ROM, hard drives, flash drives, and/or other memory devices.

The one or more memory device(s) b2006 can store information accessible by the one or more processor(s) b2004, including computer-readable instructions b2008 that can be executed by the one or more processor(s) b2004. The instructions b2008 can be any set of instructions that when executed by the one or more processor(s) b2004, cause the one or more processor(s) b2004 to perform operations. In some embodiments, the instructions b2008 can be executed by the one or more processor(s) b2004 to cause the one or more processor(s) b2004 to perform operations, such as any of the operations and functions for which the computing system b2000 and/or the computing device(s) b2002 are configured, such as e.g., operations for controlling certain aspects of power generation systems and/or controlling one or more closed cycle engines as described herein. For instance, the methods described herein can be implemented in whole or in part by the computing system b2000. Accordingly, the method can be at least partially a computer-implemented method such that at least some of the steps of the method are performed by one or more computing devices, such as the exemplary computing device(s) b2002 of the computing system b2000. The instructions b2008 can be software written in any suitable programming language or can be implemented in hardware. Additionally, and/or alternatively, the instructions b2008 can be executed in logically and/or virtually separate threads on processor(s) b2004. The memory device(s) b2006 can further store data b2010 that can be accessed by the processor(s) b2004. For example, the data b2010 can include models, databases, etc.

The computing device(s) b2002 can also include a network interface b2012 used to communicate, for example, with the other components of system (e.g., via a network). The network interface b2012 can include any suitable components for interfacing with one or more network(s), including for example, transmitters, receivers, ports, controllers b1510, antennas, and/or other suitable components. One or more controllable devices b1534 and other controllers b1510 can be configured to receive one or more commands or data from the computing device(s) b2002 or provide one or more commands or data to the computing device(s) b2002.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

It should be appreciated that performances, power outputs, efficiencies, or temperature differentials at the system A10, the engine A100, or both, provided herein may be based on a "Sea Level Static" or "Standard Day" input air condition such as defined by the United States National Aeronautics and Space Administration, unless otherwise specified. For example, unless otherwise specified, conditions provided to the heater body, the chiller assembly, or both, or any subsystems, components, etc. therein, or any other portions of the system A10 receiving an input fluid, such as air, are based on Standard Day conditions.

The heat transfer relationships described herein may include thermal communication by conduction and/or convection. A heat transfer relationship may include a thermally conductive relationship that provides heat transfer through conduction (e.g., heat diffusion) between solid bodies and/or between a solid body and a fluid. Additionally, or in the alternative, a heat transfer relationship may include a thermally convective relationship that provides heat transfer through convection (e.g., heat transfer by bulk fluid flow) between a fluid and a solid body. It will be appreciated that convection generally includes a combination of a conduction (e.g., heat diffusion) and advection (e.g., heat transfer by bulk fluid flow). As used herein, reference to a thermally conductive relationship may include conduction and/or convection; whereas reference to a thermally convective relationship includes at least some convection.

A thermally conductive relationship may include thermal communication by conduction between a first solid body and a second solid body, between a first fluid and a first solid body, between the first solid body and a second fluid, and/or between the second solid body and a second fluid. For example, such conduction may provide heat transfer from a first fluid to a first solid body and/or from the first solid body to a second fluid. Additionally, or in the alternative, such conduction may provide heat transfer from a first fluid to a first solid body and/or through a first solid body (e.g., from one surface to another) and/or from the first solid body to a second solid body and/or through a second solid body (e.g., from one surface to another) and/or from the second solid body to a second fluid.

A thermally convective relationship may include thermal communication by convection (e.g., heat transfer by bulk fluid flow) between a first fluid and a first solid body, between the first solid body and a second fluid, and/or between a second solid body and a second fluid. For example, such convection may provide heat transfer from a first fluid to a first solid body and/or from the first solid body to a second fluid. Additionally, or in the alternative, such convection may provide heat transfer from a second solid body to a second fluid.

It will be appreciated that the terms "clockwise" and "counter-clockwise" are terms of convenience and are not to be limiting. Generally, the terms "clock-wise" and "counter-clockwise" have their ordinary meaning, and unless otherwise indicated refer to a direction with reference to a top-down or upright view. Clockwise and counter-clockwise elements may be interchanged without departing from the scope of the present disclosure.

Where temperatures, pressures, loads, phases, etc. are said to be substantially similar or uniform, it should be appreciated that it is understood that variations, leakages, or other minor differences in inputs or outputs may exist such that the differences may be considered negligible by one skilled in the art. Additionally, or alternatively, where temperatures or pressures are said to be uniform, i.e., a substantially uniform unit (e.g., a substantially uniform temperature at the plurality of chambers A221), it should be appreciated that in one embodiment, the substantially uniform unit is relative to an average operating condition, such as a phase of operation of the engine, or thermal energy flow from one fluid to another fluid, or from one surface to a fluid, or from one surface to another surface, or from one fluid to another surface, etc. For example, where a substantially uniform temperature is provided or removed to/from the plurality of chambers A221, A222, the temperature is relative to an average temperature over a phase of operation of the engine. As another example, where a substantially uniform thermal energy unit is provided or removed to/from the plurality of chambers A221, A222, the uniform thermal energy unit is relative to an average thermal energy supply from one fluid to another fluid relative to the structure, or plurality of structures, through which thermal energy transferred.

Various interfaces, such as mating surfaces, interfaces, points, flanges, etc. at which one or more monolithic bodies, or portions thereof, attach, couple, connect, or otherwise mate, may define or include seal interfaces, such as, but not limited to, labyrinth seals, grooves into which a seal is placed, crush seals, gaskets, vulcanizing silicone, etc., or other appropriate seal or sealing substance. Additionally, or alternatively, one or more of such interfaces may be coupled together via mechanical fasteners, such as, but not limited to, nuts, bolts, screws, tie rods, clamps, etc. In still additional or alternative embodiments, one or more of such interfaces may be coupled together via a joining or bonding processes, such as, but not limited to, welding, soldering, brazing, etc., or other appropriate joining process.

It should be appreciated that ratios, ranges, minimums, maximums, or limits generally, or combinations thereof, may provide structure with benefits not previously known in the art. As such, values below certain minimums described herein, or values above certain maximums described herein, may alter the function and/or structure of one or more components, features, or elements described herein. For example, ratios of volumes, surface area to volume, power output to volume, etc. below the ranges described herein may be insufficient for desired thermal energy transfer, such as to undesirably limit power output, efficiency, or Beale number. As another example, limits greater than those described herein may undesirably increase the size, dimensions, weight, or overall packaging of the system or engine, such as to undesirably limit the applications, apparatuses, vehicles, usability, utility, etc. in which the system or engine may be applied or operated. Still further, or alternatively, undesired increases in overall packaging may undesirably decrease efficiency of an overall system, application, apparatus, vehicle, etc. into which the engine may be installed, utilized, or otherwise operated. For example, although an engine may be constructed defining a similar or greater efficiency as described herein, such an engine may be of undesirable size, dimension, weight, or overall packaging such as to reduce an efficiency of the system into which the engine is installed. As such, obviation or transgression of one or more limits described herein, such as one or limits relative to features such as, but not limited to, heater conduits, chiller conduits A54, chamber volumes, walled conduit volumes, or operational temperatures, or combinations thereof, may undesirably alter such structures such as to change the function of the system or engine.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to describe the presently disclosed subject matter, including the best mode, and also to provide any person skilled in the art to practice the subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims. The scope of the invention(s) described herein is defined by one or more of the claims, including combinations of two or more claims and may include other examples that occur to those skilled in the art.

We claim:

1. A constant density heat exchanger, comprising:
   a housing extending between a first end and a second end and defining a chamber having an inlet and an outlet;
   a first plate positioned at the first end of the housing and rotatable about an axis of rotation, the first plate defines a first port that, when aligned with the inlet of the chamber, allows a working fluid to flow into the inlet of the chamber; and
   a second plate positioned at the second end of the housing and rotatable about the axis of rotation, the second plate defines a second port that, when aligned with the outlet of the chamber, allows the working fluid to flow out of the outlet of the chamber, and
   wherein the first plate and the second plate are rotatable about the axis of rotation so as to hold a volume of the working fluid at constant density as a heat source imparts thermal energy thereto, and
   wherein the first plate and the second plate are rotatable about the axis of rotation in unison such that the first port defined by the first plate is aligned with the second port defined by the second plate along a circumferential direction.

2. The constant density heat exchanger of claim 1, wherein the first plate and the second plate are rotatable about the axis of rotation so that the first port defined by the first plate is aligned with the inlet of the chamber only when the second port is aligned with the outlet of the chamber.

3. The constant density heat exchanger of claim 1, wherein the chamber is one of a plurality of chambers defined by the housing, each of the plurality of chambers having an inlet at the first end of the housing and an outlet at the second end of the housing.

4. The constant density heat exchanger of claim 3, wherein the plurality of chambers are arranged in a circular array as viewed from a perspective along an axial direction defined by the constant density heat exchanger.

5. The constant density heat exchanger of claim 4, wherein the housing is cylindrically shaped, and wherein the heat source is positioned radially inward of the plurality of working chambers.

6. The constant density heat exchanger of claim 3, wherein:
   the first plate defines a first port that, when aligned with the inlet of a given one of the plurality of chambers, allows the working fluid to flow into the inlet of the given one of the plurality of chambers, and
   the second plate defines a second port that, when aligned with the outlet of the given one of the plurality of chambers, allows the working fluid to flow out of the outlet of the given one of the plurality of chambers, and
   wherein the first plate and the second plate are rotatable about the axis of rotation in unison such that the first port defined by the first plate is aligned with the inlet of the given one of the plurality of chambers only when the second port is aligned with the outlet of the given one of the plurality of chambers.

7. The constant density heat exchanger of claim 1, wherein the housing is cylindrically shaped, and wherein the heat source annularly surrounds the cylindrically shaped housing.

8. The constant density heat exchanger of claim 1, wherein the constant density heat exchanger defines an axial direction, and wherein the housing extends between the first end and the second end along the axial direction, and wherein the chamber extends from the first end to the second end of the housing along the axial direction, and wherein the housing has a first axial face at the first end and a second axial face at the second end, and wherein the first axial face defines the inlet of the chamber and the second axial face defines the outlet of the chamber.

9. A constant density heat exchanger, comprising:
a housing extending between a first end and a second end and defining a plurality of chambers that are circumferentially arranged;
a first plate positioned at the first end of the housing, the first plate defining a first port;
a second plate positioned at the second end of the housing, the second plate defining a second port aligned with the first port; and
a controller configured to:
cause the first plate and the second plate to rotate in unison about an axis of rotation relative to the housing so that the first port and the second port sequentially align with the plurality of chambers one after another, and
wherein, when the first port and the second port align with a given one of the plurality of chambers, the first port and the second port simultaneously align respectively with an inlet and an outlet of the given one of the plurality of chambers to allow a first volume of working fluid to enter into the given one of the plurality of chambers through the first port and a second volume of working fluid heated at constant density to exit the given one of the plurality of chambers through the second port.

10. The constant density heat exchanger of claim 9, wherein the controller causes the first plate and the second plate to rotate so that the first port and the second port align with the given one of the plurality of chambers for a predetermined open time.

11. The constant density heat exchanger of claim 9, wherein when the first port and the second port are aligned with the given one of the plurality of chambers, a volume of working fluid is held in at least one other chamber of the plurality of chambers between the first plate and the second plate.

12. The constant density heat exchanger of claim 11, wherein a heat source applies heat to the volume of working fluid held at constant density within the at least one other chamber of the plurality of chambers.

13. The constant density heat exchanger of claim 9, wherein the plurality of chambers are cylindrically shaped.

14. A method of operating a constant density heat exchanger, the method comprising:
rotating a first plate and a second plate about an axis of rotation relative to a housing defining a plurality of chambers that are circumferentially arranged so that a first port defined by the first plate and a second port defined by the second plate sequentially align with the plurality of chambers, and
wherein, when the first port and the second port align with a given one of the plurality of chambers, the first port and the second port simultaneously align respectively with an inlet and an outlet of the given one of the plurality of chambers to allow a first volume of working fluid to enter into the given one of the plurality of chambers through the first port and a second volume of working fluid heated at constant density to exit the given one of the plurality of chambers through the second port.

15. The method of claim 14, wherein when the first plate and the second plate are rotated in unison about the axis of rotation.

16. The method of claim 14, wherein the first port and the second port align with the given one of the plurality of chambers for a predetermined open time.

17. The method of claim 14, wherein when the first port and the second port are aligned with the given one of the plurality of chambers, a volume of working fluid is held in at least one other chamber of the plurality of chambers between the first plate and the second plate.

18. The method of claim 17, wherein the method comprises:
applying heat to the volume of working fluid held at constant density within the at least one other chamber of the plurality of chambers.

19. A constant density heat exchanger, comprising:
a housing extending between a first end and a second end and defining a plurality of chambers, each chamber of the plurality of chambers having an inlet at the first end of the housing and an outlet at the second end of the housing;
a first plate positioned at the first end of the housing and rotatable about an axis of rotation such that, when a first port of the first plate is aligned with a given inlet of one of the plurality of chambers, the first port allows a volume of working fluid to flow into the given inlet; and
a second plate positioned at the second end of the housing and rotatable about the axis of rotation such that, when a second port of the second plate is aligned with a given outlet of one of the plurality of chambers, the second port allows the volume of working fluid, which has been held at constant density as a heat source imparts thermal energy thereto, to flow out of the given outlet.

20. The constant density heat exchanger of claim 19, wherein the first plate and the second plate are rotatable about the axis of rotation in unison such that the first port defined by the first plate is aligned with the second port defined by the second plate along a circumferential direction.

* * * * *